United States Patent
Choi et al.

(10) Patent No.: US 12,526,776 B2
(45) Date of Patent: Jan. 13, 2026

(54) METHOD AND DEVICE FOR HARQ-ACK TRANSMISSION IN WIRELESS COMMUNICATION SYSTEM

(71) Applicant: Samsung Electronics Co., Ltd., Suwon-si (KR)

(72) Inventors: Kyungjun Choi, Suwon-si (KR); Kyunggyu Lee, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 511 days.

(21) Appl. No.: 17/976,044

(22) Filed: Oct. 28, 2022

(65) Prior Publication Data
US 2023/0147760 A1    May 11, 2023

(30) Foreign Application Priority Data
Oct. 29, 2021    (KR) .................. 10-2021-0146988

(51) Int. Cl.
*H04W 72/0446*    (2023.01)
*H04L 1/1812*    (2023.01)
*H04L 27/26*    (2006.01)

(52) U.S. Cl.
CPC ....... *H04W 72/0446* (2013.01); *H04L 1/1812* (2013.01); *H04L 27/26025* (2021.01)

(58) Field of Classification Search
CPC ......... H04W 72/0446; H04L 27/26025; H04L 1/1812
See application file for complete search history.

(56) References Cited

U.S. PATENT DOCUMENTS

2019/0268803 A1    8/2019    He et al.
2021/0050953 A1    2/2021    Park
(Continued)

FOREIGN PATENT DOCUMENTS

WO    2020/133190 A1    7/2020
WO    2021/213384 A1    10/2021
(Continued)

OTHER PUBLICATIONS

3GPP; TSG RAN; NR; Physical layer procedures for control (Release 16)', 3GPP TS 38.213 V16.7.0, Sep. 28, 2021.
(Continued)

*Primary Examiner* — Kevin T Bates
*Assistant Examiner* — Jaeyoung Kwak
(74) *Attorney, Agent, or Firm* — Jefferson IP Law, LLP

(57) ABSTRACT

The disclosure relates to a communication method and system for converging a $5^{th}$-Generation (5G) communication system for supporting higher data rates beyond a $4^{th}$-Generation (4G) system with a technology for Internet of things (IoT). A method for generating a Type-1 hybrid automatic repeat request-acknowledgement (HARQ-ACK) codebook by gathering HARQ-ACK information of multiple PDSCHs when a terminal is scheduled with the multiple physical downlink shared channels (PDSCHs) from one piece of downlink control information (DCI) in a wireless communication system is provided. The terminal may be configured with an uplink cell and a downlink cell having different subcarrier spacings, and may generate the Type-1 HARQ-ACK codebook, based on the subcarrier spacings.

16 Claims, 23 Drawing Sheets

(56) References Cited

U.S. PATENT DOCUMENTS

| | | | |
|---|---|---|---|
| 2022/0131656 A1* | 4/2022 | Lee | H04L 1/1825 |
| 2022/0271873 A1* | 8/2022 | Gao | H04L 1/1854 |
| 2023/0413097 A1* | 12/2023 | Lin | H04L 1/1864 |
| 2024/0039660 A1* | 2/2024 | Zeng | H04L 1/1861 |
| 2024/0163026 A1* | 5/2024 | Li | H04L 5/0044 |

FOREIGN PATENT DOCUMENTS

| | | | |
|---|---|---|---|
| WO | 2023-063707 A1 | 4/2023 | |
| WO | 2023-075519 A1 | 5/2023 | |

OTHER PUBLICATIONS

International Search Report dated Feb. 9, 2023, issued in International Patent Application No. PCT/ KR2022/016736.
Extended European Search Report dated Oct. 31, 2024, issued in European Application No. 22887711.4-1206.
Samsung; PDSCH/PUSCH enhancements for NR from 52.6 GHz to 71 GHz, 3GPP Draft; R1-2105299, vol. RAN WG1, No. e-Meeting, XP052011345, May 12, 2021.
NTT Docomo et al: PDSCH/PUSCH enhancements for NR from 52.6 to 71 GHz, 3GPP Draft; R1-2109669, vol. RAN WG1, No. Electronic Meeting, Oct. 1, 2021.

* cited by examiner

METHOD AND DEVICE FOR HARQ-ACK TRANSMISSION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0146988, filed on Oct. 29, 2021, in the Korean Intellectual Property Office, the disclosure of which is incorporated by reference herein in its entirety.

BACKGROUND

1. Field

The disclosure relates to operations of a terminal and a base station in a wireless communication system. More particularly, the disclosure relates to a hybrid automatic repeat request-acknowledgement (HARQ-ACK) transmission method of indicating whether reception is successful when a terminal receives multiple physical downlink shared channels via single piece of downlink control information, and a device capable of performing the same.

2. Description of Related Art

To meet the demand for wireless data traffic having increased since deployment of fourth-generation (4G) communication systems, efforts have been made to develop an improved fifth-generation (5G) or pre-5G communication system. Therefore, the 5G or pre-5G communication system is also called a 'Beyond 4G Network' or a 'Post long-term evolution (LTE) System'. The 5G communication system is considered to be implemented in higher frequency (millimeter wave (mmWave)) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-Points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described big data processing technology may also be considered to be as an example of convergence between the 5G technology and the IoT technology.

With the advance of wireless communication systems as described above, various services can be provided, and accordingly there is a need for schemes to smoothly provide these services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, aspect of the disclosure is to provide a device and a method capable of effectively providing a service in a mobile communication system.

Additional aspects will be set forth in part in the description which follows and, in part, will be apparent from the description, or may be learned by practice of the presented embodiments.

In accordance with an aspect of the disclosure, a method performed by a user equipment (UE) in a communication system is provided. The method includes receiving, from a base station, a time domain resource allocation (TDRA) table defining respective sets of slot offsets $K_0$, start and length indicators (SLIV), and physical downlink shared channel (PDSCH) mapping type, identifying a set of slot timing values $K_1$, identifying an extended set of slot timing values $K_{1,ext}$, based on the set of slot timing values $K_1$, the sets of slot offsets $K_0$ of the TDRA table, an uplink subcarrier spacing configuration $\mu_{UL}$ and a downlink subcarrier spacing configuration $\mu_{DL}$, and transmitting, to the base station, Type-1 hybrid automatic repeat request acknowledgement (HARQ-ACK) codebook for physical downlink shared channels (PDSCHs) received in slots defined based on the extended set of slot timing values.

In accordance with another aspect of the disclosure, a method performed by a base station in a communication system is provided. The method includes transmitting, to a UE, a TDRA table defining respective sets of slot offsets $K_0$, start and length indicators (SLIV), and PDSCH mapping type, and receiving, from the UE, Type-1 HARQ-ACK codebook for PDSCHs in slots defined based on an extended set of slot timing values, wherein the extended set of slot timing values $K_{1,ext}$ is identified based on a set of slot timing values $K_1$, the set of slot offsets $K_0$ of the TDRA table, an uplink subcarrier spacing configuration $\mu_{UL}$ and a downlink subcarrier spacing configuration $\mu_{DL}$.

In accordance with another aspect of the disclosure, a UE in a communication system is provided. The UE includes a transceiver, and at least one processor configured to receive, from a base station, a TDRA table defining respective sets of slot offsets $K_0$, start and length indicators (SLIV), and PDSCH mapping type, identify a set of slot timing values $K_1$, identify an extended set of slot timing values $K_{1,ext}$ based on the set of slot timing values $K_1$, the sets of slot offsets $K_0$ of the TDRA table, an uplink subcarrier spacing configuration $\mu_{UL}$ and a downlink subcarrier spacing configuration $\mu_{DL}$, and transmit, to the base station, HARQ-ACK codebook for PDSCHs received in slots defined based on the extended set of slot timing values.

In accordance with another aspect of the disclosure, a base station in a communication system is provided. The base station includes a transceiver, and at least one processor configured to transmit, to a UE, a TDRA table defining respective sets of slot offsets $K_0$, start and length indicators (SLIV), and PDSCH mapping type, and receive, from the UE, Type-1 HARQ-ACK codebook for PDSCHs in slots defined based on an extended set of slot timing values, wherein the extended set of slot timing values $K_{1,ext}$ is identified based on a set of slot timing values $K_1$, the set of slot offsets $K_0$ of the TDRA table, an uplink subcarrier spacing configuration $\mu_{UL}$ and a downlink subcarrier spacing configuration $\mu_{DL}$.

Disclosed embodiments provide a device and a method capable of efficiently providing a service in a mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
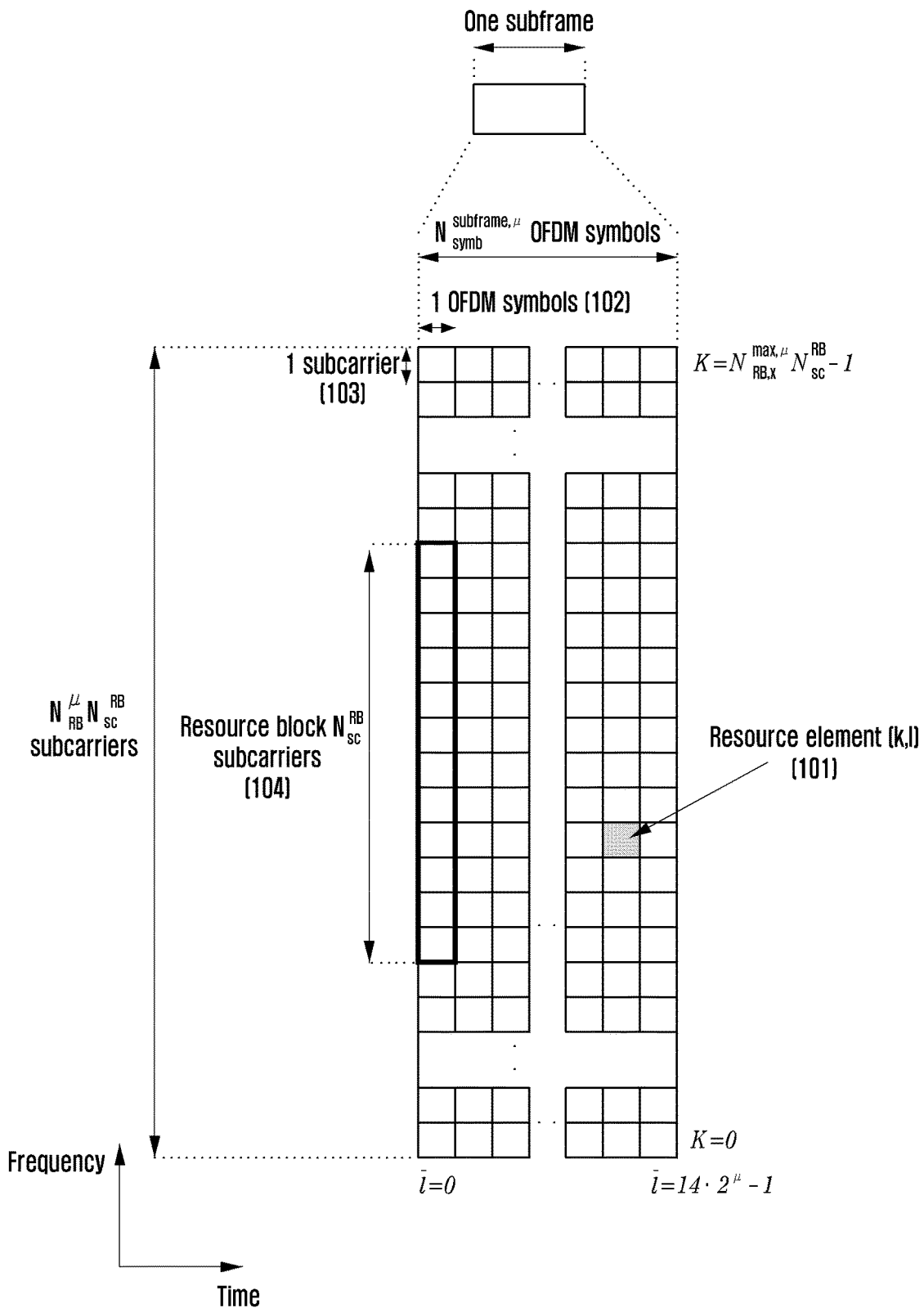
FIG. 1 is a diagram illustrating a basic structure of a time-frequency domain in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Furthermore, in describing the disclosure, a detailed description of known functions or configurations incorporated herein will be omitted when it is determined that the description may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or long term evolution advanced (LTE-A) systems may be described by way of example, but the embodiments of the disclosure may also be applied to other communication systems having similar technical backgrounds or channel types. Examples of such communication systems may include 5th generation mobile communication technologies (5G, new radio (NR)) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, in the embodiments of the disclosure, the "unit" may include one or more processors.

A wireless communication system is advancing to a broadband wireless communication system for providing high-speed and high-quality packet data services using communication standards, such as high-speed packet access (HSPA) of 3rd generation partnership project (3GPP), LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), Institute of Electrical and Electronics Engineers (IEEE) 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

First of all, eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services, such as the Internet of things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time, such as 10 to 16 years, because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and may also require a design for assigning a large number of resources in a frequency band in order to secure reliability of a communication link.

Three services in the 5G communication system, that is, eMBB, URLLC, and mMTC, may be multiplexed and transmitted in a single system. In this case, different transmission/reception techniques and transmission/reception parameters may be used between services in order to satisfy different requirements of the respective services. Of course, the 5G is not limited to the above-described three services.

NR Time-Frequency Resources

Hereinafter, a frame structure of a 5G system will be described with reference to the drawings.

FIG. 1 is a diagram illustrating a basic structure of a time-frequency domain that is a radio resource region in which data or a control channel is transmitted in a 5G system according to an embodiment of the disclosure.

Referring to FIG. 1, a horizontal axis represents a time domain, and a vertical axis represents a frequency domain. A basic unit of a resource in the time and frequency domains is a resource element (RE) 101, and may be defined to be 1 orthogonal frequency division multiplexing (OFDM) symbol 102 on the time axis and 1 subcarrier 103 on the frequency axis. $N_{sc}^{RB}$ (e.g., 12) consecutive REs in the frequency domain may constitute one resource block (RB) 104.

Figure 2:
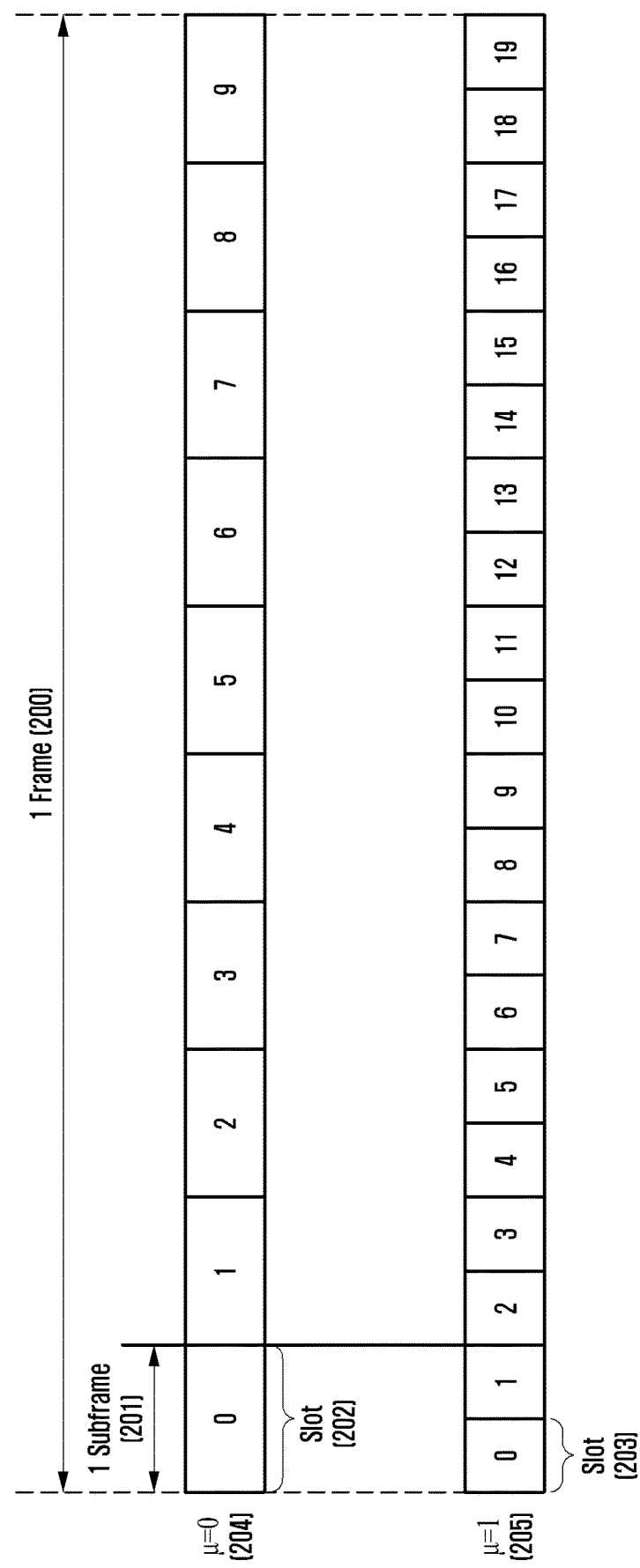
FIG. 2 is a diagram illustrating a frame, a subframe, and a slot structure in the wireless communication system according to an embodiment of the disclosure.

FIG. 2 is a diagram illustrating a frame, a subframe, and a slot structure in the wireless communication system according to an embodiment of the disclosure.

Referring to FIG. 2, it illustrates a frame 200, a subframe 201, and a slot 202 structure. One frame 200 may be defined to be 10 ms. One subframe 201 may be defined to be 1 ms, and thus one frame 200 may include a total of 10 subframes 201. One slot 202 or 203 may be defined to be 14 OFDM symbols (that is, the number of symbols per slot ($N_{symb}^{slot}$=14). One subframe 201 may include one or multiple slots 202 and 203, the number of slots 202 and 203 per subframe 201 may vary according to a configuration value μ 204 or 205 for a subcarrier spacing. In an example of FIG. 2, a case where μ=0_204, and a case where μ=1 205 are illustrated as subcarrier spacing configuration values. If μ=0 (204), one subframe 201 may include one slot 202, and if μ=1 (205), one subframe 201 may include two slots 203. For example, the number ($N_{slot}^{subframe,\mu}$) of slots per subframe may vary according to configuration value μ for a subcarrier spacing, and accordingly, the number ($N_{slot}^{frame,\mu}$) of slots per frame may vary. $N_{slot}^{subframe,\mu}$ and $N_{slot}^{frame,\mu}$ according to respective subcarrier spacing configurations μ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 1-continued

| μ | $N_{symb}^{slot}$ | $N_{slot}^{frame, \mu}$ | $N_{slot}^{subframe, \mu}$ |
|---|---|---|---|
| 2 | 14 | 40 | 4 |
| 3 | 14 | 80 | 8 |
| 4 | 14 | 160 | 16 |
| 5 | 14 | 320 | 32 |

Bandwidth Part (BWP)

Subsequently, a bandwidth part (BWP) configuration in the 5G communication system will be described with reference to the drawings.

Figure 3:
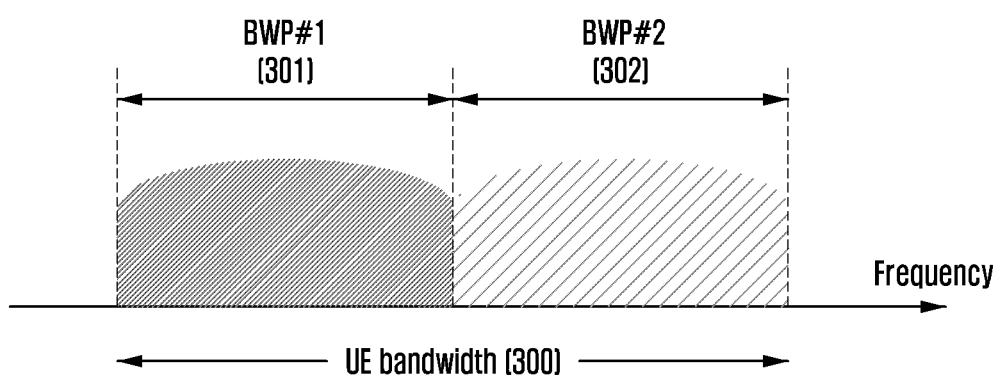
FIG. 3 is a diagram illustrating a bandwidth part configuration in a wireless communication system according to an embodiment of the disclosure.

FIG. 3 is a diagram illustrating a bandwidth part configuration in the wireless communication system according to an embodiment of the disclosure.

Referring to FIG. 3, it illustrates a terminal bandwidth (UE bandwidth) 300 being configured to have two bandwidth parts that are bandwidth part #1 301 and bandwidth part #2 302. A base station may configure one or multiple bandwidth parts for a terminal, and may configure, for each bandwidth part, information as shown in Table 2 below.

TABLE 2

| BWP ::= | SEQUENCE { |
|---|---|
| bwp-Id | BWP-Id, |
| (Bandwidth part identifier) | |
| locationAndBandwidth | INTEGER (1..65536), |
| (Bandwidth part location) | |
| subcarrierSpacing | ENUMERATED {n0, n1, n2, n3, n4, n5}, |
| (Subcarrier spacing) | |
| cyclicPrefix | ENUMERATED { extended } |
| (Cyclic prefix) | |
| } | |

The disclosure is not limited to the above example, and in addition to the configuration information, various parameters related to a bandwidth part may be configured for the terminal. The base station may transfer the information to the terminal via higher layer signaling, for example, radio resource control (RRC) signaling. At least one bandwidth part among the configured one or multiple bandwidth parts may be activated. Whether the configured bandwidth part is active may be transferred from the base station to the terminal in a semi-static manner via RRC signaling or may be dynamically transferred via downlink control information (DCI).

According to some embodiments of the disclosure, the base station may configure an initial bandwidth part (BWP) for initial access, via a master information block (MIB), for the terminal before an RRC connection. More specifically, during initial access, the terminal may receive configuration information for a search space and a control area (control resource set (CORESET)) in which a PDCCH for receiving system information (which may correspond to remaining system information (RMSI) or system information block 1 (SIB1)) required for the initial access may be transmitted via the MIB. Each of the search space and the control area configured via the MIB may be considered to be identifier (identity (ID)) 0. The base station may notify, via the MIB, the terminal of configuration information, such as frequency allocation information, time allocation information, and numerology for control area #0. In addition, the base station may notify, via the MIB, the terminal of configuration information for a monitoring periodicity and occasion for control area #0, that is, the configuration information for search space #0. The terminal may consider a frequency domain configured to control area #0, which is acquired from the MIB, as an initial bandwidth part for initial access. In this case, an identity (ID) of the initial bandwidth part may be considered to be 0.

The configuration of a bandwidth part supported by 5G may be used for various purposes.

According to some embodiments of the disclosure, if a bandwidth supported by the terminal is smaller than a system bandwidth, this may be supported via the bandwidth part configuration. For example, the base station may configure, for the terminal, a frequency position (configuration information 2) of the bandwidth part, and the terminal may thus transmit or receive data at a specific frequency position within the system bandwidth.

According to some embodiments of the disclosure, for the purpose of supporting different numerologies, the base station may configure multiple bandwidth parts for the terminal. For example, in order to support both data transmission or reception using a subcarrier spacing of 15 kHz and a subcarrier spacing of 30 kHz for a terminal, two bandwidth parts may be configured with the subcarrier spacings of 15 kHz and 30 kHz, respectively. Different bandwidth parts may be frequency-division-multiplexed, and when data is to be transmitted or received at a specific subcarrier spacing, a bandwidth part configured with the subcarrier spacing may be activated.

According to some embodiments of the disclosure, for the purpose of reducing power consumption of the terminal, the base station may configure, for the terminal, bandwidth parts having different bandwidth sizes. For example, if the terminal supports a very large bandwidth, for example, a bandwidth of 100 MHz, and always transmits or receives data via the corresponding bandwidth, very large power consumption may occur. In particular, in a situation where there is no traffic, it may be very inefficient, in terms of power consumption, to perform monitoring for an unnecessary downlink control channel with a large bandwidth of 100 MHz. For the purpose of reducing the power consumption of the terminal, the base station may configure, for the terminal, a bandwidth part of a relatively small bandwidth, for example, a bandwidth part of 20 MHz. In the situation where there is no traffic, the terminal may perform monitoring in the bandwidth part of 20 MHz, and when data is generated, the terminal may transmit or receive the data by using the bandwidth part of 100 MHz according to an indication of the base station.

In the method for configuring the bandwidth part, terminals before an RRC connection may receive configuration information for an initial bandwidth part via a master information block (MIB) during initial access. More specifically, a terminal may be configured for a control area (control resource set (CORESET)) for a downlink control channel through which downlink control information (DCI) for scheduling of a system information block (SIB) may be transmitted from an MIB of a physical broadcast channel (PBCH). The bandwidth of the control area, which is configured via the MIB, may be considered to be the initial bandwidth part, and the terminal may receive a physical downlink shared channel (PDSCH), through which the SIB is transmitted, via the configured initial bandwidth part. In addition to reception of the SIB, the initial bandwidth part may be used for other system information (OSI), paging, and random access.

Change of Bandwidth Part (BWP)

When one or more bandwidth parts are configured for the terminal, the base station may indicate the terminal to change (or switching or transition) a bandwidth part, by using a bandwidth part indicator field in DCI. For example, in FIG. 3, if a currently active bandwidth part of the terminal is bandwidth part #1 301, the base station may indicate bandwidth part #2 302 to the terminal via the bandwidth part indicator in the DCI, and the terminal may switch the bandwidth part to bandwidth part #2 302 indicated via the bandwidth part indicator in the received DCI.

As described above, the DCI-based switching of the bandwidth part may be indicated by the DCI for scheduling of a PDSCH or PUSCH, and therefore when a request for switching a bandwidth part is received, the terminal may need to receive or transmit the PDSCH or PUSCH scheduled by the corresponding DCI, with ease in the switched bandwidth part. To this end, in the standard, requirements for a delay time ($T_{BWP}$) required when a bandwidth part is switched are regulated, and may be defined as shown in Table 3, for example.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the larger one between the SCS before BWP switch and the SCS after BWP switch.

The requirements for a bandwidth part switch delay time support type 1 or type 2 according to capability of the terminal. The terminal may report a supportable bandwidth part delay time type to the base station.

According to the aforementioned requirements for the bandwidth part switch delay time, when the terminal receives DCI including the bandwidth part switch indicator in slot n, the terminal may complete switching to a new bandwidth part indicated by the bandwidth part switch indicator at a time point no later than slot n+$T_{BWP}$, and may perform transmission or reception for a data channel scheduled by the corresponding DCI in the switched new bandwidth part. When the base station is to schedule a data channel with a new bandwidth part, time domain resource allocation for the data channel may be determined by considering the bandwidth part switch delay time ($T_{BWP}$) the terminal. For example, in a method of determining time domain resource allocation for a data channel when the base station schedules the data channel with a new bandwidth part, scheduling of the data channel may be performed after a bandwidth part switch delay time. Accordingly, the terminal may not expect that DCI indicating bandwidth part switching indicates a value of a slot offset (K0 or K2) smaller than a value of the bandwidth part switch delay time ($T_{BWP}$).

If the terminal receives DCI (for example, DCI format 1_1 or 0_1) indicating bandwidth part switching, the terminal may not perform any transmission or reception during a time interval from a third symbol of a slot in which a PDCCH including the DCI is received to a start point of a slot indicated by a slot offset (K0 or K2) value indicated via a time domain resource allocation indicator field in the DCI. For example, when the terminal receives the DCI indicating bandwidth part switching in slot n, and a slot offset value indicated by the DCI is K, the terminal may not perform any transmission or reception from a third symbol of slot n to a symbol before slot n+K (i.e., the last symbol in slot n+K−1).

SS/PBCH Block

In the following, a synchronization signal (SS)/PBCH block in 5G will be described.

The SS/PBCH block may refer to a physical layer channel block including a primary SS (PSS), a secondary SS (SSS), and a PBCH. Detailed descriptions are as follows.

PSS: A PSS is a signal that serves as a reference for downlink time/frequency synchronization, and provides some information of a cell ID.

SSS: An SSS serves as a reference for downlink time/frequency synchronization, and provides the remaining cell ID information that is not provided by a PSS. Additionally, the SSS may serve as a reference signal for demodulation of a PBCH.

PBCH: A PBCH provides essential system information necessary for transmission or reception of a data channel and a control channel of a terminal. The essential system information may include search space-related control information indicating radio resource mapping information of a control channel, scheduling control information on a separate data channel for transmitting system information, and the like.

SS/PBCH block: An SS/PBCH block includes a combination of a PSS, an SSS, and a PBCH. One or multiple SS/PBCH blocks may be transmitted within 5 ms, and each transmitted SS/PBCH block may be distinguished by an index.

The terminal may detect a PSS and an SSS during initial access and may decode a PBCH. The MIB may be obtained from the PBCH, and control area (control resource set (CORESET))#0 (which may correspond to a control area having a control area index of 0) may be configured therefrom. The terminal may perform monitoring on control area #0 while assuming that a selected SS/PBCH block and a demodulation reference signal (DMRS) transmitted in control area #0 are quasi co-located (QCL). The terminal may receive system information as downlink control information transmitted in control area #0. The terminal may acquire random-access channel (RACH)-related configuration information required for initial access from the received system information. The terminal may transmit a physical RACH (PRACH) to the base station based on a selected SS/PBCH index, and the base station having received the PRACH may acquire information on the SS/PBCH block index selected by the terminal. The base station may identify a block that the terminal has selected from among respective SS/PBCH blocks and may identify that control area #0 associated with the selected block is monitored.

PDCCH: Related to DCI

Subsequently, downlink control information (DCI) in the 5G system will be described below.

In the 5G system, scheduling information for uplink data (or physical uplink data channel (physical uplink shared channel (PUSCH))) or downlink data (or physical downlink data channel (physical downlink shared channel (PDSCH))) is transferred from the base station to the terminal via DCI. The terminal may monitor a fallback DCI format and a non-fallback DCI format for the PUSCH or the PDSCH. The fallback DCI format may include a fixed field predefined between the base station and the terminal, and the non-fallback DCI format may include a configurable field.

The DCI may be transmitted on a physical downlink control channel (PDCCH) via channel coding and modulation. A cyclic redundancy check (CRC) is attached to a DCI message payload, and may be scrambled with a radio network temporary identifier (RNTI) corresponding to the identity of the terminal. Different RNTIs may be used according to a purpose of the DCI message, for example, terminal-specific (UE-specific) data transmission, a power control command, a random-access response, or the like. In other words, the RNTI is not transmitted explicitly, but is included in CRC calculation and transmitted. When the DCI message transmitted on the PDCCH is received, the terminal may check the CRC by using an assigned RNTI and may determine, if a CRC check result is correct, that the message is transmitted to the terminal.

For example, DCI for scheduling of a PDSCH for system information (SI) may be scrambled with an SI-RNTI. DCI for scheduling of a PDSCH for a random-access response (RAR) message may be scrambled with an RA-RNTI. DCI for scheduling of a PDSCH for a paging message may be scrambled with a P-RNTI. DCI for notification of a slot format indicator (SFI) may be scrambled with an SFI-RNTI. DCI for notification of a transmit power control (TPC) may be scrambled with a TPC-RNTI. DCI for scheduling of a UE-specific PDSCH or PUSCH may be scrambled with a cell RNTI (C-RNTI).

DCI format 0_0 may be used as fallback DCI for scheduling of a PUSCH, wherein a CRC is scrambled with a C-RNTI. DCI format 0_0 in which the CRC is scrambled with the C-RNTI may include, for example, information in Table 4 below.

TABLE 4

- Identifier for DCI formats - [1] bit
- Frequency domain resource assigment - $\lceil \log_2(N_{RB}^{UL,BWP}(N_{RB}^{UL,BWP}+1)/2) \rceil$ bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- Transmit power control (TPC) command for scheduled PUSCH - [2] bits
- Uplink (UL)/supplementary UL (SUL) indicator - 0 or 1 bit DCI format 0_1 may be used as non-fallback DCI for scheduling of a PUSCH, wherein a CRC is scrambled with a C-RNTI. DCI format 0_1 in which the CRC is scrambled with the C-RNTI may include, for example, information in Table 5 below.

TABLE 5

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP}+1)/2 \rceil$ bits
Time domain resource assignment - 1, 2, 3, or 4 bits
Virtual resource block (VRB)-to-physical resource block (PRB) mapping - 0 or 1 bit, only for resource allocation type 1.
  0 bit if only resource allocation type 0 is configured;
  1 bit otherwise.
Frequency hopping flag - 0 or 1 bit, only for resource allocation type 1.
  0 bit if only resource allocation type 0 is configured;
  1 bit otherwise.
Modulation and coding scheme - 5 bits
New data indicator - 1 bit
Redundancy version - 2 bits
HARQ process number - 4 bits
1st downlink assignment index - 1 bit or 2 bits
  1 bit for semi-static HARQ-ACK codebook;
  2 bits for dynamic HARQ-ACK codebook with single HARQ-ACK codebook.
2nd downlink assignment index - 0 or 2 bits
  2 bits for dynamic HARQ-ACK codebook with two HARQ-ACK sub-codebooks;
  0 bit otherwise.
TPC command for scheduled PUSCH - 2 bits SRS resource indicator - $\left\lceil \log_2\left(\sum_{k=1}^{L_{max}}\binom{N_{SRS}}{k}\right)\right\rceil$ or $\lceil \log_2(N_{SRS}) \rceil$ bits $\left\lceil \log_2\left(\sum_{k=1}^{L_{max}}\binom{N_{SRS}}{k}\right)\right\rceil$ bits for non-codebook based PUSCH transmission;
  $\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
Code block group (CBG) transmission information - 0, 2, 4, 6, or 8 bits
Phase tracking reference signal-demodulation reference signal relationship (PTRS-DMRS association) - 0 or 2 bits.
  beta offset indicator - 0 or 2 bits
Demodulation reference signal (DMRS) sequence initialization - 0 or 1 bit DCI format 1_0 may be used as fallback DCI for scheduling of a PDSCH, wherein a CRC is scrambled with a C-RNTI. DCI format 0_1 in which the CRC is scrambled with the C-RNTI may include, for example, information in Table 6 below.

TABLE 6

- Identifier for DCI formats - [1] bit
- Frequency domain resource assigment -
[[$\log_2(N_{RB}^{DL,BWP}(N_{RB}^{DL,BWP} +1)/2)$]] bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- TPC command for scheduled PUSCH - [2] bits
- Physical uplink control channel (PUCCH) resource indicator - 3 bits
- PDSCH-to-HARQ feedback iming indicator - [3] bits DCI format 1_1 may be used as non-fallback DCI for scheduling of a PDSCH, wherein a CRC is scrambled with a C-RNTI. DCI format 1_1 in which the CRC is scrambled with the C-RNTI may include, for example, information in Table 7 below.

TABLE 7

- Carrier indicator - 0 or 3 bits
- Identifier for DCI formats - [1] bits
- Bandwidth part indicator - 0, 1 or 2 bits
- Frequency domain resource assigment
  • For resource allocation type 0, [$N_{RB}^{DL,\ BWP} / P$] bits
  • For resource allocation type 1, [$\log_2(N_{RB}^{DL,BWP}(N_{RB}^{DL,BWP} +1)/2$] bits
- Time domain resource assigment -1, 2, 3, or 4 bits
- VRB-to-PRB mapping - 0 or 1 bit, only for resource allocation type 1.
  • 0 bit if only resource allocation type 0 is configured;
  • 1 bit otherwise.
- Physical resource block (PRB) bundling size indicator - 0 or 1 bit
- Rate matching indicator - 0, 1, or 2 bits
- Zero power channel state information reference signal (ZP CSI-RS) trigger - 0, 1, or 2 bits
For transport block 1 (for first transport block):
- Modulation and coding scheme - 5 bits
- New data indicator - 1 bit
- Redundancy version - 2 bits
For transport block 2 (for second transport block):
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmision configuration indication - 0 or 3 bits
- SRS request - 2 bits
- CBG transmission information - 0, 2, 4, 6, or 8 bits
- Code block group (CBG) flushing out information - 0 or 1 bit
- DMRS sequence initialization - 1 bit- DMRS sequence initialization - 1 bit PDCCH: CORESET, REG, CCE, and Search Space Hereinafter, a downlink control channel in the 5G communication system will be described with reference to the drawings.

Figure 4:
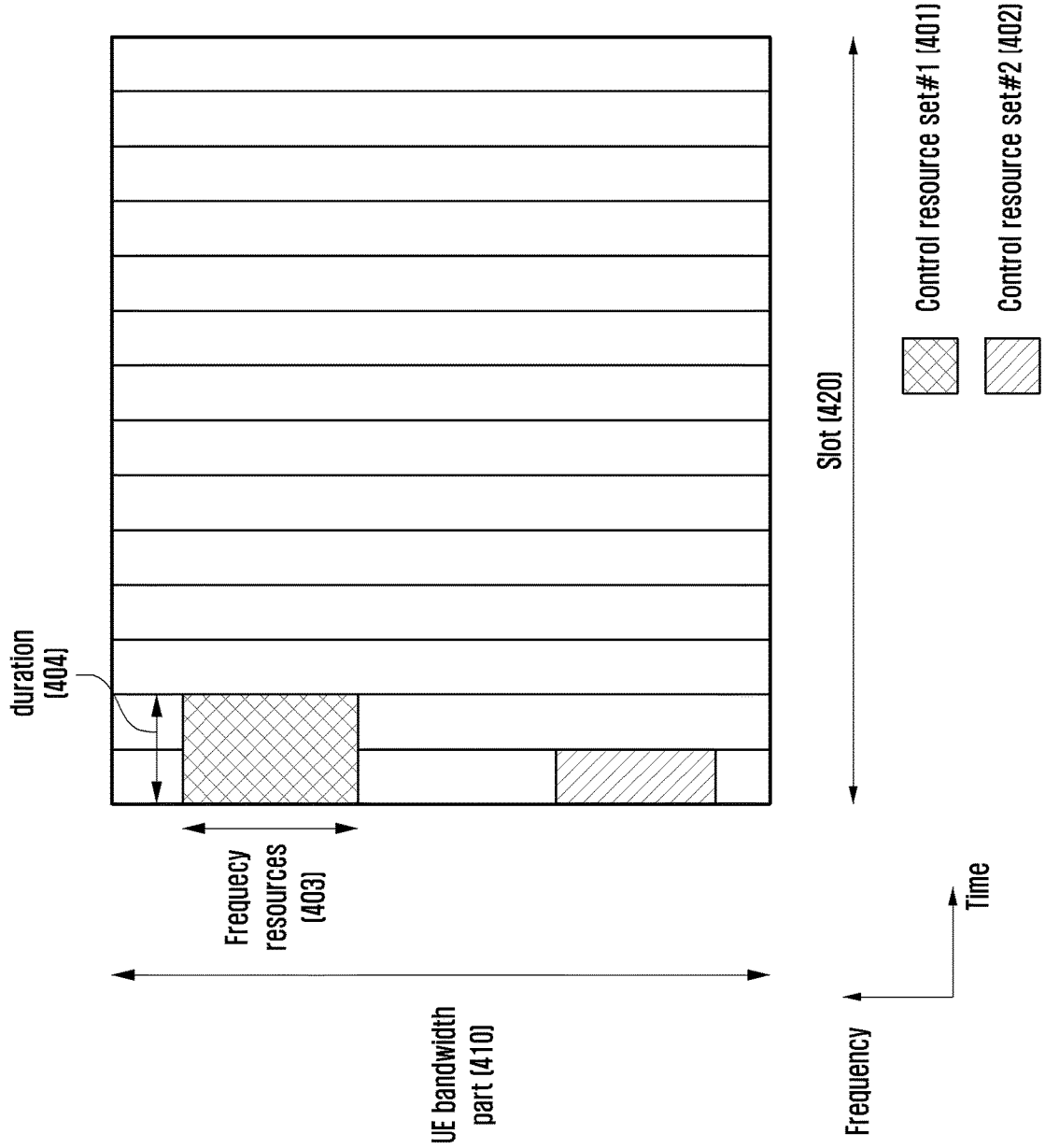
FIG. 4 is a diagram illustrating a control area configuration of a downlink control channel in a wireless communication system according to an embodiment of the disclosure.

FIG. 4 is a diagram illustrating a control area (control resource set (CORESET)) in which a downlink control channel is transmitted in the 5G wireless communication system according to an embodiment of the disclosure.

Referring to FIG. 4, it illustrates a terminal bandwidth part 410 (UE bandwidth part) being configured on the frequency axis, and two control areas (control area #1 401 and control area #2 402) are configured within one slot 420 on the time axis. The control areas 401 and 402 may be configured in a specific frequency resource 403 within the entire terminal bandwidth part 410 on the frequency axis. One or multiple OFDM symbols may be configured on the time axis and may be defined as a control area duration (control resource set duration) 404. Referring to the example illustrated in FIG. 4, control area #1 401 is configured to a control area duration of 2 symbols, and control area #2 402 is configured to a control area duration of 1 symbol.

The aforementioned control area in 5G may be configured for the terminal by the base station via higher layer signaling (e.g., system information, a master information block (MIB), and radio resource control (RRC) signaling). Configuring the control area for the terminal may refer to providing information, such as an identifier (identity) of the control area, a frequency position of the control area, and a symbol length of the control area. For example, information in Table 8 below may be included.

TABLE 8

```
ControlResourceSet ::=          SEQUENCE {
 -- Corresponds to L1 parameter 'CORESET-ID'
 controlResourceSetId           ControlResourceSetId,
  (control are identity)
 frequencyDomainResources       BIT STRING (SIZE (45)),
  (Frequency axis resource allocation information)
 duration                       INTEGER (1..maxCoReSetDuration),
  (Time axis resource allocation information)
 cce-REG-MappingType            CHOICE {
  (CCE-to-REG mapping scheme)
   interleaved                  SEQUENCE {
    reg-BundleSize              ENUMERATED {n2, n3, n6},
   (REG bundle size)
    precoderGranularity         ENUMERATED
{sameAsREG-bundle, allContiguousRBs},
    interleaverSize             ENUMERATED {n2, n3, n6}
   (Interleaver size)
    shiftIndex
  INTEGER(0..maxNrofPhysicalResourceBlocks-1)
  OPTIONAL
   (Interleaver shift)
   },
   nonInterleaved               NULL
  },
  tci-StatesPDCCH               SEQUENCE(SIZE (1..maxNrofTCI-
 StatesPDCCH)) OF TCI-StateId   OPTIONAL,
   (QCL configuration information)
  tci-PresentInDCI              ENUMERATED {enabled}
    OPTIONAL,-- Need S
}
```

In Table 8, tci-StatesPDCCH (simply, referred to as a transmission configuration indication (TCI) state) configuration information may include information on one or multiple synchronization signal (SS)/physical broadcast channel (PBCH) block indices or channel state information reference signal (CSI-RS) indices having the quasi co-location (QCL) relationship with a DMRS transmitted in the corresponding control area.

Figure 5:
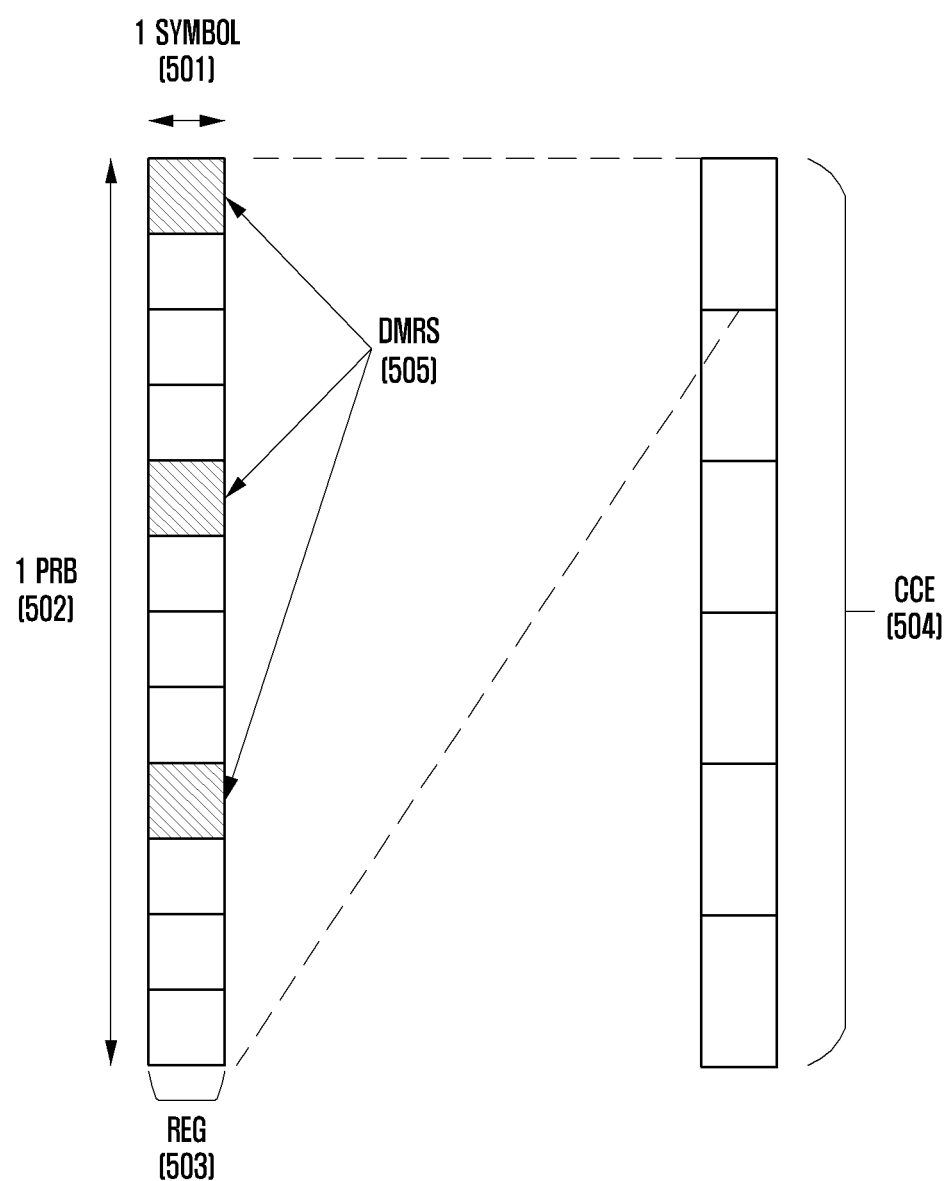
FIG. 5 is a diagram illustrating a structure of a downlink control channel in a wireless communication system according to an embodiment of the disclosure.

FIG. 5 is a diagram illustrating a basic unit of time and frequency resources constituting a downlink control channel which may be used in 5G according to an embodiment of the disclosure.

Referring to FIG. 5, a basic unit of time and frequency resources constituting a control channel is referred to as a resource element group (REG) 503, and an REG 503 may be defined to have 1 OFDM symbol 501 on the time axis and 1 physical resource block (PRB) 502, that is, 12 subcarriers, on the frequency axis. A base station may configure a downlink control channel allocation unit by concatenation with the REG 503.

Referring to FIG. 5, when a basic unit for allocation of a downlink control channel in 5G is a control channel element (CCE) 504, 1 CCE 504 may include multiple REGs 503. When the REG 503 illustrated in FIG. 5 is described as an example, the REG 503 may include 12 REs, and if 1 CCE 504 includes 6 REGs 503, 1 CCE 504 may include 72 REs. When a downlink control area is configured, the corresponding area may include multiple CCEs 504, and a specific downlink control channel may be mapped to one or multiple CCEs 504 so as to be transmitted according to an aggregation level (AL) within the control area. The CCEs 504 within the control area are classified by numbers, and the numbers of the CCEs 504 may be assigned according to a logical mapping scheme.

The basic unit of the downlink control channel illustrated in FIG. 5, that is, the REG 503, may include both REs, to which DCI is mapped, and an area to which a DMRS 505, which is a reference signal for decoding the REs, is mapped. As shown in FIG. 5, 3 DMRSs 505 may be transmitted in 1 REG 503. The number of CCEs required to transmit a PDCCH may be 1, 2, 4, 8, or 16 depending on an aggregation level (AL), and different numbers of CCEs may be used to implement link adaptation of the downlink control channel. For example, if AL=L, a single downlink control channel may be transmitted via L CCEs. The terminal needs to detect a signal without knowing information on the downlink control channel, wherein a search space representing a set of CCEs is defined for blind decoding. The search space is a set of downlink control channel candidates including CCEs, for which the terminal needs to attempt decoding on a given aggregation level, and since there are various aggregation levels that make one bundle with 1, 2, 4, 8, or 16 CCEs, the terminal may have multiple search spaces. The search space set may be defined to be a set of search spaces at all configured aggregation levels.

The search space may be classified into a common search space and a terminal-specific (UE-specific) search space. A certain group of terminals or all terminals may examine a common search space of the PDCCH in order to receive cell-common control information, such as dynamic scheduling for system information or a paging message. For example, PDSCH scheduling assignment information for transmission of an SIB including cell operator information, or the like, may be received by examining the common search space of the PDCCH. Since a certain group of terminals or all terminals need to receive the PDCCH, the common search space may be defined as a set of predetermined CCEs. Scheduling allocation information for UE-specific PDSCH or PUSCH may be received by examining the UE-specific search space of the PDCCH. The UE-specific search space may be defined UE-specifically, based on an identity of the terminal and functions of various system parameters.

In 5G, a parameter for the search space of the PDCCH may be configured by the base station for the terminal via higher layer signaling (e.g., SIB, MIB, and RRC signaling). For example, the base station may configure, for the terminal, the number of PDCCH candidates at each aggregation level L, a monitoring periodicity for a search space, a monitoring occasion in units of symbols in the slot for the search space, a search space type (common search space or UE-specific search space), a combination of an RNTI and a DCI format, which is to be monitored in the search space, a control area index for monitoring of the search space, or the like. For example, information in Table 9 below may be included.

TABLE 9

```
SearchSpace ::=                          SEQUENCE {
  -- Identity of the search space. SearchSpaceId = 0 identifies the
  SearchSpace configured via PBCH (MIB) or ServingCellConfigCommon.
  searchSpaceId                          SearchSpaceId,
    (Search space identifier)
  controlResourceSetId                   ControlResourceSetId,
    (control area identifier)
  monitoringSlotPeriodicityAndOffset     CHOICE {
    (Monitoring slot level period)
      sl1                                NULL,
      sl2                                INTEGER (0..1),
      sl4                                INTEGER (0..3),
      sl5                                INTEGER (0..4),
      sl8                                INTEGER (0..7),
      sl10                               INTEGER (0..9),
      sl16                               INTEGER (0..15),
      sl20                               INTEGER (0..19)
  }
      OPTIONAL,
    duration (monitoring duration)       INTEGER (2..2559)
  monitoringSymbolsWithinSlot            BIT STRING (SIZE (14))
      OPTIONAL,
    (Monitoring symbol in slot)
  nrofCandidates                         SEQUENCE {
    (The number of PDCCH candidates at each aggregation level)
      aggregationLevel1                  ENUMERATED {n0, n1, n2,
  n3, n4, n5, n6, n8},
      aggregationLevel2                  ENUMERATED {n0, n1, n2,
  n3, n4, n5, n6, n8},
      aggregationLevel4                  ENUMERATED {n0, n1, n2,
  n3, n4,n5, n6, n8},
      aggregationLevel8                  ENUMERATED {n0, n1, n2,
  n3, n4,n5, n6, n8},
      aggregationLevel16                 ENUMERATED {n0, n1, n2,
  n3, n4, n5, n6, n8}
  },
  searchSpaceType                        CHOICE {
    (Search space type)
    -- Configures this search space as common search space (CSS) and
  DCI formats to monitor.
      common                             SEQUENCE {
    (Common search space)
      }
      ue-Specific                        SEQUENCE {
    (UE-specific search space)
        -- Indicates whether the UE monitors in this USS for DCI formats
  0-0 and 1-0 or for formats 0-1 and 1-1.
        formats                          ENUMERATED {formats0-0-
  And-1-0, formats0-1-And-1-1},
        ...
}
```

According to configuration information, the base station may configure one or multiple search space sets for the terminal. According to some embodiments of the disclosure, the base station may configure search space set 1 and search space set 2 for the terminal, may configure DCI format A, which is scrambled with an X-RNTI in search space set 1, to be monitored in the common search space, and may configure DCI format B, which is scrambled with a Y-RNTI in search space set 2, to be monitored in the UE-specific search space.

According to the configuration information, one or multiple search space sets may exist in the common search space or the UE-specific search space. For example, search space set #1 and search space set #2 may be configured to be a common search space, and search space set #3 and search space set #4 may be configured to be a UE-specific search space.

In the common search space, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI
DCI format 2_1 with CRC scrambled by INT-RNTI
DCI format 2_2 with CRC scrambled by TPC-PUSCH-RNTI, TPC-PUCCH-RNTI
DCI format 2_3 with CRC scrambled by TPC-SRS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI
DCI format 1_0/1_1 with CRC scrambled by C-RNTI, CS-RNTI, TC-RNTI The specified RNTIs may follow definitions and uses below.

Cell RNTI (C-RNTI): Used for UE-specific PDSCH scheduling
Temporary cell RNTI (TC-RNTI): Used for UE-specific PDSCH scheduling
Configured scheduling RNTI (CS-RNTI): Used for semi-statically configured UE-specific PDSCH scheduling
Random access RNTI (RA-RNTI): Used for scheduling PDSCH at random access stage
Paging RNTI (P-RNTI): Used for scheduling PDSCH on which paging is transmitted
System information RNTI (SI-RNTI): Used for scheduling PDSCH on which system information is transmitted
Interruption RNTI (INT-RNTI): For indicating whether to puncture PDSCH
Transmit power control for PUSCH RNTI (TPC-PUSCH-RNTI): For indicating power control command for PUSCH
Transmit power control for PUCCH RNTI (TPC-PUCCH-RNTI): For indicating power control command for PUCCH
Transmit power control for SRS RNTI (TPC-SRS-RNTI): For indicating power control command for SRS The aforementioned DCI formats may conform to the following definition as in the example of Table 10.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space of aggregation level L in search space set s, and control area p may be expressed as Equation 1 below.

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i \quad \text{Equation 1}$$

L: aggregation level
$n_{CI}$: carrier index $N_{CCE,p}$: the total number of CCEs existing in control area p
$n_{s,f}^\mu$: slot index
$M_{s,max}^{(L)}$: the number of PDCCH candidates for aggregation level L
$m_{s,n_{CI}} = 0, \ldots, M_{s,max}^{(L)} - 1$: PDCCH candidate index of aggregation level L
$i = 0, \ldots, L-1$ $$Y_{p,n_{s,f}^\mu} = \left( A_p \cdot Y_{p,n_{s,f}^\mu - 1} \right) \bmod D,$$

$Y_{p,-1} = n_{RNTI} \neq 0$, $A_p = 39827$ for p mod 3=0, $A_p = 39829$ for p mod 3=1, $A_p = 39839$ for p mod 3=2, and D=65537
$n_{RNTI}$: UE identifier A value of $Y_{p,n_{s,f}^\mu}$ may correspond to 0 in the common search space.

In the UE-specific search space, a value of $Y_{p,n_{s,f}^\mu}$ may correspond to a value that varies depending on a time index and the identity (ID configured for the terminal by the base station or C-RNTI) of the terminal.

In 5G, multiple search space sets may be configured by different parameters (e.g., parameters in Table 9), and therefore a set of search spaces monitored by the terminal at each time point may vary. For example, if search space set #1 is configured in an X-slot period, search space set #2 is configured in a Y-slot period, and X and Y are thus different from each other, the terminal may monitor both search space set #1 and search space set #2 in a specific slot, and may monitor one of search space set #1 and search space set #2 in the specific slot.

PDCCH: BD/CCE Limit

When multiple search space sets are configured for the terminal, the following conditions may be considered for a method of determining a search space set required to be monitored by the terminal.

If the terminal is configured with a value of monitoringCapabilityConfig-r16, which is higher layer signaling, via r15monitoringcapability, the terminal may define, for each slot, a maximum value for the number of PDCCH candidates that may be monitored and for the number of CCEs constituting the entire search space (here, the entire search space refers to all CCE sets corresponding to a union area of multiple search space sets), and if a value of monitoringCapabilityConfig-r16 is configured via r16monitoringcapability, the terminal may define, for each span, a maximum value for the number of PDCCH candidates that may be monitored and for the number of CCEs constituting the entire search space (here, the entire search space may refer to all CCE sets corresponding to a union area of multiple search space sets).

Condition 1: Limiting the Maximum Number of PDCCH Candidates

As described above, according to a configuration value of higher layer signaling, $M^\mu$ which is the maximum number of PDCCH candidates that may be monitored by the terminal may, for example, conform to Table 11 below when defined based on slot, and may conform to Table 12 below when defined based on span, in a cell configured with a subcarrier spacing of $15 \cdot 2^\mu$ kHz.

TABLE 11

| $\mu$ | Maximum number of PDCCH candidates per slot and per serving cell ($M^\mu$) |
|---|---|
| 0 | 44 |
| 1 | 36 |
| 2 | 22 |
| 3 | 20 |

TABLE 12

| | Maximum number $M^\mu$ of monitored PDCCH candidates per span for combination (X, Y) and per serving cell | | |
|---|---|---|---|
| $\mu$ | (2, 2) | (4, 3) | (7, 3) |
| 0 | 14 | 28 | 44 |
| 1 | 12 | 24 | 36 |

Condition 2: Limiting the Maximum Number of CCEs

As described above, according to a configuration value of higher layer signaling, $C^\mu$ which is the maximum number of CCEs constituting the entire search space (here, the entire search space refers to all CCE sets corresponding to a union area of multiple search space sets) may, for example, conform to Table 13 below when defined based on slot, and may conform to Table 14 below when defined based on span, in a cell configured with a subcarrier spacing of $15 \cdot 2^\mu$ kHz.

TABLE 13

| $\mu$ | Maximum number of non-overlapped CCEs per slot and per serving cell ($C^\mu$) |
|---|---|
| 0 | 56 |
| 1 | 56 |
| 2 | 48 |
| 3 | 32 |

TABLE 14

| | Maximum number $C^\mu$ of non-overlapped CCEs per span for combination (X, Y) and per serving cell | | |
|---|---|---|---|
| $\mu$ | (2, 2) | (4, 3) | (7, 3) |
| 0 | 18 | 36 | 56 |
| 1 | 18 | 36 | 56 |

For the convenience of description, a situation in which both conditions 1 and 2 are satisfied at a specific time point is defined as "condition A". Therefore, not satisfying condition A may refer to not satisfying at least one of conditions 1 and 2.

PDCCH: Overbooking

According to configurations of the search space sets by the base station, a case in which condition A is not satisfied at a specific time point may occur. If condition A is not satisfied at a specific time point, the terminal may select and monitor only some of the search space sets configured to satisfy condition A at the corresponding time point, and the base station may transmit a PDCCH in the selected search space sets.

The method of selecting some search spaces from the entire configured search space set may conform to the following methods.

If condition A for PDCCH is not satisfied at a specific time point (slot), the terminal (or base station) may select a search space set, in which a search space type is configured to be a common search space, preferentially over a search space set configured to be a UE-specific search space, from among search space sets existing at the corresponding time point.

If all the search space sets configured to be the common search space are selected (that is, if condition A is satisfied even after all the search spaces configured to be the common search space are selected), the terminal (or base station) may select the search space sets configured to be the UE-specific search space. In this case, if there are multiple search space sets configured to be the UE-specific search spaces, a search space set having a low search space set index may have a higher priority. Based on the priority, the UE-specific search space sets may be selected within a range in which condition A is satisfied.

Related to Rate Matching/Puncturing

In the following, a rate matching operation and a puncturing operation are described below.

When time and frequency resources A, in which predetermined symbol sequence A is to be transmitted, overlap predetermined time and frequency resources B, a rate matching or puncturing operation may be considered as a transmission/reception operation of channel A based on domain resource C in which resources A and resources B overlap each other. A detailed operation may follow the content below.

Rate Matching Operation

The base station may transmit, to the terminal, channel A by mapping the same only to resource areas remaining after excluding, from all resources A for transmission of symbol sequence A, resource C corresponding to an area in which resources A overlap resource B. For example, when symbol sequence A includes {symbol #1, symbol #2, symbol #3, symbol #4}, resources A are {resource #1, resource #2, resource #3, resource #4}, and resources B are {resource #3, resource #5}, the base station may sequentially map symbol sequence A to resources {resource #1, resource #2, resource #4} remaining after excluding, from resources A, {resource #3} which corresponds to resource C, so as to transmit the same. As a result, the base station may map the symbol sequence {symbol #1, symbol #2, symbol #3} to {resource #1, resource #2, resource #4}, respectively, so as to transmit the same.

The terminal may determine resources A and resources B from scheduling information for symbol sequence A from the base station, and may determine, based thereof, resource C that is an area in which resources A and resources B overlap each other. The terminal may receive symbol sequence A, based on an assumption that symbol sequence A has been mapped to and transmitted in the areas remaining after excluding resource C from all resources A. For example, when symbol sequence A includes {symbol #1, symbol #2, symbol #3, symbol #4}, resources A are {resource #1, resource #2, resource #3, resource #4}, and resources B are {resource #3, resource #5}, the terminal may receive symbol sequence A, based on an assumption that symbol sequence A has been sequentially mapped to the resources {resource #1, resource #2, resource #4} which are remaining after excluding, from resources A, {resource #3} which corresponds to resource C. As a result, the terminal may perform a series of reception operation later based on the assumption that the symbol sequence {symbol #1, symbol #2, symbol #3} is mapped to and transmitted in {resource #1, resource #2, resource #4}, respectively.

Puncturing Operation

When there is resource C corresponding to the area in which all resources A for transmission of symbol sequence A to the terminal overlap resources B, the base station may map symbol sequence A to all resources A, but may perform transmission only in the resource areas remaining after excluding resource C from resources A, without performing transmission in the resource area corresponding to resource C. For example, when symbol sequence A includes {symbol #1, symbol #2, symbol #3, symbol #4}, resources A are {resource #1, resource #2, resource #3, resource #4}, and resources B are {resource #3, resource #5}, the base station may map symbol sequence A of {symbol #1, symbol #2, symbol #3, symbol #4} to resources A {resource #1, resource #2, resource #3, resource #4}, respectively, and may transmit only the symbol sequence {symbol #1, symbol #2, symbol #4} corresponding to the resources {resource #1, resource #2, resource #4} which are remaining after excluding, from resources A, {resource #3} corresponding to resource C, without transmitting {symbol #3} mapped to {resource #3} corresponding to resource C. As a result, the base station may map the symbol sequence {symbol #1, symbol #2, symbol #4} to {resource #1, resource #2, resource #4}, respectively, so as to transmit the same.

The terminal may determine resources A and resources B from scheduling information for symbol sequence A from the base station, and may determine, based thereof, resource C that is an area in which resources A and resources B overlap each other. The terminal may receive symbol sequence A, based on the assumption that symbol sequence A has been mapped to all resources A but is transmitted only in the areas remaining after excluding resource C from resources A. For example, when symbol sequence A includes {symbol #1, symbol #2, symbol #3, symbol #4}, resources A are {resource #1, resource #2, resource #3, resource #4}, and resources B are {resource #3, resource #5}, the terminal may assume that symbol sequence A {symbol #1, symbol #2, symbol #3, symbol #4} is mapped to resources A {resource #1, resource #2, resource #3, resource #4}, respectively, but {symbol #3} mapped to {resource #3} corresponding to resource C is not transmitted, and may perform reception based on the assumption that the symbol sequence {symbol #1, symbol #2, symbol #4} corresponding to the resources {resource #1, resource #2, resource #4} which are remaining after excluding, from resources A, {resource #3} corresponding to resource C is mapped and transmitted. As a result, the terminal may perform a series of reception operation later based on the assumption that the symbol sequence {symbol #1, symbol #2, symbol #4} is mapped to and transmitted in {resource #1, resource #2, resource #4}, respectively.

Hereinafter, a method of configuring a rate matching resource for the purpose of rate matching in the 5G communication system will be described. Rate matching refers to that a size of a signal is adjusted by considering an amount of resources capable of transmitting the signal. For example, rate matching of a data channel may refer to that a size of data is adjusted according to an amount of resources, without mapping and transmitting the data channel with respect to a specific time and frequency resource area.

Figure 6:
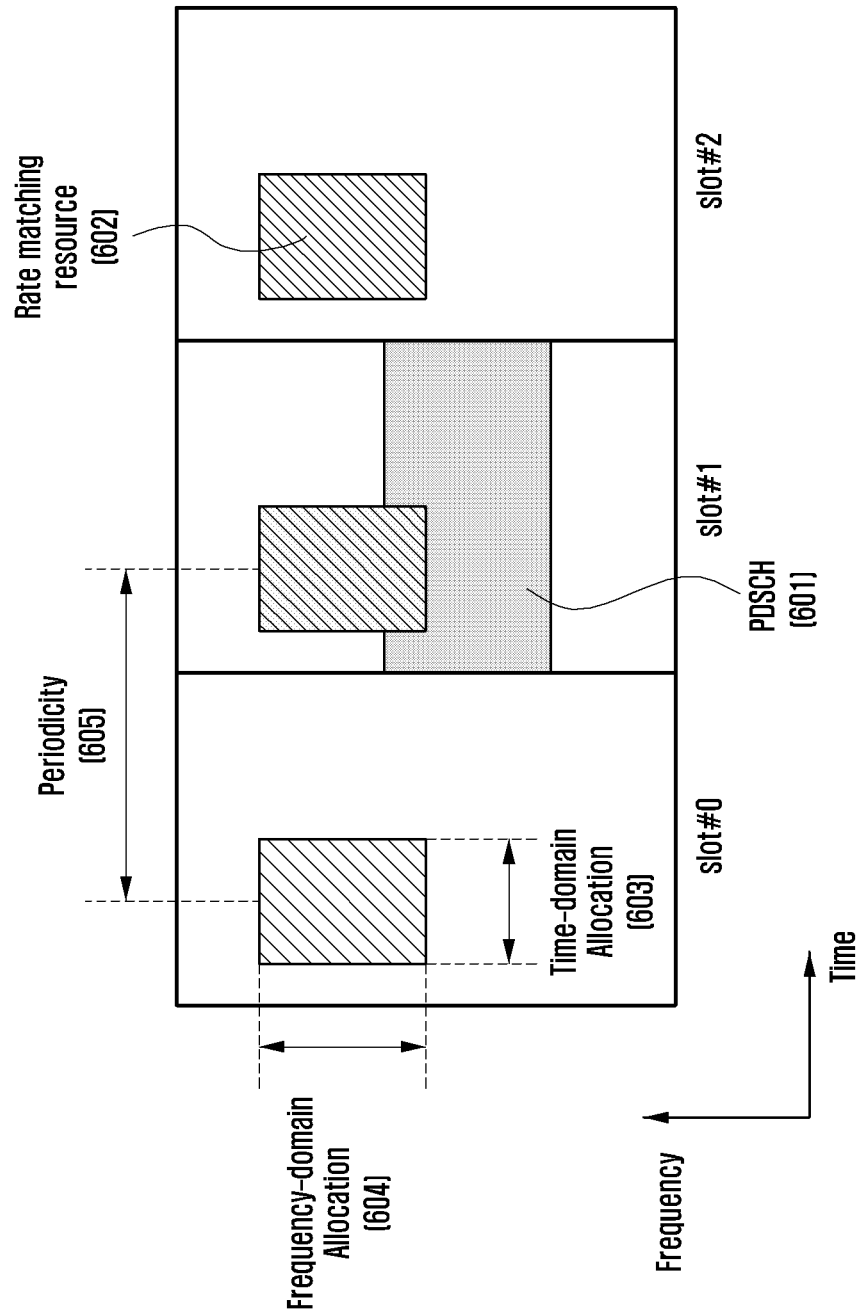
FIG. 6 is a diagram for illustrating a method of transmitting or receiving data by a base station and a terminal based on a downlink data channel and a rate matching resource in a wireless communication system according to an embodiment of the disclosure.

FIG. 6 is a diagram illustrating a method by which a base station and a terminal transmit or receive data based on a downlink data channel and a rate matching resource according to an embodiment of the disclosure.

Referring to FIG. 6, it illustrates a downlink data channel (PDSCH) 601 and a rate matching resource 602. The base station may configure one or multiple rate matching resources 602 for the terminal via higher layer signaling (e.g., RRC signaling). Configuration information of the rate matching resource 602 may include time axis resource allocation information 603, frequency axis resource allocation information 604, and periodicity information 605. Hereinafter, a bitmap corresponding to the frequency axis resource allocation information 604 is referred to as a "first bitmap", a bitmap corresponding to the time axis resource allocation information 603 is referred to as a "second bitmap", and a bitmap corresponding to the periodicity information 605 is referred to as a "third bitmap". When all or some of the time and frequency resources of the scheduled data channel 601 overlap the configured rate matching resource 602, the base station may rate-match and transmit the data channel 601 in the rate matching resource 602 part, and the terminal may perform reception and decoding based on an assumption that the data channel 601 is rate-matched in the rate matching resource 602 part.

The base station may dynamically notify, via DCI, the terminal of whether to rate-match the data channel in the configured rate matching resource part via an additional configuration (corresponding to a "rate matching indicator" in the aforementioned DCI format). Specifically, the base station may select some of the configured rate matching resources, group the same into a rate matching resource group, and inform the terminal of whether to perform rate matching of a data channel for each rate matching resource group, via DCI by using a bitmap scheme. For example, when four rate matching resources of RMR #1, RMR #2, RMR #3, and RMR #4 are configured, the base station may configure rate matching groups of RMG #1={RMR #1, RMR #2} and RMG #2={RMR #3, RMR #4}, and may indicate, to the terminal, whether to perform rate matching in each of RMG #1 and RMG #2, by using 2 bits within a DCI field. For example, the base station may indicate "1" when rate matching is needed, and may indicate "0" when rate matching is not needed.

In the 5G system, granularity at an "RB symbol level" and granularity at an "RE level" are supported as the aforementioned method of configuring a rate matching resource for the terminal. More specifically, the following configuration method may be used.

RB Symbol Level

The terminal may be configured with up to four RateMatchPattern for each bandwidth part via higher layer signaling, and one RateMatchPattern may include the following content.

As reserved resources within a bandwidth part, resources in which time and frequency resource areas of the corresponding reserved resources are configured may be included in a combination of an RB-level bitmap and a symbol-level bitmap on the frequency axis. The reserved resources may span one or two slots. A time domain pattern (periodicityAndPattern), in which the time and frequency domains including each RB-level and symbol-level bitmap pair are repeated, may be additionally configured.

Time and frequency domain resource areas configured as a control resource set within a bandwidth part and a resource area corresponding to a time domain pattern configured by a search space configuration in which the corresponding resource areas are repeated may be included.

RE Level

The terminal may be configured with the following contents via higher layer signaling.

As configuration information (lte-CRS-ToMatchAround) for REs corresponding to an LTE cell-specific reference signal or common reference signal (CRS) pattern, the number (nrofCRS-Ports) of LTE CSR ports, values (v-shift) of LTE-CRS-vshift(s), information (carrier-FreqDL) on a center subcarrier position of an LTE carrier from a frequency point that is a reference (e.g., reference point A), information on a bandwidth size (carrierBandwidthDL) of an LTE carrier, subframe configuration information (mbsfn-SubframConfigList) corresponding to a multicast-broadcast single-frequency network (MBSFN), and the like may be included. The terminal may determine a CRS position within an NR slot corresponding to the LTE subframe, based on the aforementioned information.

Configuration information for a resource set corresponding to one or multiple zero power (ZP) CSI-RSs within a bandwidth part may be included.

Relating to LTE CRS Rate Match

Subsequently, a rate match procedure for the aforementioned LTE CRS will be described below. For the coexistence of long-term evolution (LTE) and new RAT (NR) (LTE-NR coexistence), NR provides a function of configuring a cell-specific reference signal (CRS) pattern of LTE for an NR terminal. More specifically, the CRS pattern may be provided by RRC signaling including at least one parameter in ServingCellConfigCommon IE or ServingCellConfig IE (information element). Examples of the parameter may include lte-CRS-ToMatchAround, lte-CRS-PatternList1-r16, lte-CRS-PatternList2-r16, crs-RateMatch-PerCORE-SETPoolIndex-r16, and the like.

Rel-15 NR provides a function in which one CRS pattern may be configured per serving cell via parameter lte-CRS-ToMatchAround. In Rel-16 NR, the function has been extended to enable configuration of multiple CRS patterns per serving cell. More specifically, a single-transmission and reception point (TRP) configuration terminal may be configured with one CRS pattern per one LTE carrier, and a multi-TRP configuration terminal may be configured with two CRS patterns per one LTE carrier. For example, up to three CRS patterns per serving cell may be configured for the single-TRP configuration terminal via parameter lte-CRS-PatternList1-r16. For another example, a CRS may be configured for each TRP in the multi-TRP configuration terminal. For example, a CRS pattern for TRP1 may be configured via parameter lte-CRS-PatternList1-r16, and a CRS pattern for TRP2 may be configured via parameter lte-CRS-PatternList2-r16. When two TRPs are configured as above, whether to apply both the CRS patterns of TRP1 and TRP2 to a specific physical downlink shared channel (PDSCH) or whether to apply only the CRS pattern for one TRP is determined via parameter crs-RateMatch-PerCORESETPoolIndex-r16, wherein only the CRS pattern of one TRP is applied if parameter crs-RateMatch-PerCORESETPoolIndex-r16 is configured to "enabled", and both the CRS patterns of the two TRPs are applied in other cases.

Table 15 shows ServingCellConfig IE including the CRS pattern, and Table 16 shows RateMatchPatternLTE-CRS IE including at least one parameter for the CRS pattern.

TABLE 15

```
ServingCellConfig ::=                    SEQUENCE {
 tdd-UL-DL-ConfigurationDedicated                   TDD-UL-DL-ConfigDedicated
OPTIONAL, -- Cond TDD
 initialDownlinkBWP                                  BWP-DownlinkDedicated
OPTIONAL, -- Need M
 downlinkBWP-ToReleaseList               SEQUENCE (SIZE (1..maxNrofBWPs)) OF
BWP-Id                          OPTIONAL, -- Need N
 downlinkBWP-ToAddModList                SEQUENCE (SIZE (1..maxNrofBWPs)) OF
BWP-Downlink                    OPTIONAL, -- Need N
 firstActiveDownlinkBWP-Id                           BWP-Id
OPTIONAL, -- Cond SyncAndCellAdd
 bwp-InactivityTimer                     ENUMERATED {ms2, ms3, ms4, ms5, ms6, ms8,
ms10, ms20, ms30,
 ms40,ms50, ms60, ms80,ms100, ms200,ms300, ms500,
 ms750, ms1280, ms1920, ms2560, spare10, spare9, spare8,
 spare7, spare6, spare5, spare4, spare3, spare2, spare1 }       OPTIONAL, --Need R
 defaultDownlinkBWP-Id                               BWP-Id
OPTIONAL, -- Need S
 uplinkConfig                    UplinkConfig                    OPTIONAL,
-- Need M
 supplementaryUplink                                 UplinkConfig
OPTIONAL, -- Need M
 pdcch-ServingCellConfig                 SetupRelease { PDCCH-ServingCellConfig }
OPTIONAL, -- Need M
 pdsch-ServingCellConfig                 SetupRelease { PDSCH-ServingCellConfig }
OPTIONAL, -- Need M
 csi-MeasConfig                          SetupRelease { CSI-MeasConfig }
OPTIONAL, -- Need M
 sCellDeactivationTimer                  ENUMERATED {ms20, ms40, ms80, ms160,
ms200, ms240,
 ms320, ms400, ms480, ms520, ms640, ms720,
 ms840, ms1280, spare2,spare1}                       OPTIONAL, -- Cond
ServingCellWithoutPUCCH
 crossCarrierSchedulingConfig                        CrossCarrierSchedulingConfig
OPTIONAL, -- Need M
 tag-Id                          TAG-Id,
 dummy                                               ENUMERATED {enabled}
OPTIONAL, -- Need R
 pathlossReferenceLinking                            ENUMERATED {spCell, sCell}
OPTIONAL, -- Cond SCellOnly
 servingCellMO                   MeasObjectId                    OPTIONAL,
-- Cond MeasObject

...,
[[
```

TABLE 15-continued

```
lte-CRS-ToMatchAround                SetupRelease { RateMatchPatternLTE-CRS }
OPTIONAL, -- Need M
rateMatchPatternToAddModList                     SEQUENCE (SIZE
(1..maxNrofRateMatchPatterns)) OF RateMatchPattern    OPTIONAL, -- Need N
rateMatchPatternToReleaseList                    SEQUENCE (SIZE
(1..maxNrofRateMatchPatterns)) OF RateMatchPatternId  OPTIONAL, -- Need N
downlinkChannelBW-PerSCS-List        SEQUENCE (SIZE (1..maxSCSs)) OF SCS-
SpecificCarrier                      OPTIONAL -- Need S
]],
[[
supplementaryUplinkRelease                       ENUMERATED {true}
OPTIONAL, -- Need N
tdd-UL-DL-ConfigurationDedicated-IAB-MT-r16              TDD-UL-DL-
ConfigDedicated-IAB-MT-r16           OPTIONAL, -- Cond TDD_IAB
dormantBWP-Config-r16                SetupRelease { DormantBWP-Config-r16 }
OPTIONAL, -- Need M
ca-SlotOffset-r16                    CHOICE {
refSCS15kHz                          INTEGER (-2..2),
refSCS30KHz                          INTEGER (-5..5),
refSCS60KHz                          INTEGER (-10..10),
refSCS120KHz                         INTEGER (-20..20)
}                                                      OPTIONAL, --
Cond AsyncCA
channelAccessConfig-r16              SetupRelease { ChannelAccessConfig-r16 }
OPTIONAL, -- Need M
intraCellGuardBandsDL-List-r16           SEQUENCE (SIZE (1..maxSCSs)) OF
IntraCellGuardBandsPerSCS-r16        OPTIONAL, -- Need S
intraCellGuardBandsUL-List-r16           SEQUENCE (SIZE (1..maxSCSs)) OF
IntraCellGuardBandsPerSCS-r16        OPTIONAL, -- Need S
csi-RS-ValidationWith-DCI-r16                    ENUMERATED {enabled}
OPTIONAL, -- Need R
lte-CRS-PatternList1-r16             SetupRelease { LTE-CRS-PatternList-r16 }
OPTIONAL, -- Need M
lte-CRS-PatternList2-r16             SetupRelease { LTE-CRS-PatternList-r16 }
OPTIONAL, -- Need M
crs-RateMatch-PerCORESETPoolIndex-r16            ENUMERATED {enabled}
OPTIONAL, -- Need R
enableTwoDefaultTCI-States-r16                   ENUMERATED {enabled}
OPTIONAL, -- Need R
enableDefaultTCI-StatePerCoresetPoolIndex-r16    ENUMERATED {enabled}
OPTIONAL, -- Need R
enableBeamSwitchTiming-r16                       ENUMERATED {true}
OPTIONAL, -- Need R
cbg-TxDiffTBsProcessingType1-r16                 ENUMERATED {enabled}
OPTIONAL, -- Need R
cbg-TxDiffTBsProcessingType2-r16                 ENUMERATED {enabled}
OPTIONAL  -- Need R
]]
}
```

TABLE 16

- RateMatchPatternLTE-CRS
The IE RateMatchPatternLTE-CRS is used to configure a pattern to
rate match around LTE CRS. See TS 38.214 [19], clause 5.1.4.2.
RateMatchPatternLTE-CRS information element

```
-- ASN1START
-- TAG-RATEMATCHPATTERNLTE-CRS-START
RateMatchPatternLTE-CRS ::=     SEQUENCE {
carrierFreqDL                   INTEGER (0..16383),
carrierBandwidthDL              ENUMERATED {n6, n15, n25, n50, n75, n100,
spare2, spare1},
mbsfn-SubframeConfigList            EUTRA-MBSFN-SubframeConfigList
OPTIONAL, -- Need M
nrofCRS-Ports                   ENUMERATED {n1, n2, n4},
v-Shift                         ENUMERATED {n0, n1, n2, n3, n4, n5}
}
LTE-CRS-PatternList-r16 ::=     SEQUENCE (SIZE (1..maxLTE-CRS-Patterns-r16))
OF RateMatchPatternLTE-CRS
-- TAG-RATEMATCHPATTERNLTE-CRS-STOP
-- ASN1STOP
```

TABLE 16-continued

- RateMatchPatternLTE-CRS
The IE RateMatchPatternLTE-CRS is used to configure a pattern to
rate match around LTE CRS. See TS 38.214 [19], clause 5.1.4.2.
RateMatchPatternLTE-CRS information element RateMatchPatternLTE-CRS field descriptions carrierBandwidthDL
BW of the LTE carrier in number of PRBs (see TS 38.214 [19], clause 5.1.4.2).
carrierFreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Ports
Number of LTE CRS antenna port to rate-match around (see TS 38.214 [19], clause 5.1.4.2).
v-Shift
Shifting value v-shift in LTE to rate match around LTE CRS (see TS 38.214 [19], clause 5.1.4.2).

PDSCH: Relating to Frequency Resource Allocation

Figure 7:
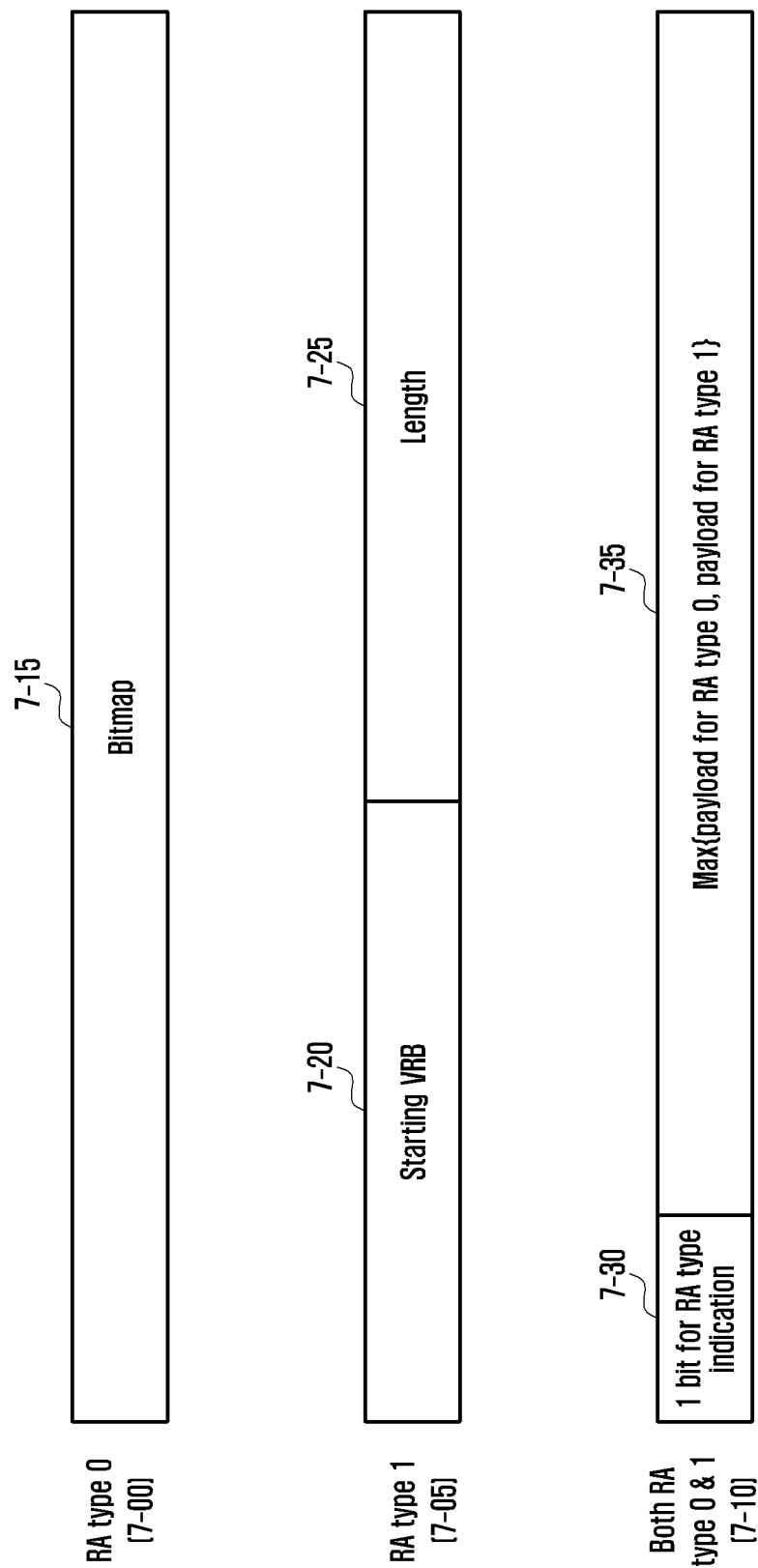
FIG. 7 is a diagram illustrating frequency axis resource allocation of a physical downlink shared channel (PDSCH) in a wireless communication system according to an embodiment of the disclosure.

FIG. 7 is a diagram illustrating frequency axis resource allocation of a physical downlink shared channel (PDSCH) in the wireless communication system according to an embodiment of the disclosure.

Referring to FIG. 7, it illustrates a diagram illustrating three frequency axis resource allocation methods of type 0 7-00, type 1 7-05, and a dynamic switch 7-10 which are configurable via a higher layer in the NR wireless communication system.

If a terminal is configured 7-00, via higher layer signaling, to use only resource type 0, some downlink control information (DCI) for allocation of a PDSCH to the terminal has a bitmap including NRBG bits. Conditions for this will be described later. In this case, NRBG refers to the number of resource block groups (RBG) determined as shown in Table 17 below according to a BWP size assigned by a BWP indicator and higher layer parameter rbg-Size, and data is transmitted to the RBG indicated to be 1 by a bit map.

TABLE 17

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the terminal is configured 7-05, via higher layer signaling, to use only resource type 1, some DCI for allocation of the PDSCH to the terminal has frequency axis resource allocation information including $\lceil \log_2(N_{RB}^{DL,BWP}(N_{RB}^{DL,BWP}+1)/2) \rceil$ bits. Conditions for this will be described later. Based on this, the base station may configure a starting VRB 7-20 and a length 7-25 of frequency axis resources continuously allocated therefrom.

If the terminal is configured 7-10, via higher layer signaling, to use both resource type 0 and resource type 1, some DCI for assigning of a PDSCH to the terminal includes frequency axis resource allocation information including bits of a larger value 7-35 among payloads 7-20 and 7-25 for configuring resource type 1 and a payload 7-15 for configuring resource type 0. Conditions for this will be described later. In this case, one bit may be added to a first part (MSB) of the frequency axis resource allocation information in the DCI, and if the corresponding bit has a value of "0, use of resource type 0 may be indicated, and if the bit has a value of "1", use of resource type 1 may be indicated 7-30.

PDSCH/PUSCH: Relating to Time Resource Allocation

Hereinafter, a method of time domain resource allocation for a data channel in the next-generation mobile communication system (5G or NR system) is described.

The base station may configure, for the terminal via higher layer signaling (e.g., RRC signaling), a table for time domain resource allocation information on a downlink data channel (physical downlink shared channel (PDSCH)) and an uplink data channel (physical uplink shared channel (PUSCH)). A table including up to 16 entries (maxNrofDL-Allocations=16) may be configured for the PDSCH, and a table including up to 16 entries (maxNrofUL-Allocations=16) may be configured for the PUSCH. In an embodiment of the disclosure, the time domain resource allocation information may include, for example, a PDCCH-to-PDSCH slot timing (denoted as K0, and corresponding to a time interval in units of slots between a time point at which a PDCCH is received and a time point at which a PDSCH scheduled by the received PDCCH is transmitted), a PDCCH-to-PUSCH slot timing (denoted as K2, and corresponding to a time interval in units of slots between a time point at which a PDCCH is received and a time point at which a PUSCH scheduled by the received PDCCH is transmitted), information on a position and a length of a start symbol in which the PDSCH or PUSCH is scheduled within a slot, a mapping type of the PDSCH or PUSCH, or the like. For example, information as shown in Table 18 or Table 19 below may be transmitted from the base station to the terminal.

TABLE 18

PDSCH-TimeDomainResourceAllocationList information element

PDSCH-TimeDomainResourceAllocationList ::= SEQUENCE
(SIZE(1..maxNrofDL-Allocations)) OF
PDSCH-TimeDomainResourceAllocation
PDSCH-TimeDomainResourceAllocation ::= SEQUENCE {
  k0                   INTEGER(0..32)   OPTIONAL, -- Need S
  mappingType        ENUMERATED {typeA, typeB},
  startSymbolAndLength  INTEGER (0..127)
}

TABLE 19

PUSCH-TimeMonainResourceAllocation information element

PUSCH-TimeDomainResourceAllocationList ::= SEQUENCE
(SIZE(1..maxNrofUL-Allocations)) OF
PUSCH-TimeDomainResourceAllocation
PUSCH-TimeDomainResourceAllocation ::= SEQUENCE {
   k2                    INTEGER(0..32)  OPTIONAL, -- Need S
   mappingType         ENUMERATED {typeA, typeB},
   startSymbolAndLength  INTEGER (0..127)
}

The base station may notify one of the entries in the tables relating to the time domain resource allocation information described above to the terminal via L1 signaling (e.g., DCI) (e.g., the entry may be indicated by a "time domain resource allocation" field in the DCI). The terminal may acquire the time domain resource allocation information for the PDSCH or PUSCH, based on the DCI received from the base station.

Figure 8:
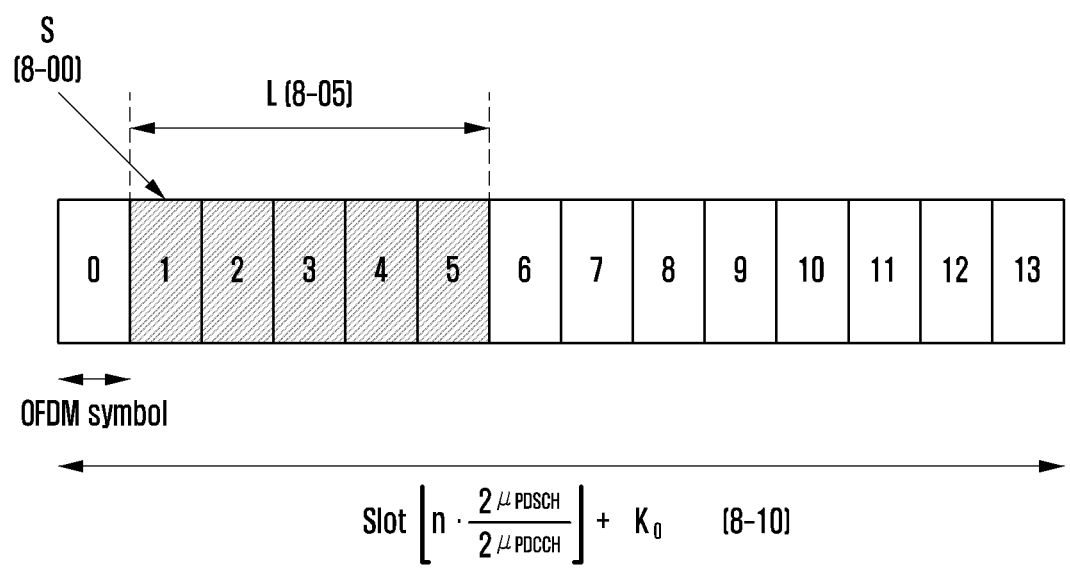
FIG. 8 is a diagram illustrating time axis resource allocation of a PDSCH in a wireless communication system according to an embodiment of the disclosure.

FIG. 8 is a diagram illustrating time domain resource allocation of a PDSCH in the wireless communication system according to an embodiment of the disclosure.

Referring to FIG. 8, a base station may indicate a time axis position of a PDSCH resource according to a start position 8-00 and a length 8-05 of an OFDM symbol in one slot dynamically indicated via DCI, a scheduling offset K0 value, and subcarrier spacings (SCSs) ($\mu_{PDSCH}$ and $\mu_{PDCCH}$) of a data channel and a control channel configured using a higher layer.

Figure 9:
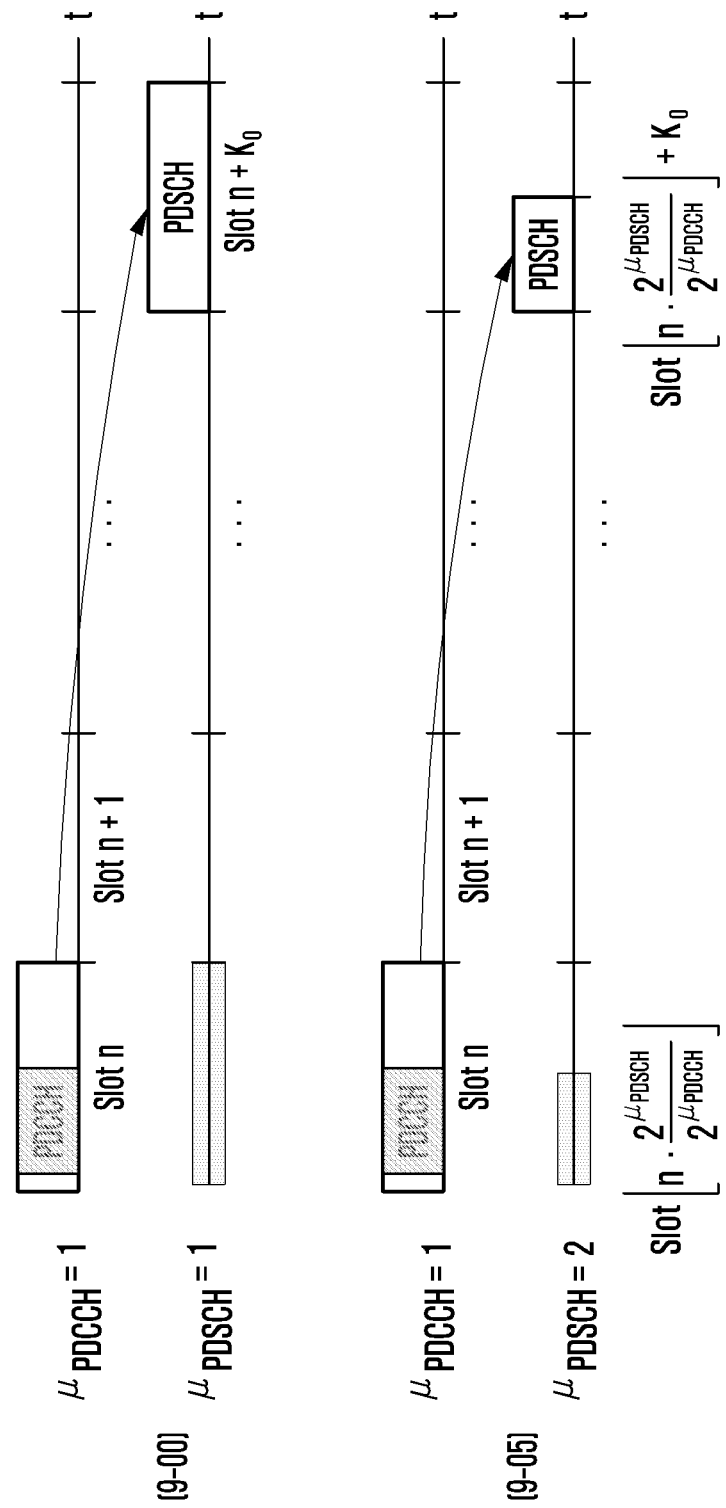
FIG. 9 is a diagram illustrating time axis resource allocation according to subcarrier spacings of a data channel and a control channel in a wireless communication system according to an embodiment of the disclosure.

FIG. 9 is a diagram illustrating time axis resource allocation according to subcarrier spacings of a data channel and a control channel in the wireless communication system according to an embodiment of the disclosure.

Referring to FIG. 9, if a subcarrier spacing of a data channel is the same as that of a control channel (9-00, $\mu_{PDSCH}=\mu_{PDCCH}$), slot numbers for data and control are the same, and therefore a base station and a terminal may generate a scheduling offset according to predetermined slot offset $K_0$. On the other hand, if the subcarrier spacings (SCSs) of the data channel and the control channel are different (9-05, $\mu_{PDSCH}\neq\mu_{PDCCH}$), the slot numbers for data and control are different, and thus the base station and the terminal may generate a scheduling offset according to predetermined slot offset $K_0$, based on the subcarrier spacing of the PDCCH.

PUSCH: Relating to Transmission Scheme

Subsequently, a scheduling scheme of PUSCH transmission will be described. PUSCH transmission may be dynamically scheduled by a UL grant in DCI or may be operated by configured grant Type 1 or Type 2. Dynamic scheduling indication for PUSCH transmission is possible with DCI format 0_0 or 0_1.

For configured grant Type 1 PUSCH transmission, the UL grant in DCI may not be received, and configuration may be performed semi-statically via reception of configuredGrantConfig including rrc-ConfiguredUplinkGrant of Table 20 via higher signaling. Configured grant Type 2 PUSCH transmission may be semi-persistently scheduled by the UL grant in DCI after reception of configuredGrantConfig that does not include rrc-ConfiguredUplinkGrant of Table 20 via higher signaling. When PUSCH transmission is operated by the configured grant, parameters applied to PUSCH transmission are applied via configuredGrantConfig that is higher signaling in [Table 20], except for dataScramblingIdentity-PUSCH, txConfig, codebookSubset, maxRank, and scaling of UCI-OnPUSCH provided via pusch-Config that is higher signaling in Table 21. If the terminal is provided with transformPrecoder in configuredGrantConfig which is higher signaling in Table 20, the terminal applies tp-pi2BPSK in pusch-Config of Table 21 to PUSCH transmission operated by the configured grant.

TABLE 20

ConfiguredGrantConfig ::=   SEQUENCE {
  frequencyHopping   ENUMERATED {intraSlot, interSlot}
OPTIONAL, -- Need S,
  cg-DMRS-Configuration   DMRS-UplinkConfig,
  mcs-Table   ENUMERATED {qam256, qam64LowSE}
OPTIONAL, -- Need S
  mcs-TableTransformPrecoder   ENUMERATED {qam256,
qam64LowSE}   OPTIONAL, -- Need S
  uci-OnPUSCH   SetupRelease { CG-UCI-OnPUSCH }
OPTIONAL, -- Need M
  resourceAllocation   ENUMERATED { resourceAllocationType0,
resourceAllocationType1, dynamicSwitch },
  rbg-Size   ENUMERATED {config2}
OPTIONAL, -- Need S
  powerControlLoopToUse   ENUMERATED {n0, n1},
  p0-PUSCH-Alpha   P0-PUSCH-AlphaSetId,
  transformPrecoder   ENUMERATED {enabled, disabled}
OPTIONAL, -- Need S
  nrofHARQ-Processes   INTEGER(1..16),
  repK   ENUMERATED {n1, n2, n4, n8},
  repK-RV   ENUMERATED {s1-0231, s2-0303, s3-0000}
OPTIONAL, -- Need R
  periodicity   ENUMERATED {
    sym2, sym7, sym1x14, sym2x14, sym4x14,
sym5x14, sym8x14, sym10x14, sym16x14, sym20x14,
    sym32x14, sym40x14, sym64x14, sym80x14,
sym128x14, sym160x14, sym256x14, sym320x14, sym512x14,
    sym640x14, sym1024x14, sym1280x14,
sym2560x14, sym5120x14,
    sym6, sym1x12, sym2x12, sym4x12, sym5x12,
sym8x12, sym10x12, sym16x12, sym20x12, sym32x12,
    sym40x12, sym64x12, sym80x12, sym128x12,
sym160x12, sym256x12, sym320x12, sym512x12, sym640x12,
    sym1280x12, sym2560x12
  }, TABLE 20-continued

| | |
|---|---|
| configuredGrantTimer | INTEGER (1..64) |
| OPTIONAL, -- Need R | |
| rrc-ConfiguredUplinkGrant | SEQUENCE { |
| timeDomainOffset | INTEGER (0..5119), |
| timeDomainAllocation | INTEGER (0..15), |
| frequencyDomainAllocation | BIT STRING (SIZE(18)), |
| antennaPort | INTEGER (0..31), |
| dmrs-SeqInitialization | INTEGER (0..1) |
| OPTIONAL, -- Need R | |
| precodingAndNumberOfLayers | INTEGER (0..63), |
| srs-ResourceIndicator | INTEGER (0..15) |
| OPTIONAL, -- Need R | |
| mcsAndTBS | INTEGER (0..31), |
| frequencyHoppingOffset | INTEGER (1.. |
| maxNrofPhysicalResourceBlocks-1) | OPTIONAL, -- Need R |
| pathlossReferenceIndex | INTEGER (0..maxNrofPUSCH- |
| PathlossReferenceRSs-1), | |
| ... | |
| } | |
| } OPTIONAL, -- Need R | |
| ... | |
| } | |

Subsequently, a PUSCH transmission method will be described. A DMRS antenna port for PUSCH transmission is the same as an antenna port for SRS transmission. PUSCH transmission may follow each of a codebook-based transmission method and a non-codebook-based transmission method, depending on whether a value of txConfig in pusch-Config of Table 21, which is higher signaling, is "codebook" or "nonCodebook".

As described above, PUSCH transmission may be dynamically scheduled via DCI format 0_0 or 0_1, and may be semi-statically configured by a configured grant. If the terminal is indicated with scheduling for PUSCH transmission via DCI format 0_0, the terminal performs beam configuration for PUSCH transmission by using pucch-spatialRelationInfoID corresponding to a UE-specific PUCCH resource which corresponds to a minimum ID within an enabled uplink BWP in a serving cell, in which case the PUSCH transmission is based on a single antenna port. The terminal does not expect scheduling for PUSCH transmission via DCI format 0_0, within a BWP in which a PUCCH resource including pucch-spatialRelationInfo is not configured. If the terminal is not configured with txConfig in pusch-Config of Table 21, the terminal does not expect to be scheduled via DCI format 0_1.

TABLE 21

| | |
|---|---|
| PUSCH-Config ::= | SEQUENCE { |
| dataScramblingIdentityPUSCH | INTEGER (0..1023) |
| OPTIONAL, -- Need S | |
| txConfig | ENUMERATED {codebook, nonCodebook} |
| OPTIONAL, -- Need S | |
| dmrs-UplinkForPUSCH-MappingTypeA | SetupRelease { DMRS-UplinkConfig } OPTIONAL, -- Need M |
| dmrs-UplinkForPUSCH-MappingTypeB | SetupRelease { DMRS-UplinkConfig } OPTIONAL, -- Need M |
| pusch-PowerControl | PUSCH-PowerControl |
| OPTIONAL, -- Need M | |
| frequencyHopping | ENUMERATED {intraSlot, interSlot} |
| OPTIONAL, -- Need S | |
| frequencyHoppingOffsetLists | SEQUENCE (SIZE (1..4)) OF INTEGER (1.. maxNrofPhysicalResourceBlocks-1) |
| OPTIONAL, -- Need M | |
| resourceAllocation | ENUMERATED { resourceAllocationType0, resourceAllocationType1, dynamicSwitch}, |
| pusch-TimeDomainAllocationList | SetupRelease { PUSCH-TimeDomainResourceAllocationList } OPTIONAL, -- Need M |
| pusch-AggregationFactor | ENUMERATED { n2, n4, n8 } |
| OPTIONAL, -- Need S | |
| mcs-Table | ENUMERATED {qam256, qam64LowSE} |
| OPTIONAL, -- Need S | |
| mcs-TableTransformPrecoder | ENUMERATED {qam256, qam64LowSE} OPTIONAL, -- Need S |
| transformPrecoder | ENUMERATED {enabled, disabled} |
| OPTIONAL, -- Need S | |
| | ENUMERATED {fullyAndPartialAndNonCoherent, partialAndNonCoherent,nonCoherent} OPTIONAL, -- |
| Cond codebookBased | |
| maxRank | INTEGER (1..4) |
| OPTIONAL, -- Cond codebookBased | |
| rbg-Size | ENUMERATED { config2} |
| OPTIONAL, -- Need S | |
| uci-OnPUSCH | SetupRelease { UCI-OnPUSCH} |

TABLE 21-continued

```
OPTIONAL, -- Need M
    tp-pi2BPSK           ENUMERATED {enabled}
OPTIONAL, -- Need S
    ...
}
```

Subsequently, codebook-based PUSCH transmission will be described. Codebook-based PUSCH transmission may be dynamically scheduled via DCI format 0_0 or 0_1 and may operate semi-statically by a configured grant. If a codebook-based PUSCH is dynamically scheduled by DCI format 0_1 or is configured semi-statically by a configured grant, the terminal determines a precoder for PUSCH transmission, based on an SRS resource indicator (SRI), a transmission precoding matrix indicator (TPMI), and a transmission rank (the number of PUSCH transmission layers).

In this case, the SRI may be given via a field, SRS resource indicator, in DCI or may be configured via srs-ResourceIndicator that is higher signaling. The terminal is configured with at least one SRS resource at codebook-based PUSCH transmission, and may be configured with up to two SRS resources. When the terminal is provided with the SRI via DCI, an SRS resource indicated by the SRI refers to an SRS resource corresponding to the SRI from among SRS resources transmitted before a PDCCH including the SRI. The TPMI and the transmission rank may be given via a field, precoding information and number of layers, in DCI or may be configured via precodingAndNumberOfLayers that is higher signaling. The TPMI is used to indicate a precoder applied to PUSCH transmission. If the terminal is configured with one SRS resource, the TPMI is used to indicate a precoder to be applied in the configured one SRS resource. If the terminal is configured with multiple SRS resources, the TPMI is used to indicate a precoder to be applied in the SRS resource indicated via the SRI.

A precoder to be used for PUSCH transmission is selected from an uplink codebook having the same number of antenna ports as a value of nrofSRS-Ports in SRS-Config which is higher signaling. In codebook-based PUSCH transmission, the terminal determines a codebook subset, based on codebookSubset in pusch-Config which is higher signaling and the TPMI. codebookSubset in pusch-Config which is higher signaling may be configured as one of "fullyAndPartialAndNonCoherent", "partialAndNonCoherent", or "nonCoherent", based on UE capability reported to the base station by the terminal. If the terminal has reported "partialAndNonCoherent" as UE capability, the terminal does not expect a value of codebookSubset, which is higher signaling, to be configured to "fullyAndPartialAndNonCoherent". If the terminal has reported "nonCoherent" as UE capability, the terminal expects the value of codebookSubset, which is higher signaling, to be configured to neither "fullyAndPartialAndNonCoherent" nor "partialAndNonCoherent". If nrofSRS-Ports in SRS-ResourceSet which is higher signaling indicates two SRS antenna ports, the terminal does not expect the value of codebookSubset, which is higher signaling, to be configured to "partialAndNonCoherent".

The terminal may be configured with one SRS resource set, in which a value of usage in SRS-ResourceSet that is higher signaling is configured to "codebook", and one SRS resource in the corresponding SRS resource set may be indicated via the SRI. If multiple SRS resources are configured in the SRS resource set in which the usage value in SRS-ResourceSet that is higher signaling is configured to "codebook", the terminal expects that the value of nrofSRS-Ports in SRS-Resource that is higher signaling is configured to be the same for all SRS resources.

The terminal transmits one or multiple SRS resources included in the SRS resource set, in which the value of usage is configured to "codebook", to the base station according to higher signaling, and the base station selects one of the SRS resources transmitted by the terminal and indicates the terminal to perform PUSCH transmission using transmission beam information of the corresponding SRS resource. In this case, in codebook-based PUSCH transmission, the SRI is used as information for selecting of an index of one SRS resource and is included in the DCI. Additionally, the base station adds, to the DCI, information indicating the rank and TPMI to be used by the terminal for PUSCH transmission. The terminal uses the SRS resource indicated by the SRI to perform PUSCH transmission by applying the precoder indicated by the TPMI and the rank, which has been indicated based on a transmission beam of the SRS resource.

Subsequently, non-codebook-based PUSCH transmission will be described. Non-codebook-based PUSCH transmission may be dynamically scheduled via DCI format 0_0 or 0_1 and may operate semi-statically by a configured grant. If at least one SRS resource is configured in an SRS resource set, in which the value of usage in SRS-ResourceSet that is higher signaling is configured to "nonCodebook", the terminal may be scheduled for non-codebook-based PUSCH transmission via DCI format 0_1.

For the SRS resource set in which the value of usage in SRS-ResourceSet that is higher signaling is configured to "nonCodebook", the terminal may be configured with one connected non-zero power (NZP) CSI-RS resource. The terminal may perform calculation on a precoder for SRS transmission via measurement for the NZP CSI-RS resource connected to the SRS resource set. If a difference between a last reception symbol of an aperiodic NZP CSI-RS resource connected to the SRS resource set and a first symbol of aperiodic SRS transmission in the terminal is less than 42 symbols, the terminal does not expect information on the precoder for SRS transmission to be updated.

If a value of resourceType in SRS-ResourceSet that is higher signaling is configured to "aperiodic", the connected NZP CSI-RS is indicated via an SRS request which is a field in DCI format 0_1 or 1_1. In this case, if the connected NZP CSI-RS resource is an aperiodic NZP CSI-RS resource, the presence of the connected NZP CSI-RS in a case where a value of the field, SRS request, in DCI format 0_1 or 1_1 is not "00" is indicated. In this case, the corresponding DCI should indicate neither a cross carrier nor cross BWP scheduling. If the value of the SRS request indicates the presence of the NZP CSI-RS, the NZP CSI-RS is located in a slot in which a PDCCH including the SRS request field has been transmitted. TCI states configured in scheduled subcarriers are not configured to QCL-TypeD.

If a periodic or semi-persistent SRS resource set is configured, the connected NZP CSI-RS may be indicated via associatedCSI-RS in SRS-ResourceSet that is higher signaling. For non-codebook-based transmission, the terminal does not expect that spatialRelationInfo, which is higher signaling for the SRS resource, and associatedCSI-RS in SRS-ResourceSet that is higher signaling are configured together.

If multiple SRS resources are configured, the terminal may determine the precoder and transmission rank to be applied to PUSCH transmission, based on the SRI indicated by the base station. The SRI may be indicated via the field, SRS resource indicator, in DCI or may be configured via srs-ResourceIndicator that is higher signaling. Like the aforementioned codebook-based PUSCH transmission, when the terminal receives the SRI via the DCI, the SRS resource indicated by the SRI refers to an SRS resource corresponding to the SRI from among SRS resources transmitted before the PDCCH including the SRI. The terminal may use one or multiple SRS resources for SRS transmission, and the maximum number of SRS resources concurrently transmittable in an identical symbol within one SRS resource set is determined by UE capability reported to the base station by the terminal. In this case, the SRS resources concurrently transmitted by the terminal occupy an identical RB. The terminal configures one SRS port for each SRS resource. Only one SRS resource set, in which the value of usage in SRS-ResourceSet that is higher signaling is configured to "nonCodebook", may be configured, and up to 4 SRS resources for the non-codebook-based PUSCH transmission may be configured.

The base station transmits one NZP CSI-RS connected to the SRS resource set to the terminal, and the terminal calculates, based on a result of measurement at reception of the NZP CSI-RS, the precoder to be used during transmission of one or multiple SRS resources in the SRS resource set. The terminal applies the calculated precoder when transmitting, to the base station, one or multiple SRS resources in the SRS resource set in which usage is configured to "nonCodebook", and the base station selects one or multiple SRS resources from among the received one or multiple SRS resources. In non-codebook-based PUSCH transmission, the SRI refers to an index capable of representing one SRS resource or a combination of multiple SRS resources, and the SRI is included in the DCI. The number of SRS resources indicated by the SRI transmitted by the base station may be the number of transmission layers of the PUSCH, and the terminal transmits the PUSCH by applying, to each layer, the precoder applied to SRS resource transmission.

PUSCH: Preparation Procedure Time

Subsequently, a PUSCH preparation procedure time will be described. If the base station uses DCI format 0_0, 0_1, or 0_2 to schedule the terminal to transmit the PUSCH, the terminal may require a PUSCH preparation procedure time for transmitting the PUSCH by applying a transmission method (a transmission precoding method of an SRS resource, the number of transmission layers, and a spatial domain transmission filter) indicated via the DCI. In NR, the PUSCH preparation procedure time is defined based on the same. The PUSCH preparation procedure time of the terminal may follow Equation 2 below.

$$T_{proc,2} = \max((N_2 + d_{2,1} + d_2)(2048 + 144)\kappa 2^{-\mu} T_c + T_{ext} + T_{switch}, d_{2,2})$$  Equation 2

Each variable in $T_{proc,2}$ described above using Equation 2 may have the following meaning $N_2$: The number of symbols determined according to UE processing capability 1 or 2 and numerology μ according to capability of the terminal When UE processing capability 1 is reported according to a capability report of the terminal, $N_2$ may have values of Table 22, and when UE processing capability 2 is reported and it is configured, via higher layer signaling, that UE processing capability 2 is available, $N_2$ may have values of Table 23.

TABLE 22

| μ | PUSCH preparation time $N_2$ [symbols] |
|---|---|
| 0 | 10 |
| 1 | 12 |
| 2 | 23 |
| 3 | 36 |

TABLE 23

| μ | PUSCH preparation time $N_2$ [symbols] |
|---|---|
| 0 | 5 |
| 1 | 5.5 |
| 2 | 11 for frequency range 1 |

$d_{2,1}$: The number of symbols determined to be 0 when all resource elements of a first OFDM symbol of PUSCH transmission are configured to include only DM-RS, and to be 1 otherwise

κ: 64

μ: Following one of $\mu_{DL}$ or $\mu_{UL}$, at which $T_{proc,2}$ has a greater value $\mu_{DL}$ denotes a numerology of a downlink in which a PDCCH including DCI for scheduling of a PUSCH is transmitted, and $\mu_{UL}$ denotes a numerology of an uplink in which a PUSCH is transmitted.

$T_c$: $1/(\Delta f_{max} * N_f)$, where $\Delta f_{max} = 480 * 10^3$ Hz, and $N_f = 4096$ $d_{2,2}$: Following a BWP switching time when DCI for scheduling of the PUSCH indicates BWP switching, and 0 otherwise $d_2$: When a PUSCH having a high priority index with a PUCCH and an OFDM symbol of a PUCCH having a low priority index overlap on time, a $d_2$ value of the PUSCH having the high priority index is used. Otherwise, $d_2$ is 0.

$T_{ext}$: When the terminal uses a shared spectrum channel access scheme, the terminal calculates $T_{ext}$ to apply the same to a PUSCH preparation procedure time. Other words, $T_{ext}$ is assumed to be 0.

$T_{switch}$: When an uplink switching interval is triggered, $T_{switch}$ is assumed to be a switching interval time. Otherwise, $T_{switch}$ is assumed to be 0.

The base station and the terminal determine that the PUSCH preparation procedure time is not sufficient when a first symbol of the PUSCH starts before a first uplink symbol in which a CP starts after $T_{proc,2}$ from a last symbol of the PDCCH including the DCI for scheduling of the PUSCH, based on time axis resource mapping information of the PUSCH scheduled via the DCI and a timing advance effect between the uplink and the downlink. Otherwise, the base station and the terminal determine that the PUSCH preparation procedure time is sufficient. If the PUSCH preparation procedure time is sufficient, the terminal transmits the PUSCH, and if the PUSCH preparation procedure time is not sufficient, the terminal may disregard the DCI for scheduling of the PUSCH.

Relating to CA/DC

Figure 10:
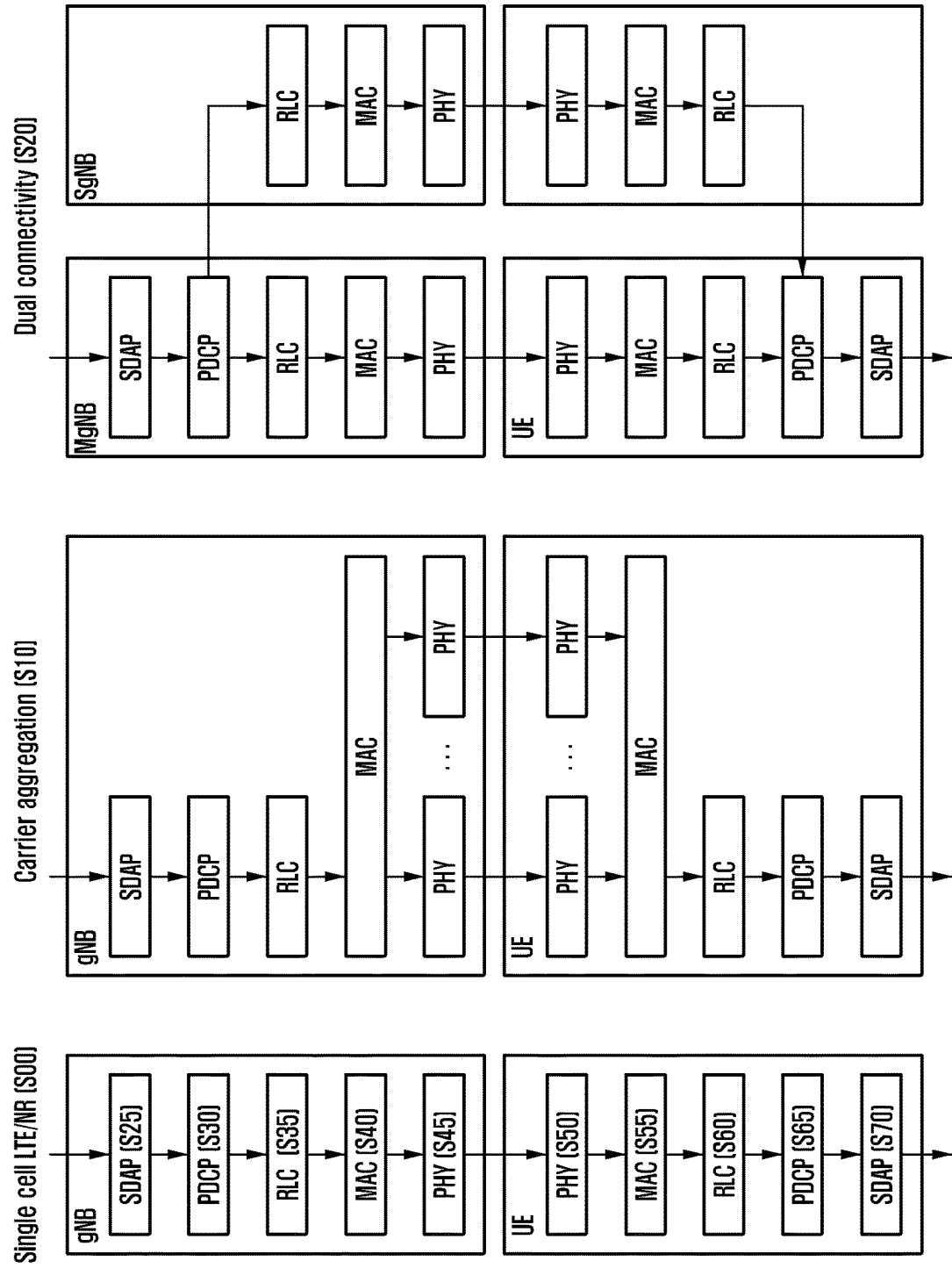
FIG. 10 is a diagram illustrating radio protocol structures of a terminal and a base station in single cell, carrier aggregation, and dual connectivity situations in a wireless communication system according to an embodiment of the disclosure.

FIG. 10 is a diagram illustrating a radio protocol structure of a base station and a terminal in single cell, carrier aggregation, and dual connectivity situations according to an embodiment of the disclosure.

Referring to FIG. 10, radio protocols of a next-generation mobile communication system include NR service data adaptation protocols (SDAP) S25 and S70, NR packet data convergence protocols (PDCP) S30 and S65, NR radio link controls (RLC) S35 and S60, and NR medium access controls (MAC) S40 and S55 layers in a terminal and an NR base station, respectively.

Main functions of the NR SDAPs S25 and S70 may include some of the following functions.

User data transfer function (transfer of user plane data)
Function of mapping a quality of service (QoS) flow and a data bearer for an uplink and a downlink (mapping between a QoS flow and a DRB for both DL and UL)
Function of marking a QoS flow ID in an uplink and a downlink (marking QoS flow ID in both DL and UL packets)
Function of mapping reflective QoS flows to data bearers for uplink SDAP PDUs (reflective QoS flow to DRB mapping for the UL SDAP PDUs)

With respect to an SDAP layer device, the terminal may be configured, via an RRC message, whether to use a header of the SDAP layer device or whether to use a function of the SDAP layer device for each PDCP layer device, for each bearer, or for each logical channel, and if the SDAP header is configured, a NAS QoS reflection configuration 1-bit indicator (NAS reflective QoS) and an AS QoS reflection configuration 1-bit indicator (AS reflective QoS) in the SDAP header may indicate the terminal to update or reconfigure mapping information for data bearers and QoS flows in uplink and downlink. The SDAP header may include QoS flow ID information indicating QoS. The QoS information may be used as a data processing priority, scheduling information, or the like to support a smooth service.

Main functions of the NR PDCPs S30 and S65 may include some of the following functions.

Header compression and decompression function (ROHC only)
User data transfer function
In-sequence transfer function (in-sequence delivery of upper layer PDUs)
Out-of-sequence transfer function (out-of-sequence delivery of upper layer PDUs)
Reordering function (PDCP PDU reordering for reception)
Duplicate detection function (duplicate detection of lower layer SDUs)
Retransmission function (retransmission of PDCP SDUs)
Encryption and decryption function (ciphering and deciphering)
Timer-based SDU discard function (timer-based SDU discard in uplink)

In the above, the reordering function of the NR PDCP device refers to a function of reordering PDCP PDUs received from a lower layer in order based on a PDCP sequence number (SN), and may include a function of transferring data to a higher layer according to the reordered sequence. Alternatively, the reordering function of the NR PDCP device may include a function of direct transfer without considering a sequence, may include a function of reordering the sequence to record lost PDCP PDUs, may include a function of reporting states of the lost PDCP PDUs to a transmission side, and may include a function of requesting retransmission of the lost PDCP PDUs.

Main functions of the NR RLCs S35 and S60 may include some of the following functions.

Data transmission function (transfer of upper layer PDUs)
In-sequence transfer function (in-sequence delivery of upper layer PDUs)
Out-of-sequence transfer function (out-of-sequence delivery of upper layer PDUs)
Automatic repeat request (ARQ) function (error correction through ARQ)
Concatenation, segmentation, and reassembly function (concatenation, segmentation and reassembly of RLC SDUs)
Re-segmentation function (re-segmentation of RLC data PDUs)
Reordering function (reordering of RLC data PDUs)
Duplicate detection function
Error detection function (protocol error detection)
RLC SDU discard function
RLC re-establishment function In the above, the in-sequence delivery function of the NR RLC device may refer to a function of sequentially transferring, to a higher layer, RLC SDUs received from a lower layer. The in-sequence delivery function of the NR RLC device may include a function of, when originally one RLC SDU is segmented into multiple RLC SDUs and then received, reassembling and transferring the received RLC SDUs, may include a function of reordering the received RLC PDUs according to an RLC sequence number (SN) or a PDCP sequence number (SN), may include a function of reordering a sequence and recording lost RLC PDUs, may include a function of reporting states of the lost RLC PDUs to a transmission side, and may include a function of requesting retransmission of the lost RLC PDUs. The in-sequence delivery function of the NR RLC device may include a function of, when there is a lost RLC SDU, sequentially transferring only RLC SDUs before the lost RLC SDU to a higher layer, or may include a function of, even if there is a lost RLC SDU, if a predetermined timer expires, sequentially transferring, to the higher layer, all the RLC SDUs received before the timer starts. Alternatively, the in-sequence delivery function of the NR RLC device may include a function of, even if there is a lost RLC SDU, if a predetermined timer expires, sequentially transferring all currently received RLC SDUs to the higher layer. In the above, the RLC PDUs may be processed in the order of reception thereof (in the order of arrival regardless of the order of the sequence numbers or serial numbers) and may be transferred to the PDCP device regardless of the order (out-of-sequence delivery). In the case of segments, segments stored in a buffer or to be received at a later time may be received, reconfigured into one complete RLC PDU, processed, and then may be transferred to the PDCP device. The NR RLC layer may not include a concatenation function, and the function may be performed in an NR MAC layer or may be replaced with a multiplexing function of the NR MAC layer.

In the above, the out-of-sequence transfer function (out-of-sequence delivery) of the NR RLC device refers to a function of transferring RLC SDUs received from a lower layer to an immediate higher layer regardless of the order, may include a function of, when originally one RLC SDU is divided into multiple RLC SDUs and received, reassembling and transferring the received RLC SDUs, and may include a function of storing the RLC SN or PDCP SN of the received RLC PDUs, arranging the order thereof, and recording lost RLC PDUs.

The NR MACs S40 and S55 may be connected to multiple NR RLC layer devices included in one terminal, and main functions of the NR MACs may include some of the following functions.

Mapping function (mapping between logical channels and transport channels)
    Multiplexing and demultiplexing function (multiplexing/demultiplexing of MAC SDUs)
    Scheduling information reporting function
    HARQ function (error correction through HARQ)
    Function of priority handling between logical channels (priority handling between logical channels of one UE)
    Function of priority handling between UEs (priority handling between UEs by means of dynamic scheduling)
    MBMS service identification function
    Transport format selection function
    Padding function The NR PHY layers S45 and S50 may perform channel-coding and modulation of higher layer data, make the channel-coded and modulated higher layer data into OFDM symbols, and transmit the OFDM symbols via a radio channel, or may perform demodulation and channel-decoding of the OFDM symbols received through the radio channel and transfer the same to the higher layer.

The detailed structure of the radio protocol structure may be variously changed according to a carrier (or cell) operating method. For example, when the base station transmits, based on a single carrier (or cell), data to the terminal, the base station and the terminal use a protocol structure having a single structure for each layer, as shown in S00. On the other hand, when the base station transmits data to the terminal, based on carrier aggregation (CA) using multiple carriers in a single TRP, the base station and the terminal use a protocol structure in which a single structure is applied up to the RLC but the PHY layer is multiplexed via the MAC layer, as shown S10. As another example, when the base station transmits data to the terminal, based on dual connectivity (DC) using multiple carriers in multiple TRPs, the base station and the terminal use a protocol structure in which a single structure is applied up to the RLC but the PHY layer is multiplexed via the MAC layer, as shown in S20.

Referring to the aforementioned PDCCH and beam configuration-related descriptions, PDCCH repetitive transmission is not supported currently in Rel-15 and Rel-16 NR, and it is thus difficult to achieve required reliability in a scenario requiring high reliability, such as URLLC. The disclosure provides a method of PDCCH repetitive transmission via multiple transmission points (TRPs) so to improve PDCCH reception reliability of a terminal. Specific methods will be described below in the following embodiments.

Hereinafter, an embodiment of the disclosure is described below with the accompanying drawings. Contents of the disclosure are applicable in frequency division duplex (FDD) and time division duplex (TDD) systems. Hereinafter, in the disclosure, higher signaling (or higher layer signaling) is a method of transferring a signal from a base station to a terminal by using a physical layer downlink data channel or transferring a signal from a terminal to a base station by using a physical layer uplink data channel, and may be referred to as RRC signaling, PDCP signaling, or a medium access control (MAC) control element (MAC CE).

Hereinafter, in the disclosure, in determining whether to apply cooperative communication, it is possible for a terminal to use various methods, in which a PDCCH(s) assigning a PDSCH to which the cooperative communication is applied has a specific format, a PDCCH(s) assigning a PDSCH to which the cooperative communication is applied includes a specific indicator indicating whether the cooperative communication is applied, a PDCCH(s) assigning a PDSCH to which the cooperative communication is applied is scrambled with a specific RNTI, applying of the cooperative communication in a specific section indicated by a higher layer is assumed, or the like. Hereinafter, for the convenience of description, a case in which a terminal receives a PDSCH to which cooperative communication has been applied based on conditions similar to the above will be referred to as an NC-JT case.

Hereinafter, in the disclosure, determination of the priority between A and B may be mentioned in various ways, such as selecting one having a higher priority according to a predetermined priority rule so as to perform an operation corresponding thereto, or omitting or dropping an operation having a lower priority.

Hereinafter, in the disclosure, descriptions of the examples will be provided via multiple embodiments of the disclosure, but these are not independent of each other, and it is possible that one or more embodiments are applied concurrently or in combination.

Hereinafter, an embodiment of the disclosure is described below with the accompanying drawings. Hereinafter, a base station is a subject that performs resource allocation to a terminal, and may be at least one of a gNode B, a gNB, an eNode B, a Node B, a base station (BS), a radio access unit, a base station controller, or a node on a network. A terminal may include a user equipment (UE), a mobile station (MS), a cellular phone, a smartphone, a computer, or a multimedia system capable of performing a communication function. Hereinafter, an embodiment of the disclosure will be described using the 5G system as an example, but the embodiment of the disclosure may also be applied to other communication systems having a similar technical background or channel type. For example, LTE or LTE-A mobile communication and a mobile communication technology developed after 5G may be included therein. Therefore, an embodiment of the disclosure may be applied to other communication systems via some modifications without departing from the scope of the disclosure, according to determination by those skilled in the art. Contents of the disclosure are applicable in FDD and TDD systems.

In addition, in description of the disclosure, when it is determined that a detailed description of a related function or configuration may unnecessarily obscure the subject matter of the disclosure, the detailed description thereof will be omitted. Terms to be described hereinafter are terms defined based on functions in the disclosure, and may vary depending on intention or usage of users or operators. Therefore, the definition should be based on contents throughout the specification.

Hereinafter, in description of the disclosure, higher layer signaling may be signaling corresponding to at least one of the following signaling types or a combination of one or more thereof.

Master information block (MIB)
    System information block (SIB) or SIB X (X=1, 2, . . . )
    Radio resource control (RRC)
    Medium access control (MAC) control element (CE)

In addition, L1 signaling may be signaling corresponding to at least one of signaling methods using the following physical layer channels or signaling types or a combination of one or more thereof.

Physical downlink control channel (PDCCH)
    Downlink control information (DCI)
    Terminal-specific (UE-specific) DCI Group common DCI Common DCI DCI (e.g., DCI used for scheduling of downlink or uplink data)

Non-scheduling DCI (e.g., DCI not for the purpose of scheduling downlink or uplink data)

Physical uplink control channel (PUCCH)

Uplink control information (UCI)

Hereinafter, in the disclosure, determination of the priority between A and B may be mentioned in various ways, such as selecting one having a higher priority according to a predetermined priority rule so as to perform an operation corresponding thereto, or omitting or dropping an operation having a lower priority.

Hereinafter, in the disclosure, descriptions of the examples will be provided via multiple embodiments of the disclosure, but these are not independent of each other, and it is possible that one or more embodiments are applied concurrently or in combination.

Relating to Type-1 HARQ-ACK Codebook

Figure 11:
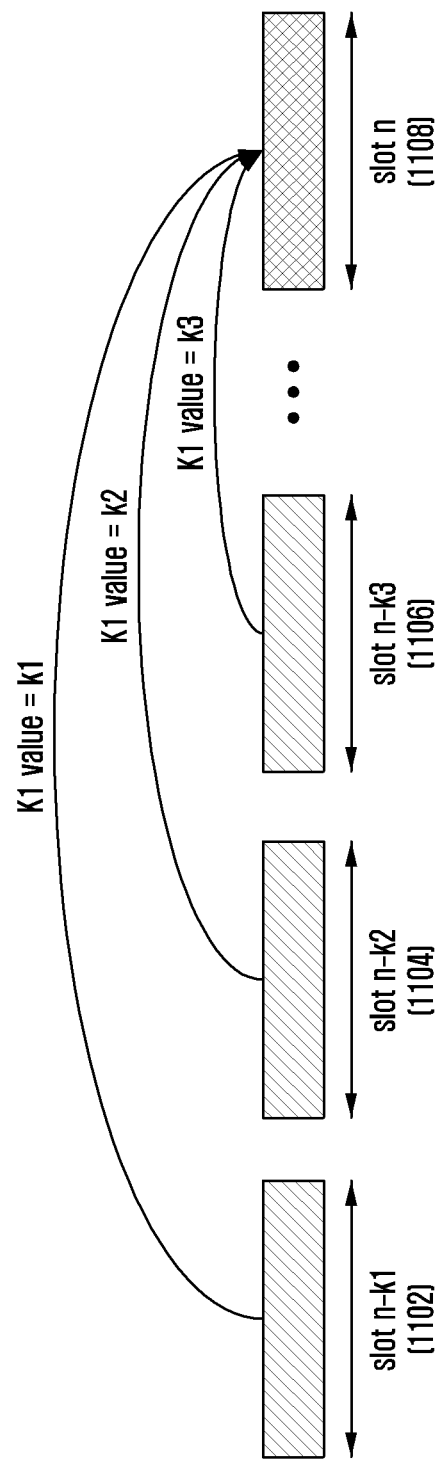
FIG. 11 is a diagram illustrating a Type-1 hybrid automatic repeat request acknowledgement (HARQ-ACK) generation method according to an embodiment of the disclosure.

FIG. 11 is a diagram illustrating Type-1 HARQ-ACK codebook configuration method in the NR system according to an embodiment of the disclosure.

Referring to FIG. 11, for reference, a Type-1 HARQ-ACK codebook is also called a semi-static HARQ-ACK codebook.

The following description corresponds to a situation in which the number of PUCCHs on which a terminal may transmit HARQ-ACK information within one time unit (e.g., a slot, a sub-slot, or a mini-slot) is limited to one. Unless otherwise specified, the time unit is described as a slot, but it may be extended to a sub-slot, a mini-slot, and the like.

A terminal may receive a semi-static HARQ-ACK codebook configuration from a base station. The configuration may be configured via a higher layer signal (e.g., an RRC signal). The terminal may receive a DCI format from the base station. The terminal may transmit HARQ-ACK information of an Scell dormancy indication, an SPS PDSCH release, or a PDSCH scheduled by the DCI format, in a slot indicated by a value of a PDSCH-to-HARQ_feedback timing indicator field in the DCI format. If the terminal is indicated to transmit multiple pieces of HARQ-ACK information in one slot, the terminal may generate the HARQ-ACK information as an HARQ-ACK codebook according to a predetermined rule and transmit the same via one PUCCH in the slot.

Rules for generating a more specific semi-static HARQ-ACK codebook are as follows.

The terminal reports NACK for an HARQ-ACK information bit value in the HARQ-ACK codebook, in a slot that is not indicated by the PDSCH-to-HARQ_feedback timing indicator field in the DCI format. If the terminal reports only HARQ-ACK information for one SPS PDSCH release or one PDSCH reception in $M_{A,c}$ cases for candidate PDSCH reception, and when the report is scheduled by DCI format 1_0 including information indicating that a counter DAI field indicates 1 in a PCell, the terminal determines one HARQ-ACK codebook for the SPS PDSCH release or the corresponding PDSCH reception.

Otherwise, a method of determining an HARQ-ACK codebook according to the method described below is followed.

When a set of PDSCH reception candidate cases in serving cell c is $M_{A,c}$, $M_{A,c}$ may be obtained via the following [pseudo-code 1] operations.

For the convenience of the disclosure, a PDSCH-to-HARQ_feedbak timing indicator value is referred to as a K1 value. The terminal may be configured with multiple K1 values, and the multiple K1 values are collectively called as a K1 set.

[Start of Pseudo-Code 1]

Operation 0: Initializing $M_{A,c}$ to an empty set. Initializing k to 0.

Operation 1: Selecting a k-th largest K1 value from a configured K1 set. (For example, if k=0, a largest K1 value is selected from the K1 set, and if k=1, a second largest K1 value is selected from the K1 set.)

Operation 2: Determining set R according to the K1 value. Set R is configured as a set of scheduling information (slot information (hereinafter, a K0 value) to which a PDSCH is mapped, and start symbol and length information (hereinafter, starting and length value (SLIV))) configured in a time domain resource assignment (TDRA) table. If a symbol corresponding to the start symbol and length information (SLIV) corresponding to one piece of scheduling information belonging to set R overlaps a symbol configured for an uplink in a higher layer, the row may be excluded from set R.

Operation 3-1: If the terminal is able to receive up to one unicast PDSCH in one slot, and R is not an empty set, adding one unicast PDSCH to set $M_{A,c}$.

Operation 3-2: If the terminal is able to receive more than one unicast PDSCH in one slot, counting the number of PDSCHs assignable to different symbols in the determined R, and adding the corresponding number of unicast PDSCHs to $M_{A,c}$.

Operation 4: Increasing k by 1, and restarting from operation 2.

[End of Pseudo-Code 1]

For the aforementioned pseudo-code 1, referring to FIG. 11 as an example, PUCCH transmission including HARQ-ACK information is performed in slot n 1108. It is assumed that k1, k2, and k3 are configured as K1 values for the terminal. All slot candidates capable of indicating slot n 1108 to the terminal are considered based on the configured K1 values. Referring to FIG. 11, when k1 is configured as a K1 value, HARQ-ACK of a PDSCH scheduled in slot n-k1 1102 may be transmitted in slot n 1108. Similarly, if n-k2 and n-k3 are configured as K1 values, HARQ-ACK of a PDSCH scheduled in slots n-k2 1104 and n-k3 1106 may be transmitted in slot n 1108. Therefore, slots n-k1 1102, slot n-k2 1104, and slot n-k3 1106 are slots in which a PDSCH corresponding to HARQ-ACK information of slot n 1108 may be scheduled according to the K1 values of k1, k2, and k3. Based on time domain resource configuration information of the PDSCH available for scheduling in each of slot 1102, 1104, and 1106 and configuration information indicating whether a symbol within a slot is for a downlink or an uplink, the maximum number of PDSCH candidates available for scheduling for each slot is derived. For example, when up to two PDSCH candidates, up to three PDSCH candidates, and up to two PDSCH candidates are available for scheduling in slot 1102, slot 1104, and slot 1106, respectively, the maximum number of PDSCH candidates included in the HARQ-ACK codebook transmitted in slot 1108 is a total of seven. This is referred to as cardinality of the HARQ-ACK codebook. For reference, the cardinality of the HARQ-ACK codebook may be different from the actual number of bits included in the codebook. The actual number of bits may be determined according to a configuration, such as the number of transport blocks included in each PDSCH, the number of code block groups (CBGs) included in each PDSCH, or spatial bundling.

The aforementioned pseudo-code is described in 9.1.2.1 of 3GPP standard document TS38.213. In the disclosure, for description, the pseudo-code of v16.6.0 of the standard document will be described. The pseudo-code is as follows.

```
TS38.213 v16.6.0 pseudo-code
Set j = 0 - index of occasion for candidate PDSCH reception or SPS PDSCH release
Set B = Ø
Set MA = Ø

Set 𝒞(K₁) to the cardinality of set K₁
Set k = 0 - index of slot timing values K₁,ₖ, in descending order of the slot timing
values, in set K₁ for serving cell c
If a UE is not provided ca-SlotOffset for any serving cell of PDSCH receptions and for
the serving cell of corresponding PUCCH transmission with HARQ-ACK information
   while k < 𝒞(K₁)
      if mod (n_U − K₁,ₖ + 1, max(2^(μUL−μDL), 1)) = 0
         Set n_D = 0 - index of a DL slot within an UL slot
         while n_D < max(2^(μUL−μDL), 1)
            Set R to the set of rows Set 𝒞(R) to the cardinality of R
            Set r = 0 - index of row in set R
            if slot n_U starts at a same time as or after a slot for an active DL BWP change
            on serving cell c or an active UL BWP change on the PCell and slot
            ⌊(n_U − K₁,ₖ) · 2^(μUL−μDL)⌋ + n_D is before the slot for the active DL BWP change on
            serving cell c or the active UL BWP change on the PCell
               n_D = n_D + 1;
            else
               while r < 𝒞(R)
                  if the UE is provided tdd-UL-DL-ConfigurationCommon, or tdd-UL-DL-
                  ConfigurationDedicated and, for each slot from slot ⌊(n_U − K₁,ₖ) ·
                  2^(μUL−μDL)⌋ + n_D − N_PDSCH^(repeat,max) + 1 to slot ⌊(n_U − K₁,ₖ) · 2^(μUL−μDL)⌋ +
                  n_D, at least one symbol of the PDSCH time resource derived by row r is
                  configured as UL where K₁,ₖ is the k-th slot timing value in set K₁,
                     R = R\r ;
                  else
                     r = r + 1;
                  end if
               end while
               if the UE does not indicate a capability to receive more than one unicast
               PDSCH per slot and R ≠ Ø,
                  M_{A,c} = M_{A,c} ∪ j;
                  j = j + 1;
               else
                  Set 𝒞(R) to the cardinality of R
                  Set m to the smallest last OFDM symbol index, as determined by the
                     SLIV, among all rows of R
                  while R ≠ Ø
                     Set r = 0 while r < 𝒞(R)
                        if S ≤ m for start OFDM symbol index S for row r
                           b_{r,k,n_D} = j; - index of occasion for candidate PDSCH reception or
                              SPS PDSCH release associated with row r
                           R = R\r ;
                           B = B ∪ b_{r,k,n_D};
                        else
                           r = r + 1;
                        end if
                     end while
                     j = j + 1;
                     Set m to the smallest last OFDM symbol index among all rows of
                        R;
                  end while
               end if
               n_D = n_D + 1;
            end if
         end while
      end if
      k = k + 1;
   end while
else
   while k < 𝒞(K₁)

if mod
```

$$\left(n_U - K_{1,k} + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{UL}} \right\rfloor + 1, \max(2^{\mu_{UL}-\mu_{DL}}, 1)\right) = 0$$

-continued

```
Set n_D = 0 - index of a DL slot within an UL slot
while n_D < max(2^(μUL-μDL), 1)
    Set R to the set of rows
    Set 𝒞(R) to the cardinality of R
    Set r = 0 - index of row in set R
if slot n_U starts at a same time as or after a slot for an active DL BWP change on
    serving cell c or an active UL BWP change on the PCell and slot
```

$$\lfloor (n_U - K_{1,k}) \cdot 2^{\mu_{DL} - \mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D$$

```
    is before the slot for the active DL BWP change on serving cell c or the
    active UL BWP change on the PCell
        n_D = n_D + 1;
    else
        while r < 𝒞(R)
            if the UE is provided tdd-UL-DL-ConfigurationCommon, or tdd-UL-DL-
                ConfigurationDedicated and, for each slot from slot ⌊(n_U - K_{1,k}) ·
```

$$2^{\mu_{DL} - \mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D - N^{repeat,max}_{PDSCH} + 1$$

$$\text{to slot } \lfloor (n_U - K_{1,k}) \cdot 2^{\mu_{DL} - \mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D,$$

```
            at least one symbol of the PDSCH time resource derived by row r is
                configured as UL where Ky is the k-th slot timing value in set K_1,
                R = R\r ;
            else
                r = r + 1;
            end if
        end while
        if the UE does not indicate a capability to receive more than one unicast
            PDSCH per slot and R≠∅,
            M_{A,c} = M_{A,c} ∪ j;
            j = j + 1;
        else
            Set 𝒞(R) to the cardinality of R
            Set m to the smallest last OFDM symbol index, as determined by the
                SLIV, among all rows of R
            while R ≠ ∅
                Set r = 0
                while r < 𝒞(R)
                    if S ≤ m for start OFDM symbol index S for row r
                        b_{r,k,n_D} = j; - index of occasion for candidate PDSCH reception or
                            SPS PDSCH release associated with row r
                        R = R\r;
                        B = B ∪ b_{r,k,n_D};
                    else
                        r = r + 1;
                    end if
                end while
                M_{A,c} = M_{A,c} ∪ j;
                j = j + 1;
                Set m to the smallest last OFDM symbol index among all rows of
                    R;
            end while
        end if
        n_D = n_D + 1;
    end if
end while
end if
k = k + 1;
end while
end if
```

In addition, definitions of the above pseudo-code symbols may be found in 3GPP standard document TS38.213.

Relating to Multi-PDSCH/PUSCH Scheduling

A new scheduling method has been introduced in Rel-17 new radio (NR) of 3$^{rd}$ generation partnership project (3GPP). The disclosure relates to the new scheduling method. The new scheduling method introduced in Rel-17 NR is "multi-PDSCH scheduling" in which one piece of DCI enables scheduling of one or multiple PDSCHs and "multi-PUSCH scheduling" in which one piece of DCI enables scheduling of one or multiple PUSCHs. In multiple PDSCHs or multiple PUSCHs, each PDSCH or each PUSCH transmits a different transport block (TB). By using the multi-PDSCH scheduling and the multi-PUSCH scheduling, the base station does not schedule multiple pieces of DCI for scheduling of each of multiple PDSCHs or multiple PUSCHs for the terminal, and overhead of a downlink control channel may be thus reduced. However, since one piece of DCI for the multi-PDSCH scheduling and multi-PUSCH scheduling needs to include scheduling information for multiple PDSCHs or multiple PUSCHs, the size of the DCI may be increased. To this end, when multi-PDSCH scheduling and multi-PUSCH scheduling are configured for the terminal, a method for the terminal to properly interpret the DCI is required.

The disclosure has described multi-PDSCH scheduling, but the spirit of the technology proposed in the disclosure may be used in multi-PUSCH scheduling.

The base station may configure multi-PDSCH scheduling for the terminal. This allows the base station to explicitly configure, for the terminal, multi-PDSCH scheduling in a higher layer signal (e.g., a radio resource control (RRC) signal). This allows the base station to implicitly configure, for the terminal, multi-PDSCH scheduling in a higher layer signal (e.g., an RRC signal).

For multi-PDSCH scheduling for the terminal, the base station may configure a time domain resource assignment (TDRA) table via a higher layer signal (e.g., an RRC signal) as follows. One or multiple rows of the TDRA table may be included. The number of the rows may be configured to be up to N_rows, and a unique index may be assigned to each row. The unique index may be one value among 1, 2, . . . , N_row. Here, N_row may preferably be 16. One or multiple pieces of scheduling information may be configured for each row. Here, when one piece of scheduling information is configured in one row, the row schedules one PDSCH. For example, when the row is indicated, it may be said that single-PDSCH scheduling is indicated. When multiple pieces of scheduling information are configured in one row, the multiple pieces of scheduling information are used to schedule multiple PDSCHs in order. For example, when the row is indicated, it may be said that multi-PDSCH scheduling is indicated.

The scheduling information may be K0 values, SLIVs, and PDSCH mapping types. For example, when multi-PDSCH scheduling is indicated, the row may include multiple K0 values, SLIVs, and PDSCH mapping types. An N-th K0 value, an N-th SLIV, and an N-th PDSCH mapping type are scheduling information of an N-th PDSCH. For reference, one row may include a maximum of N_pdsch K0 values, SLIVs, and PDSCH mapping types. Here, preferably, N_pdsch=8. For example, one row may schedule up to 8 PDSCHs.

K0 indicates a slot in which a PDSCH is scheduled, and indicates a slot difference between a slot, in which a PDCCH transmitting DCI for scheduling of the PDSCH is received, and the slot in which the PDSCH is scheduled. For example, if K0=0, the PDSCH and the PDCCH are the same slot. The starting and length indicator value (SLIV) indicates an index of a symbol in which the PDSCH starts and the number of consecutive symbols to which the PDSCH is allocated within one slot. The PDSCH mapping type indicates information related to a position of a first DMRS (front-loaded DMRS) of the PDSCH. In a case of PDSCH mapping type A, the first DMRS (front-loaded DMRS) of the PDSCH starts at a third symbol or a fourth symbol of the slot, and in a case of PDSCH mapping type B, the first DMRS (front-loaded DMRS) of the PDSCH starts at a first symbol of symbols in which the PDSCH is scheduled.

When the row of the TDRA table is configured in the higher layer signal, some of the K0 value, SLIV, PDSCH mapping type may be omitted from scheduling information. In this case, an omitted value may be interpreted to have a default value. For example, if K0 is omitted, a value of K0 may be interpreted to be 0. When the row of the TDRA table is configured, information other than the K0 value, SLIV, and PDSCH mapping type may be additionally configured.

In the following description, multi-PDSCH scheduling is configured for the terminal. Here, the multi-PDSCH scheduling configuration is to configure multiple pieces of scheduling information in at least one row of the TDRA table. For reference, in another row of the TDRA table, one piece of scheduling information may be configured. Therefore, even if multi-PDSCH scheduling is configured for the terminal, single-PDSCH scheduling may be indicated or multi-PDSCH scheduling may be indicated to the terminal according to a TDRA field of the received DCI. In other words, the multi-PDSCH scheduling indication is a case in which the row of the TDRA table indicated to the terminal from the DCI includes multiple pieces of scheduling information, and the single-PDSCH scheduling indication is a case in which the row of the TDRA table indicated to the terminal from the DCI includes one piece of scheduling information.

In the case of single-PDSCH scheduling indication, one PDSCH is scheduled, and the one PDSCH requires information, such as a modulation coding scheme (MCS), a new data indicator (NDI), a redundancy version (RV), and an HARQ process number (HPN). To this end, DCI indicating single-PDSCH scheduling needs to include information, such as an MCS, an NDI, an RV, and an HPN of the one PDSCH. More specifically, The DCI indicating single-PDSCH scheduling may include one MCS field. An MCS (i.e., a modulation scheme and a code rate of a channel code) indicated in the MCS field may be applied to one PDSCH scheduled by the DCI.

The DCI indicating single-PDSCH scheduling may include a 1-bit NDI field. An NDI value may be acquired from the 1-bit NDI field, and whether one PDSCH transmits a new transport block or retransmits a previous transport block may be determined based on the NDI value.

The DCI indicating single-PDSCH scheduling may include a 2-bit RV field. An RV value may be acquired from the 2-bit RV field, and a redundancy version of one PDSCH may be determined based on the RV value.

The DCI for single-PDSCH scheduling may include one HPN field. The one HPN field may be 4 bits. (For reference, if the terminal supports up to 32 HARQ processes, the HPN field may be extended to 5 bits, but an assumption of 4 bits is made for the convenience in description of the disclosure). One HARQ process ID may be indicated via the one HPN field. The one HARQ process ID may be an HARQ process ID of one scheduled PDSCH.

When multi-PDSCH scheduling is indicated, multiple PDSCHs are scheduled, and therefore each PDSCH needs information, such as an MCS, an NDI, an RV, and an HPN. To this end, DCI indicating multi-PDSCH scheduling needs to include information, such as an MCS, an NDI, an RV, and an HPN of each scheduled PDSCH. More specifically, The DCI indicating multi-PDSCH scheduling may include one MCS field. An MCS (i.e., a modulation scheme and a code rate of a channel code) indicated in the MCS field may be applied to all PDSCHs scheduled by the DCI. For example, the DCI for multi-PDSCH scheduling cannot schedule different PDSCHs by using different MCSs.

The DCI indicating multi-PDSCH scheduling may include a K-bit NDI field. Here, K may be a largest value in the number of scheduling information included in each row of the TDRA table. For example, when the TDRA table includes two rows, a first row includes 4 pieces of scheduling information, and a second row includes 8 pieces of scheduling information, K may equal to 8 (K=8). A k-th bit of the K-bit NDI field may indicate an NDI value of the PDSCH corresponding to k-th scheduling information. For example, a k-th PDSCH acquires the NDI value from the k-th bit of the K-bit NDI field, and whether the k-th PDSCH transmits a new transport block or retransmits a previous transport block may be determined based on the NDI value.

The DCI indicating multi-PDSCH scheduling may include a K-bit RV field. A k-th bit of the K-bit RV field may indicate an RV value of the PDSCH corresponding to k-th scheduling information. For example, the k-th PDSCH acquires the RV value from the k-th bit of the K-bit RV field, and a redundancy version of the k-th PDSCH may be determined based on the RV value.

The DCI indicating multi-PDSCH scheduling may include one HPN field. The one HPN field may be 4 bits. (For reference, if the terminal supports up to 32 HARQ processes, the HPN field may be extended to 5 bits, but an assumption of 4 bits is made for the convenience in description of the disclosure). One HARQ process ID may be indicated via the one HPN field. The one HARQ process ID may be an HARQ process ID of a first PDSCH among PDSCHs scheduled by the DCI indicating multi-PDSCH scheduling. The first PDSCH corresponds to first scheduling information. HPNs of subsequent PDSCHs are sequentially increased by one. For example, in a case of a second PDSCH (corresponding to second scheduling information), an HPN is a value obtained by increasing the HARQ process ID of the first PDSCH by 1. For reference, if the HARQ process ID exceeds a maximum HARQ process ID number (numOfHARQProcessID) configured for the terminal, a modulo operation is performed. In other words, if the HARQ process ID indicated by DCI is "x", an HARQ process ID of the k-th PDSCH is determined as follows.

HPN of $k$-th PDSCH=$(x+k-1)$modulo numOfHARQProcessID

As described above, when DCI indicates single-PDSCH scheduling, the DCI includes a 1-bit NDI field or a 2-bit RV field, and when DCI indicates multi-PDSCH scheduling, the DCI includes a K-bit NDI field or a K-bit RV field. For reference, a single-PDSCH scheduling indication or a multi-PDSCH scheduling indication is made in a TDRA field of DCI (that is, whether single-PDSCH scheduling is indicated or multi-PDSCH scheduling is indicated is determined according to the number of pieces of scheduling information included in a row of the indicated TDRA field). Accordingly, one piece of DCI should support both single-PDSCH scheduling and multi-PDSCH scheduling. If a length of DCI for the single-PDSCH scheduling indication and a length of DCI for the multi-PDSCH scheduling indication are different from each other, "0" should be added (padded) to DCI of a shorter length so as to match the lengths.

A procedure of DCI interpretation by the terminal is as follows. The terminal receives DCI. In this case, it is assumed that a length of the DCI is a larger of the length of the DCI for single-PDSCH scheduling indication and the length of the DCI for multi-PDSCH scheduling indication. The terminal may identify a position of the TDRA field in the DCI. The position of the TDRA field in the DCI for single-PDSCH scheduling indication and that in the DCI for multi-PDSCH scheduling indication may be the same. The terminal may determine, via the TDRA field, whether the DCI is for single-PDSCH scheduling indication or for multi-PDSCH scheduling indication. If the number of pieces of scheduling information included in an indicated row of the TDRA field is one, the DCI is determined to be for single-PDSCH scheduling indication, and if the number of pieces of scheduling information included in the row is two or more, the DCI is determined to be for multi-PDSCH scheduling indication. If the terminal determines that the DCI is for single-PDSCH scheduling indication, the DCI may be interpreted according to the determination. For example, it may be interpreted that an NDI field is 1 bit and an RV field is 2 bits. If the terminal determines that the DCI is for multi-PDSCH scheduling indication, the DCI may be interpreted according to the determination. For example, it may be interpreted that the NDI field is K bits and the RV field is K bits. For reference, positions of other fields in the DCI may vary according to a length of the NDI field or a length of the RV field. Therefore, for other fields, according to whether the DCI is for single-PDSCH scheduling indication or for multi-PDSCH scheduling indication, bit lengths of other fields may be the same, but positions within the DCI may be different.

Figure 12A:
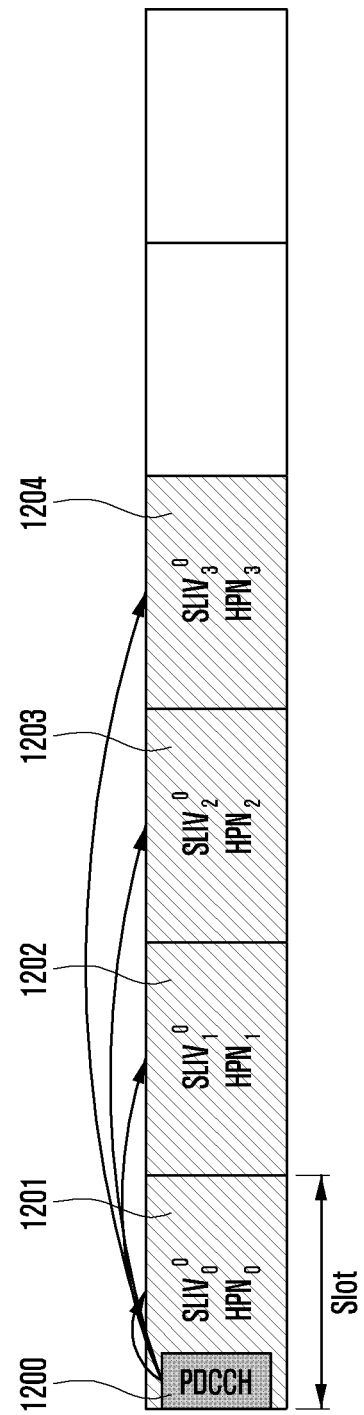
FIGS. 12A, 12B, and 12C are diagrams illustrating scheduling of multiple PDSCHs according to various embodiments of the disclosure.
Figure 12B:
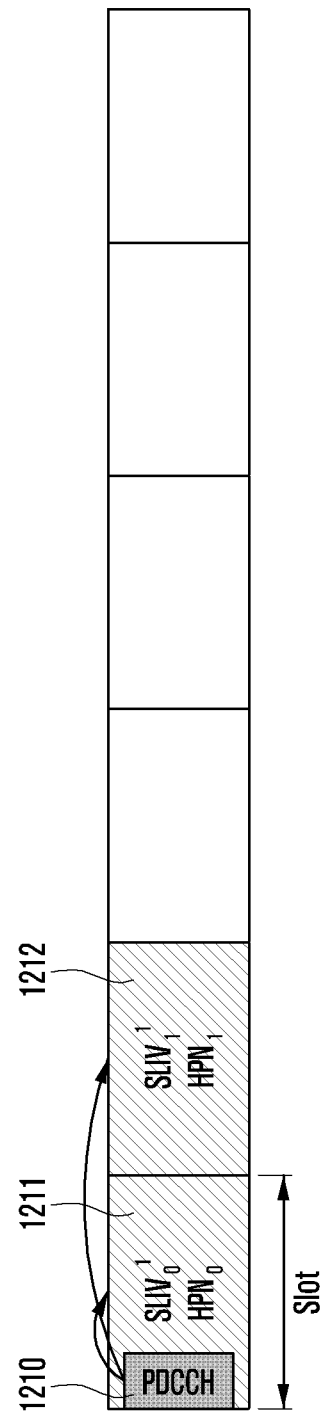
Figure 12C:
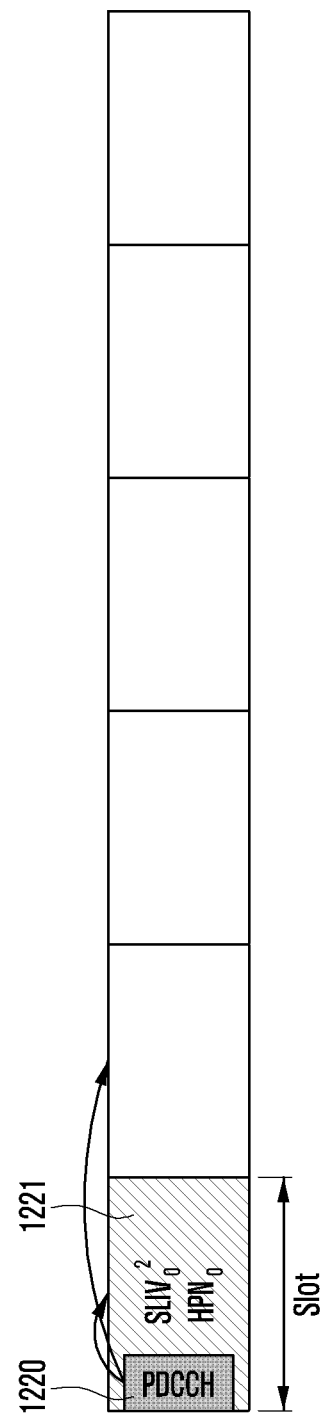

FIGS. 12A, 12B, and 12C illustrate PDSCH scheduling schemes according to various embodiments of the disclosure.

Referring to FIGS. 12A, 12B, and 12C, a first row (row 0) of a TDRA table includes four pieces of scheduling information (K0 values, SLIVs, and PDSCH mapping types). A first SLIV is referred to as $SLIV^0_0$, a second SLIV is referred to as $SLIV^0_1$, a third SLIV is referred to as $SLIV^0_2$, and a fourth SLIV is referred to as $SLIV^0_3$. Accordingly, when a terminal is indicated with the first row (row 0) of the TDRA table, it may be determined that multi-PDSCH scheduling is indicated.

A second row (row 1) of the TDRA table includes two pieces of scheduling information (K0 values, SLIVs, and PDSCH mapping types). A first SLIV is referred to as $SLIV^1_0$, and a second SLIV is referred to as $SLIV^1_1$. Accordingly, when the terminal is indicated with the second row (row 1) of the TDRA table, it may be determined that multi-PDSCH scheduling is indicated.

A third row (row 2) of the TDRA table includes one piece of scheduling information (K0 values, SLIVs, and PDSCH mapping types). Here, an SLIV is referred to as $SLIV^2_0$. Accordingly, when the terminal is indicated with the third row (row 2) of the TDRA table, it may be determined that single-PDSCH scheduling is indicated.

FIG. 12A illustrates a case in which the terminal is indicated with the first row (row 0) of the TDRA table. In DCI received by the terminal in a PDCCH 1200, the TDRA field may be indicated with the first row (row 0). Accordingly, the terminal may receive four PDSCHs, based on four pieces of scheduling information (K0 values, SLIVs, and PDSCH mapping types) in the first row (row 0). Symbols for receiving a first PDSCH 1201 may be determined based on $SLIV^0_0$ that is a first SLIV, symbols for receiving a second PDSCH 1202 may be determined based on $SLIV^0_1$ that is a second SLIV, symbols for receiving a third PDSCH 1203 may be determined based on $SLIV^0_2$ that is a third SLIV, and symbols for receiving a fourth PDSCH 1204 may be determined based on $SLIV^0_3$ that is a fourth SLIV. Each of the four PDSCHs may have a unique HARQ process ID. For example, the first PDSCH may have $HPN_0$ as an HARQ process ID, the second PDSCH may have $HPN_1$ as an HARQ process ID, the third PDSCH may have $HPN_2$ as an HARQ process ID, and the fourth PDSCH may have $HPN_3$ as an HARQ process ID. Here, the DCI indicates the HARQ process ID of the first PDSCH. For example, the DCI may indicate $HPN_0=0$ as the HARQ process ID of the first PDSCH. In this case, $HPN_1=1$ may be the HARQ process ID of the second PDSCH, $HPN_1=2$ may be the HARQ process ID of the third PDSCH, and $HPN_1=3$ may be the HARQ process ID of the fourth PDSCH.

FIG. 12B illustrates a case in which the terminal is indicated with the second row (row 1) of the TDRA table. In DCI received by the terminal in a PDCCH 1210, the TDRA field may be indicated with the second row (row 1). Accordingly, the terminal may receive two PDSCHs, based on two pieces of scheduling information (K0 values, SLIVs, and PDSCH mapping types) in the second row (row 1). Symbols for receiving a first PDSCH 1211 may be determined based on $SLIV^1_0$ that is a first SLIV, and symbols for receiving a second PDSCH 1212 may be determined based on $SLIV^1_1$ that is a second SLIV. Each of the two PDSCHs may have a unique HARQ process ID. For example, the first PDSCH may have $HPN_0$ as an HARQ process ID, and the second PDSCH may have $HPN_1$ as an HARQ process ID. Here, the DCI indicates the HARQ process ID of the first PDSCH. For example, the DCI may indicate $HPN_0=0$ as the HARQ process ID of the first PDSCH. In this case, the HARQ process ID of the second PDSCH may be $HPN_1=1$.

FIG. 12C illustrates a case in which the terminal is indicated with the third row (row 2) of the TDRA table. In DCI received by the terminal in a PDCCH 1220, the TDRA field may be indicated with the third row (row 2). Accordingly, the terminal may receive one PDSCH, based on one piece of scheduling information (K0 values, SLIVs, and PDSCH mapping types) in the third row (row 2). Symbols for receiving a PDSCH 1221 may be determined based on $SLIV^2_0$ that is one SLIV. The DCI indicates the HARQ process ID of one PDSCH, that is, $HPN_0$. For example, the DCI may indicate $HPN_0=0$ as the HARQ process ID of the first PDSCH.

The terminal may determine a position of the TDRA field in the received DCI. The position is at the same position in single-PDSCH scheduling DCI and multi-PDSCH scheduling DCI. Whether the received DCI is single-PDSCH scheduling DCI or multi-PDSCH scheduling DCI may be determined based on the TDRA field value.

If a row (e.g., the third row of the TDRA table (row 2)) corresponding to a value of the TDRA field of the received DCI includes one piece of scheduling information (K0 values, SLIVs, and PDSCH mapping types), the terminal interprets the DCI as single-PDSCH scheduling DCI. Single-PDSCH scheduling DCI includes a 5-bit MCS field, a 1-bit NDI field, a 2-bit RV field, and a 4-bits HARQ field. The single-PDSCH scheduling DCI may include other fields. For example, an antenna port(s) field, a DMRS sequence initialization field, or the like may be included. If single-PDSCH scheduling DCI is shorter than multi-PDSCH scheduling DCI, padding bits may be included.

If a row (e.g., the first row (row 0) or the second row (row 1) of the TDRA table) corresponding to a value of the TDRA field of the received DCI includes two or more pieces of scheduling information (K0 values, SLIVs, and PDSCH mapping types), the terminal interprets the DCI as multi-PDSCH scheduling DCI. Multi-PDSCH scheduling DCI includes a 5-bit MCS field, a K-bit NDI field, a K-bit RV field, and a 4-bit HARQ field. The multi-PDSCH scheduling DCI may include other fields. For example, an antenna port(s) field, a DMRS sequence initialization field, or the like may be included. For reference, DCI for scheduling of up to two PDSCHs is described as an example. A 2-bit NDI field may be an attachment of 2 bits. A 2-bit RV field may be an attachment of 2 bits.

If a length of DCI indicating single-PDSCH scheduling is shorter than a length of DCI indicating multi-PDSCH scheduling, padding bits may be added to the single-PDSCH scheduling DCI. If a length of DCI indicating single-PDSCH scheduling is longer than a length of DCI indicating multi-PDSCH scheduling, padding bits may be added to the DCI indicating multi-PDSCH scheduling.

Hereinafter, the disclosure assumes that a PDSCH transmits a single codeword unless otherwise specified. If transmission of two codewords is configured for a terminal, fields of DCI are for a first codeword unless otherwise specified.

Figure 13:
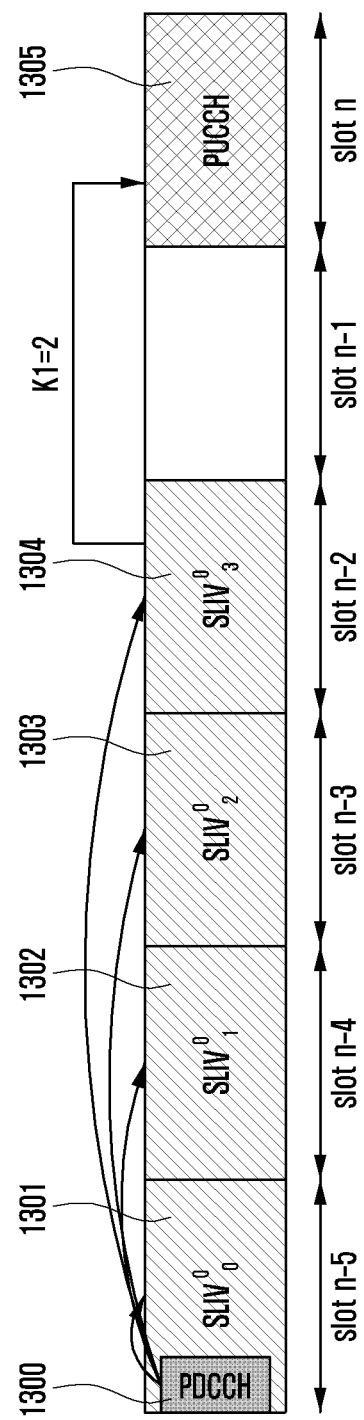
FIG. 13 is a diagram illustrating a method of transmitting HARQ-ACK of multiple PDSCHs according to an embodiment of the disclosure.

FIG. 13 illustrates a PUCCH 1305 for HARQ-ACK transmission of one or multiple PDSCHs scheduled by DCI when the DCI indicates multi-PDSCH scheduling according to an embodiment of the disclosure.

A base station may configure one or multiple K1 value(s) for a terminal. This may be referred to as a K1 set. In DCI received by the terminal in a PDCCH 1300, DCI indicating multi-PDSCH scheduling may include an indicator indicating one K1 value in the K1 set. More specifically, the DCI may include a PDSCH-to-HARQ_feedback timing indicator field having up to 3 bits. The field may indicate one K1 value in the K1 set.

The terminal may determine a slot for transmission of HARQ-ACK of multiple PDSCHs, based on one K1 value and a slot in which a last PDSCH of the multiple PDSCHs is scheduled. For reference, HARQ-ACK of all PDSCHs scheduled by one piece of DCI may be transmitted through one PUCCH in the slot for transmission of the HARQ-ACK. A slot after K1 slots from the slot in which the last PDSCH is scheduled is a slot for transmission of HARQ-ACK of multiple PDSCHs. For example, a PUCCH including the HARQ-ACK of multiple PDSCHs may be transmitted in the slot after K1 slots from the slot in which the last PDSCH is scheduled.

Referring to FIG. 13, it is assumed that DCI received by the terminal indicates row 0 of the TDRA table as shown in FIGS. 12A to 12C, and according to row 0 of the TDRA table, a PDSCH has been scheduled in slot n-5, slot n-4, slot n-3, and slot n-2. In addition, it is assumed that the terminal is indicated with 2 as a K1 value. In this case, the terminal may determine slot n as a slot for transmission of HARQ-ACK, wherein slot n is two slots, i.e., the K1 value, after slot n-2 that is the last slot in which the PDSCH is scheduled. For example, in the PUCCH 1305 of slot n, the terminal may transmit HARQ-ACK information of a PDSCH 1301 of slot n-5, a PDSCH 1302 of slot n-4, a PDSCH 1303 of slot n-3, and a PDSCH 1304 of slot n-2.

Relating to Extension of K1 Value

Figure 14A:
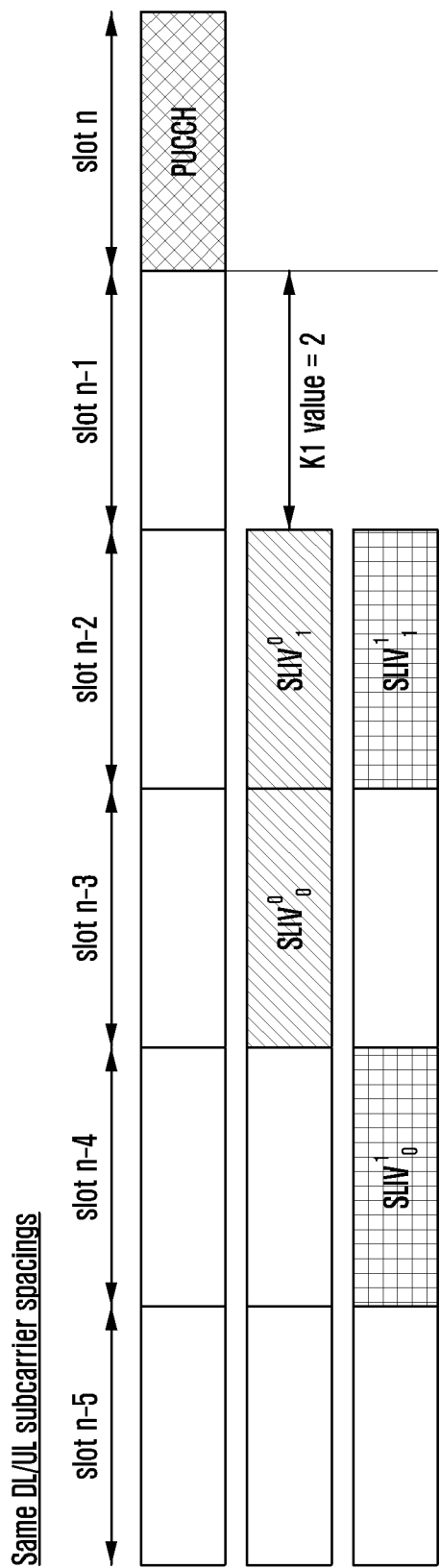
FIGS. 14A and 14B are diagrams illustrating a method of transmitting HARQ-ACK of multiple PDSCHs when downlink/uplink subcarrier spacings are a same, according to various embodiments of the disclosure.
Figure 14B:
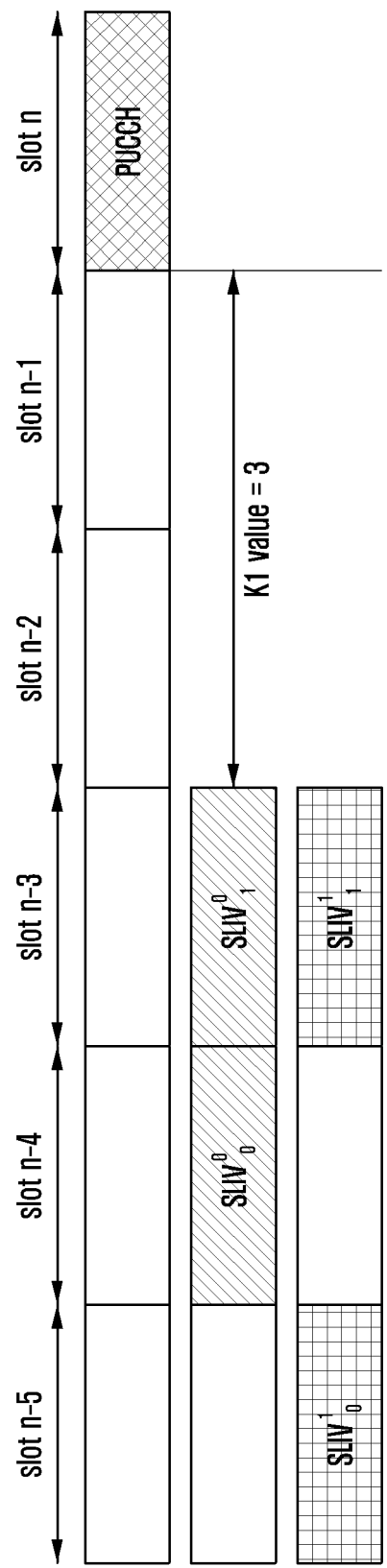

FIGS. 14A and 14B illustrate PDSCHs corresponding to HARQ-ACK of a PUCCH when a terminal transmits the HARQ-ACK in the PUCCH of slot n according to various embodiments of the disclosure.

Referring to FIGS. 14A and 14B, a downlink subcarrier spacing and an uplink subcarrier spacing are assumed to be the same. Accordingly, an index of an uplink slot and an index of a downlink slot are the same.

It is assumed that multi-PDSCH has been configured for the terminal and the TDRA table includes two rows as follows.

Row 0 includes two pieces of scheduling information (K0 values, SLIVs, and PDSCH mapping types). A SLIV of first scheduling information may be referred to as $SLIV^0_0$, and a SLIV of second scheduling information may be referred to as $SLIV^0_1$. A K0 value of the first scheduling information may be referred to as $K0^0_0$, and a K0 value of the second scheduling information may be referred to as $K0^0_1$. For reference, in this case, it is assumed that a difference between $K0^0_0$ and $K0^0_1$ is 1 (i.e., $K0^0_1-K0^0_0=1$). For example, if a first PDSCH is scheduled according to the first scheduling information in one downlink slot, a second PDSCH scheduled according to the second scheduling information is in a downlink slot immediately subsequent to the one downlink slot.

Row 1 includes two pieces of scheduling information (K0 values, SLIVs, and PDSCH mapping types). A SLIV of first scheduling information may be referred to as $SLIV^1_0$, and a SLIV of second scheduling information may be referred to as $SLIV^1_1$. A K0 value of the first scheduling information may be referred to as $K0^1_0$, and a K0 value of the second scheduling information may be referred to as $K0^1_1$. For reference, in this case, it is assumed that a difference between $K0^1_0$ and $K0^1_1$ is 2 (i.e., $K0^1_1 - K0^1_0 = 2$). For example, if a first PDSCH is scheduled according to the first scheduling information in one downlink slot, a second PDSCH scheduled according to the second scheduling information is in a downlink slot that is two slots after the one downlink slot.

It is assumed that 2 and 3 are configured as the K1 set for the terminal. For example, when the terminal transmits a PUCCH in slot n, last PDSCHs corresponding to HARQ-ACK included in the PUCCH may be determined according to a value of the K1 set 2 or 3.

Referring to FIG. 14A, when the K1 value in the K1 set is 2, HARQ-ACK of PDSCHs in which the last PDSCH is scheduled in slot n-2 should be included in slot n. If two PDSCHs corresponding to two pieces of scheduling information corresponding to row 0 of the TDRA table are scheduled in slots n-3 and n-2, respectively, since the last PDSCH of the two PDSCHs is scheduled in slot n-2, the HARQ-ACK of the two PDSCHs may be transmitted in slot n. If two PDSCHs corresponding to two pieces of scheduling information corresponding to row 1 of the TDRA table are scheduled in slots n-4 and n-2, respectively, since the last PDSCH of the two PDSCHs is scheduled in slot n-2, the HARQ-ACK of the two PDSCHs may be transmitted in slot n. Accordingly, the terminal needs to add, to the PUCCH of slot n, the HARQ-ACK of the PDSCHs of three slots with respect to one K1 value of 2. Therefore, even if the K1 value indicated to the terminal by the base station is 2, in terms of each PDSCH, the "extended" K1 value (a difference between a slot in which each PDSCH is scheduled and a slot in which HARQ-ACK is transmitted) corresponding to each PDSCH is 2, 3, and 4. Here, an "extended" K1 value of 2 corresponds to slot n-2, an "extended" K1 value of 3 corresponds to slot n-3, and an "extended" K1 value of 4 corresponds to slot n-4. For example, the PDSCHs (PDSCHs corresponding to $SLIV^0_1$ and $SLIV^1_1$ of FIG. 14A) of slot n-2 may transmit HARQ-ACK in slot n according to the "extended" K1 value of 2. The PDSCH (PDSCH corresponding to $SLIV^0_0$ of FIG. 14A) of slot n-3 may transmit HARQ-ACK in slot n according to the "extended" K1 value 3. The PDSCHs (PDSCH corresponding to $SLIV^1_0$ of FIG. 14A) of slot n-4 may transmit HARQ-ACK in slot n according to the "extended" K1 value of 4.

Referring to FIG. 14B, when the K1 value in the K1 set is 3, HARQ-ACK of PDSCHs in which the last PDSCH is scheduled in slot n-3 should be included in slot n. If two PDSCHs corresponding to two pieces of scheduling information corresponding to row 0 of the TDRA table are scheduled in slots n-4 and n-3, respectively, since the last PDSCH of the two PDSCHs is scheduled in slot n-3, the HARQ-ACK of the two PDSCHs may be transmitted in slot n. If two PDSCHs corresponding to two pieces of scheduling information corresponding to row 1 of the TDRA table are scheduled in slots n-5 and n-3, respectively, since the last PDSCH of the two PDSCHs is scheduled in slot n-3, the HARQ-ACK of the two PDSCHs may be transmitted in slot n. Accordingly, the terminal needs to add, to the PUCCH of slot n, the HARQ-ACK of the PDSCHs of three slots with respect to one K1 value of 3. Therefore, even if the K1 value indicated to the terminal by the base station is 3, in terms of each PDSCH, the "extended" K1 value (a difference between a slot in which each PDSCH is scheduled and a slot in which HARQ-ACK is transmitted) corresponding to each PDSCH is 3, 4, and 5. Here, an "extended" K1 value of 3 corresponds to slot n-3, an "extended" K1 value of 4 corresponds to slot n-4, and an "extended" K1 value of 5 corresponds to slot n-5. For example, the PDSCHs (PDSCHs corresponding to $SLIV^0_1$ and $SLIV^1_1$ of FIG. 14B) of slot n-3 may transmit HARQ-ACK in slot n according to the "extended" K1 value of 2. The PDSCH (PDSCH corresponding to $SLIV^0_0$ of FIG. 14B) of slot n-4 may transmit HARQ-ACK in slot n according to the "extended" K1 value 3. The PDSCHs (PDSCH corresponding to $SLIV^1_0$ of FIG. 14B) of slot n-5 may transmit HARQ-ACK in slot n according to the "extended" K1 value of 4.

Referring to FIGS. 14A and 14B, the terminal may interpret 2, which is the K1 value configured by the base station, as {2, 3, 4} which are the extended K1 values. The terminal may interpret 3, which is the K1 value configured by the base station, as {3, 4, 5}, which are the extended K1 values. The extended K1 set {2, 3, 4, 5}, which is a collection of the extended K1 values, may be used when generating a type-1 HARQ-ACK codebook for HARQ-ACK transmission in slot n.

More specifically, a pseudo-code for generation of the type-1 HARQ-ACK codebook using the extended K1 values is as follows. HARQ-ACK is transmitted in slot n.

[Start of Pseudo-code 2]
- Operation 0: Initializing $M_{A,c}$ to an empty set. Initializing k to 0.
- Operation 1: Selecting a k-th largest K1 value from an extended K1 set.
(For example, if k=0, a largest K1 value is selected from the K1 set, and if k=1, a second largest K1 value is selected from the K1 set.)
- Operation 2: Determining set R according to the K1 value. Set R is configured as a set of scheduling information (slot information (hereinafter, a K0 value) to which a PDSCH is mapped, and start symbol and length information (hereinafter, starting and length value (SLIV))) in a time domain resource assignment (TDRA) table. If multiple pieces of scheduling information are included in a row of the TDRA table, each piece of the scheduling information is included in set R. If a symbol corresponding to the start symbol and length information (SLIV) according to one piece of scheduling information belonging to set R overlaps a symbol configured for an uplink in a higher layer, the row may be excluded from set R. If a PDSCH according to the scheduling information does not transmit HARQ-ACK in slot n, the scheduling information is excluded.
- Operation 3-1: If the terminal is able to receive up to one unicast PDSCH in one slot, and R is not an empty set, adding one unicast PDSCH to set $M_{A,c}$.

- Operation 3-2: If the terminal is able to receive more than one unicast PDSCH in one slot, counting the number of PDSCHs assignable to different symbols in the determined R, and adding the corresponding number of unicast PDSCHs to $M_{A,c}$.
  - Operation 4: Increasing k by 1, and restarting from operation 2.
  [End of Pseudo-code 2]

The disclosure provides a method for generating a Type-1 HARQ-ACK codebook by gathering HARQ-ACK information of multiple PDSCHs when a terminal is scheduled with the multiple PDSCHs from one piece of DCI in a wireless communication system. The terminal may be configured with an uplink cell and a downlink cell having different subcarrier spacings, and may generate the Type-1 HARQ-ACK codebook, based on the subcarrier spacings.

More specifically, if a downlink subcarrier spacing is larger than an uplink subcarrier spacing, the terminal may determine a set of extended K1 values, based on K0 values or SLIVs of multiple PDSCHs, which may be indicated by DCI. In order to determine the extended K1 values, multiple offsets may be used, and the multiple offsets may be determined according to the downlink subcarrier spacing/uplink subcarrier spacing. For example, the multiple offsets may be equal to 0, 1, and a value of the downlink subcarrier spacing/uplink subcarrier spacing-1. The set of the extended K1 values may be determined based on K1 values obtained using the respective offsets. For example, a union of the K1 values obtained using respective offsets may be determined to be the set of the extended K1 values.

A method of determining the extended K1 values is as follows.

Same Subcarrier Spacing

It is assumed that a downlink subcarrier spacing and a uplink subcarrier spacing are the same. A case where a downlink subcarrier spacing and a uplink subcarrier spacing are different will be described later.

The terminal may refer a value as $K0_{max}$, wherein the value is largest in K0 values of scheduling information configured in one row of the TDRA table. The largest K0 value may be a K0 value corresponding to last scheduling information of one row. For reference, different rows of the TDRA table may have different $K0_{max}$ values. For example, referring to FIGS. 14A and 14B, in scheduling information of row 0, $K^0{}_0$ and $K^0{}_1$ are configured as K0 values. Here, a larger value between $K^0{}_0$ and $K^0{}_1$ is $K^0{}_1$. Therefore, $K0_{max}=K^0{}_1$ in row 0. In scheduling information of row 1, $K^1{}_0$ and $K^1{}_1$ are configured as K0 values. Here, a larger value between $K^1{}_0$ and $K^1{}_1$ is $K^1{}_1$. Therefore, $K0_{max}=K^1{}_1$ in row 1.

The terminal may obtain a difference between a K0 value of scheduling information configured in one row of the TDRA table and the calculated $K0_{max}$. Here, the difference may be a value obtained using $K0_{max}-K0$. This difference may be referred to as a K0 difference value. A K0 difference value of one piece of scheduling information indicates a difference between a slot in which a last PDSCH is scheduled and a slot in which a PDSCH is scheduled according to the scheduling information.

More specifically, in FIGS. 14A and 14B, a difference between $K^0{}_0$, which is a K0 value of first scheduling information of row 0 of the TDRA table, and $K0_{max}=K^0{}_1$ of row 0 is 1. For example, a difference between a slot in which a last PDSCH is scheduled and a slot of a PDSCH scheduled according to the first scheduling information is 1. Referring to FIG. 14A, if the slot in which the last PDSCH is scheduled is slot n-2, the slot in which the PDSCH is scheduled according to the first scheduling information in row 0 is slot n-3. Referring to FIGS. 14A and 14B, a difference between $K^1{}_0$, which is a K0 value of first scheduling information of row 1 of the TDRA table, and $K0_{max}=K^1{}_1$ of row 1 is 2. For example, a difference between a slot in which a last PDSCH is scheduled and a slot in which a PDSCH scheduled according to the first scheduling information is 2. Referring to FIG. 14A, if the slot in which the last PDSCH is scheduled is slot n-2, the slot in which the PDSCH is scheduled according to the first scheduling information in row 1 is slot n-4.

For reference, the obtained difference value of K0 is independent of the K1 value. For example, when referring to FIGS. 14A and 14B, the K1 values may be different from each other, but the obtained K0 difference values may be the same.

An "extended" K1 value may be obtained using the sum of the obtained K0 difference value and the configured K1 value. More specifically, referring to FIG. 14A, when the configured K1 value is 2, a K0 difference value corresponding to the first scheduling information of row 0 may be 1, and 3 which is the sum of 2 that is the configured K1 value and 1 that is the K0 difference value may be an "extended" K1 value corresponding to the first scheduling information of row 0. A K0 difference value corresponding to second scheduling information of row 0 may be 0, and 2 which is the sum of 2 that is the configured K1 value and 0 that is the K0 difference value may be an "extended" K1 value corresponding to the second scheduling information of row 0. Accordingly, the extended K1 values determined according to the two pieces of scheduling information of row 0 may be 2 and 3.

Referring to FIG. 14A, when the configured K1 value is 2, a K0 difference value corresponding to the first scheduling information of row 1 may be 2, and 4 which is the sum of 2 that is the configured K1 value and 2 that is the K0 difference value may be an "extended" K1 value corresponding to the first scheduling information of row 1. A K0 difference value corresponding to second scheduling information of row 1 may be 0, and 2 which is the sum of 2 that is the configured K1 value and 0 that is the K0 difference value may be an "extended" K1 value corresponding to the second scheduling information of row 1. Accordingly, the extended K1 values determined according to the two pieces of scheduling information of row 1 may be 2 and 4.

Therefore, when the configured K1 value is 2, the extended K1 values are 2 and 3 according to row 0, and 2 and 4 according to row 1.

Referring to FIG. 14B, when the configured K1 value is 3, the K0 difference value corresponding to the first scheduling information of row 0 may be 1, and 4 which is the sum of 3 that is the configured K1 value and 1 that is the K0 difference value may be the "extended" K1 value corresponding to the first scheduling information of row 0. The K0 difference value corresponding to the second scheduling information of row 0 may be 0, and 3 which is the sum of 3 that is the configured K1 value and 0 that is the K0 difference value may be the "extended" K1 value corresponding to the second scheduling information of row 0. Accordingly, the extended K1 values determined according to the two pieces of scheduling information of row 0 may be 3 and 4.

Referring to FIG. 14B, when the configured K1 value is 3, the K0 difference value corresponding to the first scheduling information of row 1 may be 2, and 5 which is the sum of 3 that is the configured K1 value and 2 that is the K0 difference value may be the "extended" K1 value corresponding to the first scheduling information of row 1. The K0 difference value corresponding to the second scheduling information of row 1 may be 0, and 3 which is the sum of 3 that is the configured K1 value and 0 that is the K0 difference value may be the "extended" K1 value corresponding to the second scheduling information of row 0. Accordingly, the extended K1 values determined according to the two pieces of scheduling information of row 1 may be 3 and 5.

Therefore, when the configured K1 value is 3, the extended K1 values are 3 and 4 according to row 0, and 3 and 5 according to row 1.

Referring to FIGS. 14A and 14B, when the K1 values configured for the terminal are 2 and 3, the extended K1 values may be {2, 3, 4, 5}.

The above procedure may be represented in a pseudo-code as follows.

```
[Start of Pseudo-code 3]
  set K1 to the set of K1 values configured by gNB;
  set Number_of_rows to the number of rows in TDRA table;
  For r=0:Number_of_rows-1
    set K0(r) to the set of K0 values in row r of TDRA table;
    K0_difference(r) = maximum{K0(r)} - K0(r);
    K1_ext = K1_ext U {K1+K0_difference(r)}
  End For
[End of Pseudo-code 3]
```

Different Subcarrier Spacings

It is assumed that a downlink subcarrier spacing and a uplink subcarrier spacing are different. Although the description is made assuming that a downlink subcarrier spacing is greater than an uplink subcarrier spacing, the disclosure may be used even when a downlink subcarrier spacing is smaller than an uplink subcarrier spacing.

Figure 15A:
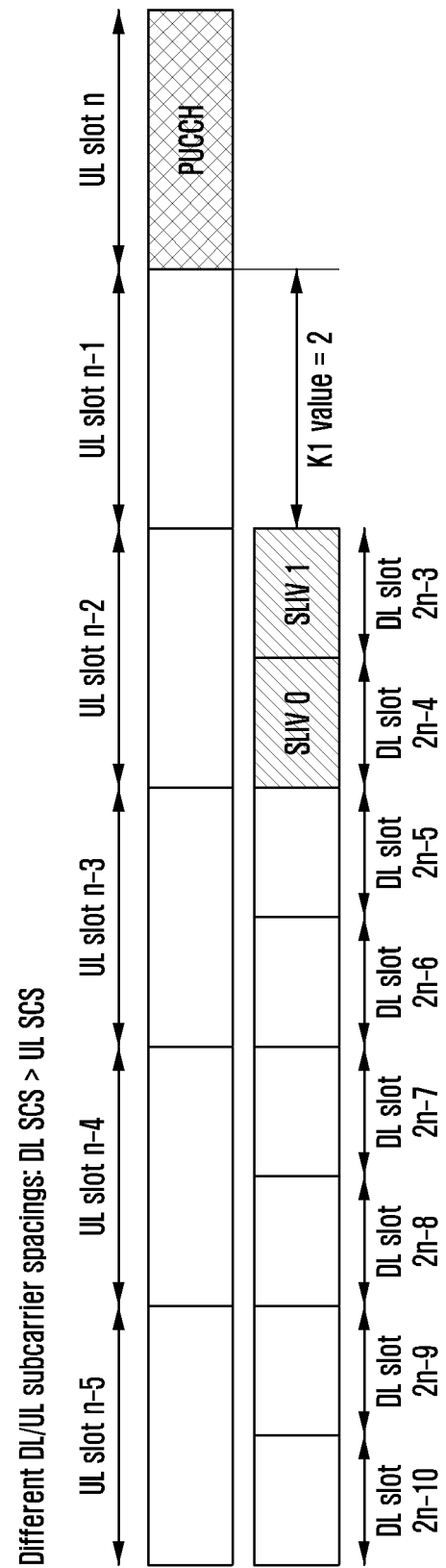
FIGS. 15A and 15B are diagrams illustrating a method of transmitting HARQ-ACK of multiple PDSCHs when a downlink subcarrier spacing is greater than an uplink subcarrier spacing, according to various embodiments of the disclosure.
Figure 15B:
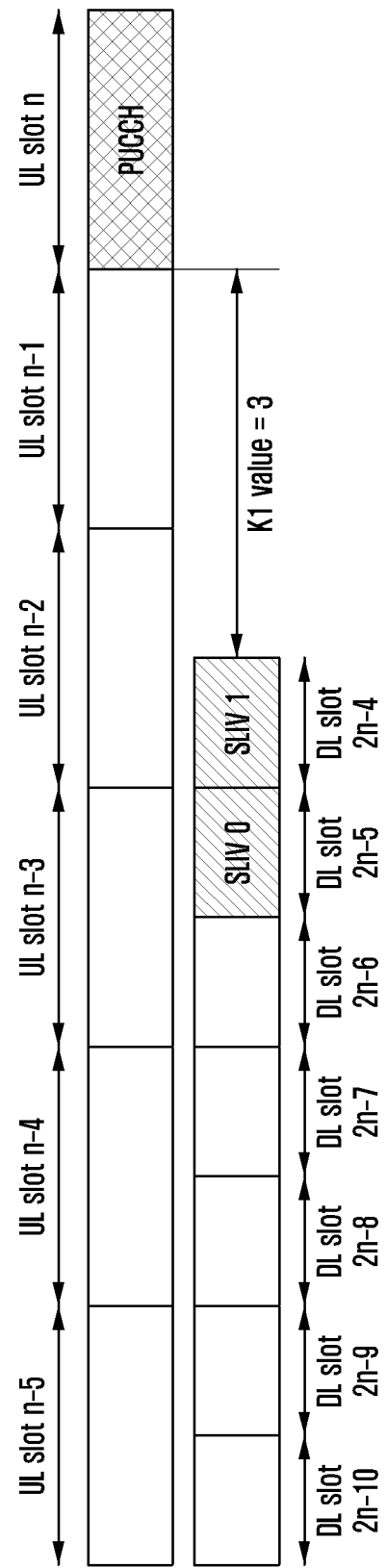

FIGS. 15A and 15B are diagrams illustrating a method of transmitting HARQ-ACK of multiple PDSCHs when a downlink subcarrier spacing is greater than an uplink subcarrier spacing, according to various embodiments of the disclosure.

Referring to FIGS. 15A and 15B, it is assumed that a downlink subcarrier spacing ($SCS_{DL}=15*2^{\mu DL}$ kHz) is twice an uplink subcarrier spacing ($SCS_{UL}=15*2^{\mu UL}$ kHz). For example, the downlink subcarrier spacing may be 960 kHz and the uplink subcarrier spacing may be 480 kHz. Since the downlink subcarrier spacing is greater than the uplink subcarrier spacing, multiple downlink slots may overlap one uplink slot. In this case, the number of overlapping downlink slots may be determined by the downlink subcarrier spacing/the uplink subcarrier spacing ($SCS_{DL}/SCS_{UL}$). Due to the different subcarrier spacings, an uplink slot index and a downlink slot index may be different.

One row of the TDRA table of the terminal is assumed to have two pieces of scheduling information. It is assumed that a K0 value of first scheduling information is $K0_0$, and an SLIV value of the first scheduling information is SLIV0. It is assumed that a K0 value of second scheduling information is $K0_1$, and an SLIV value of the second scheduling information is SLIV1. Here, a difference between $K0_0$ and $K0_1$ is assumed to be 1. For example, a PDSCH corresponding to SLIV0 and a PDSCH corresponding to SLIV1 are scheduled in two consecutive slots.

It is assumed that 2 is configured as a K1 value for the terminal. PDSCHs corresponding to HARQ-ACK of a PUCCH transmitted in uplink slot n are PDSCHs corresponding to uplink slot n-2 (slot corresponding to the K1 value difference from uplink slot n). Here, when a last time point of the PDSCH overlaps uplink slot n-2, this may indicate that the PDSCH corresponds to uplink slot n-2. In other words, referring to FIGS. 15A and 15B, if the last PDSCH among multiple PDSCHs is scheduled in downlink slot 2n-4 and downlink slot 2n-3, which overlap uplink slot n-2, the HARQ-ACK may be transmitted in slot n. Referring to FIG. 15A, since the last PDSCH among multiple PDSCHs is scheduled in downlink slot 2n-3, the HARQ-ACK of the two PDSCHs may be transmitted in uplink slot n. Referring to FIG. 15B, since the last PDSCH among multiple PDSCHs is scheduled in downlink slot 2n-4, the HARQ-ACK of the two PDSCHs may be transmitted in uplink slot n.

Referring to FIGS. 15A and 15B, the terminal may obtain an extended K1 value.

In the case of FIG. 15A, PDSCHs are scheduled in downlink slot 2n-4 and downlink slot 2n-3. Since both PDSCHs overlap uplink slot n-2, an extended K1 value is 2 for both PDSCHs. However, in the case of FIG. 15B, PDSCHs are scheduled in downlink slot 2n-5 and downlink slot 2n-4. In the PDSCHs, an extended K1 value of the PDSCH of subsequent slot 2n-4 is 2. On the other hand, since the PDSCH of preceding slot 2n-5 in the PDSCHs overlaps uplink slot n-3, an extended K1 value is 3. In this way, even if one K1 value is given to the terminal, different extended K1 values may be determined according to downlink slots in which the last PDSCH is received. Hereinafter, the disclosure describes a method of determining an extended K1 value in this situation.

Figure 16:
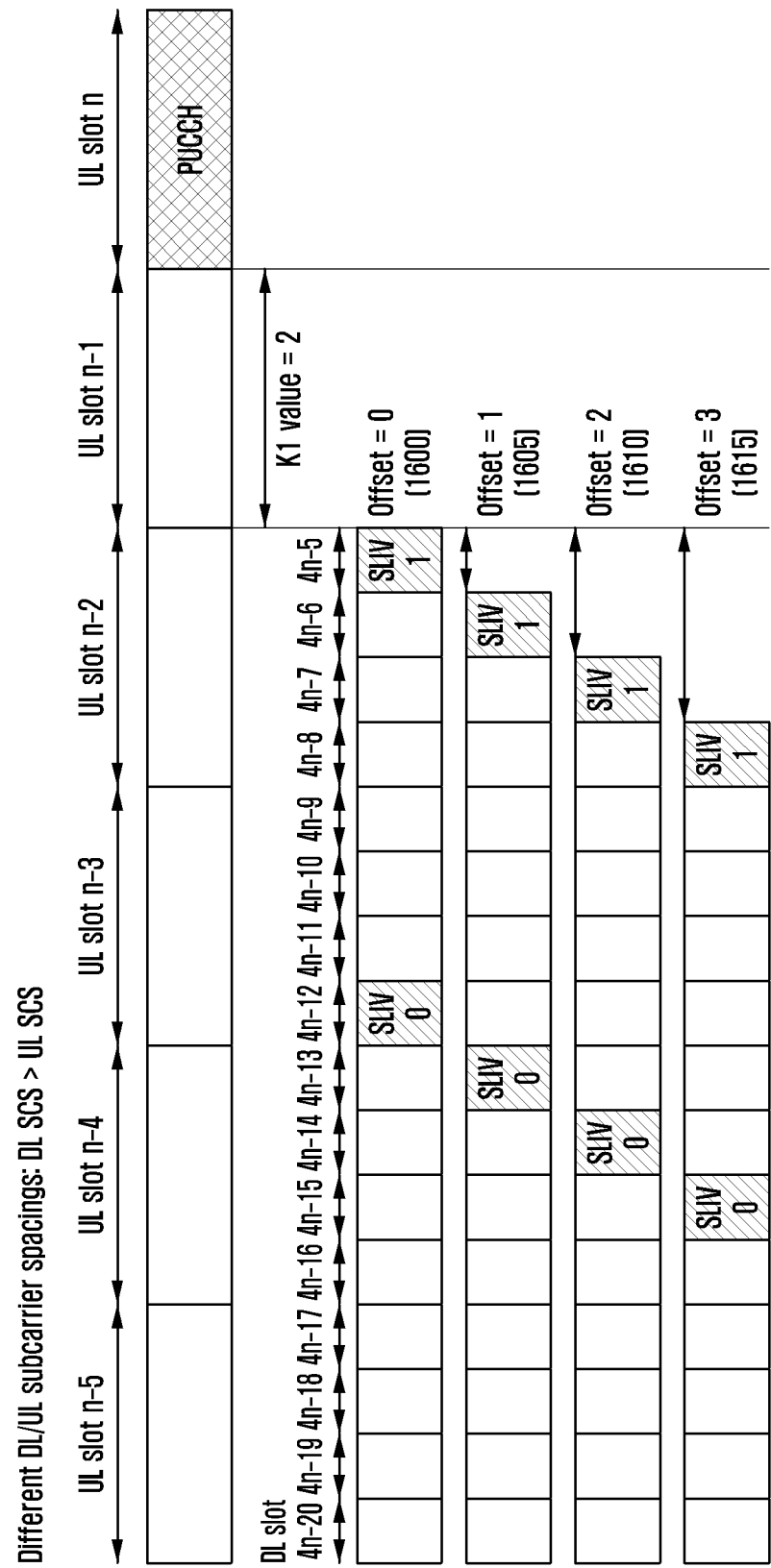
FIG. 16 is a diagram illustrating a method of transmitting HARQ-ACK of multiple PDSCHs by using all possible offsets when a downlink subcarrier spacing is greater than an uplink subcarrier spacing according to an embodiment of the disclosure.

FIG. 16 is a diagram illustrating a method of transmitting HARQ-ACK of multiple PDSCHs by using all possible offsets when a downlink subcarrier spacing is greater than an uplink subcarrier spacing, according to an embodiment of the disclosure.

Referring to FIG. 16, it is assumed that a downlink subcarrier spacing ($SCS_{DL}=15*2^{\mu DL}$ kHz) is 4 times greater than an uplink subcarrier spacing ($SCS_{UL}=15*2$ µUL kHz). For example, the downlink subcarrier spacing may be 480 kHz, and the uplink subcarrier spacing may be 120 kHz. Since the downlink subcarrier spacing is greater than the uplink subcarrier spacing, multiple downlink slots may overlap one uplink slot. In this case, the number of overlapping downlink slots may be determined by the downlink subcarrier spacing/the uplink subcarrier spacing ($SCS_{DL}/SCS_{UL}$). Due to the different carrier spacings, an uplink slot index and a downlink slot index may be different.

One row of the TDRA table of the terminal is assumed to have two pieces of scheduling information. It is assumed that a K0 value of first scheduling information is K00, and an SLIV value of the first scheduling information is SLIV0. It is assumed that a K0 value of second scheduling information is K01, and an SLIV value of the second scheduling information is SLIV1. Here, a difference between $K0_0$ and $K0_1$ is assumed to be 7. For example, a PDSCH corresponding to SLIV1 is scheduled in a slot 7 slots after a slot in which a PDSCH corresponding to SLIV0 is scheduled.

It is assumed that 2 is configured as a K1 value for the terminal. PDSCHs corresponding to HARQ-ACK of a PUCCH transmitted in uplink slot n are PDSCHs corresponding to uplink slot n-2 (slot corresponding to the K1 value difference from uplink slot n). Here, when a last time point of the PDSCH overlaps uplink slot n-2, this may indicate that the PDSCH corresponds to uplink slot n-2. In other words, referring to FIG. 16, if the last PDSCH among multiple PDSCHs is scheduled in downlink slot 4n-8, downlink slot 4n-7, downlink slot 4n-6, and downlink slot 4n-5, which overlap uplink slot n-2, the HARQ-ACK may be transmitted in slot n.

Referring to FIG. 16, the last PDSCH among multiple PDSCHs may be scheduled in downlink slot 4n-5. In this case, remaining one of the multiple PDSCHs may be scheduled in downlink slot 4n-12. In this case, since a first PDSCH scheduled in downlink slot 4n-12 overlaps uplink slot n-3, an extended K1 value is 3, and since a second PDSCH scheduled in downlink slot 4n-5 overlaps uplink slot n-2, an extended K1 value is 2.

Referring to FIG. 16, the last PDSCH among multiple PDSCHs may be scheduled in downlink slot 4n-6. In this case, remaining one of the multiple PDSCHs may be scheduled in downlink slot 4n-13. In this case, since a first PDSCH scheduled in downlink slot 4n-13 overlaps uplink slot n-4, an extended K1 value is 4, and since a second PDSCH scheduled in downlink slot 4n-5 overlaps uplink slot n-2, an extended K1 value is 2.

Referring to FIG. 16, the last PDSCH among multiple PDSCHs may be scheduled in downlink slot 4n-7. In this case, remaining one of the multiple PDSCHs may be scheduled in downlink slot 4n-14. In this case, since a first PDSCH scheduled in downlink slot 4n-14 overlaps uplink slot n-4, an extended K1 value is 4, and since a second PDSCH scheduled in downlink slot 4n-5 overlaps uplink slot n-2, an extended K1 value is 2.

Referring to FIG. 16, the last PDSCH among multiple PDSCHs may be scheduled in downlink slot 4n-8. In this case, remaining one of the multiple PDSCHs may be scheduled in downlink slot 4n-15. In this case, since a first PDSCH scheduled in downlink slot 4n-15 overlaps uplink slot n-4, an extended K1 value is 4, and since a second PDSCH scheduled in downlink slot 4n-5 overlaps uplink slot n-2, an extended K1 value is 2.

Therefore, in the case of FIG. 16, if the last PDSCH among the multiple PDSCHs is scheduled in downlink slot 4n-5, the extended K1 values are 2 and 3, and if the last PDSCH among the multiple PDSCHs is scheduled in downlink slot 4n-6, downlink slot 4n-7, or downlink slot 4n-8, the extended K1 values are 2 and 4. Accordingly, {2,3,4} that is a union of the extended K1 values may be determined to be an extended K1 set.

As a preferred embodiment of the disclosure, the extended K1 set may be obtained as follows. This may be described using the flowchart of FIG. 17.

Figure 17:
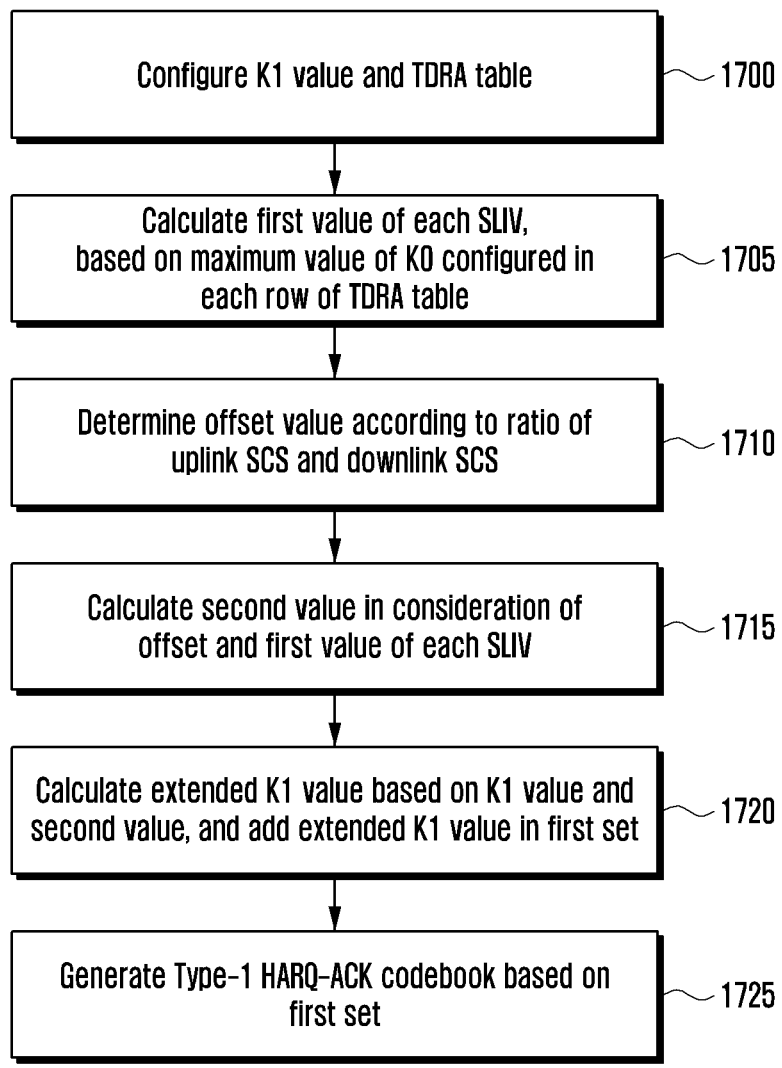
FIG. 17 is a diagram illustrating generation of a Type-1 HARQ-ACK codebook according to an embodiment of the disclosure.

FIG. 17 is a diagram illustrating generation of a Type-1 HARQ-ACK codebook according to an embodiment of the disclosure.

Referring to FIG. 17, a terminal may be configured with a K1 value and a TDRA table from a base station, in operation 1700. The terminal may refer a value as $K0_{max}$, wherein the value is largest in K0 values of scheduling information configured in one row of the TDRA table. The largest K0 value may be a K0 value corresponding to last scheduling information of one row. For reference, different rows of the TDRA table may have different $K0_{max}$ values. For example, referring to FIG. 16, in scheduling information of row 0, $K0_0$ and $K0_1$ are configured as K0 values. Here, a larger value between $K0_0$ and $K0_1$ is $K0_1$. Therefore, $K0_{max}=K0_1$ in row 0.

The terminal may obtain, in operation 1705, a difference value (the first value in FIG. 17) between a K0 value of scheduling information configured in each row of the TDRA table and the obtained $K0_{max}$. Here, the difference may be a value obtained using $K0_{max}-K0$. This difference may be referred to as a K0 difference value. A K0 difference value of one piece of scheduling information indicates a difference between a slot in which a last PDSCH is scheduled and a slot in which a PDSCH is scheduled according to the scheduling information.

More specifically, in FIG. 16, a difference between K00, which is a K0 value of first scheduling information of row 0 of the TDRA table, and $K0_{max}=K0_1$ of row 0 is 7. For example, a difference between a downlink slot in which a last PDSCH is scheduled and a downlink slot of a PDSCH scheduled according to the first scheduling information is 7.

As described above, if a downlink subcarrier spacing is greater than an uplink subcarrier spacing, there may be multiple downlink slots, in which a last PDSCH may be scheduled, with respect to one K1 value. To this end, an offset may be determined. If boundaries of a UL slot and a scheduled downlink slot are the same, the offset is 0. If the boundary of the UL slot and the boundary of the scheduled downlink slot are different, a difference (the number of downlink slots) from a downlink slot having the offset of 0 may be determined to be the offset value. Referring to FIG. 16, if the last PDSCH is scheduled in slot 4n-5, since the slot has the same boundary as that of uplink slot n-2, the offset may be 0 (1600). If the last PDSCH is scheduled in slot 4n-6, since the slot does not have the same boundary as that of uplink slot n-2 and has a difference by one downlink slot, the offset may be 1 (1605). If the last PDSCH is scheduled in slot 4n-7, since the slot does not have the same boundary as that of uplink slot n-2 and has a difference by two slots, the offset may be 2 (1610). If the last PDSCH is scheduled in slot 4n-8, since the slot does not have the same boundary as that of uplink slot n-2 and has a difference by three slots, the offset may be 3 (1615).

A range of the offset value is 0, 1, ... $SCS_{DL}/SCS_{UL}-1$, in operation 1710. For reference, since only a case of $SCS_{DL}>SCS_{UL}$ has been considered here, $SCS_{DL}/SCS_{UL}$ is an integer greater than 1 When a case other than $SCS_{DL}>SCS_{UL}$ is considered, the range of the offset value is 0. For example, when all cases are considered, the range of the offset value is 0, 1, ..., ceil $(SCS_{DL}/SCS_{UL})-1$.

An extended K1 value may be obtained based on the offset value.

An "extended" K1 value may be obtained using the sum of the configured K1 value, a value determined by the uplink subcarrier spacing and the downlink subcarrier spacing, the offset value, and the K0 difference value. More specifically, with respect to the one offset value, the offset may be obtained by floor$((K0\_difference(r)+offset)/2^{\mu_{DL}-\mu_{UL}})$. (where floor$((K0\ difference(r)+offset)/2^{\mu_{DL}-\mu_{UL}})$ is a second value of FIG. 17, in operation 1715)

Here, "K0_difference(r)+offset" is obtained by adding an offset value to the obtained K0_difference value (K0_difference). As above, the K0_difference value may be changed using all offset values.

Here, "$(K0\_difference(r)+offset)/2^{\mu_{DL}-\mu_{UL}}$" is to adjust, according to a carrier spacing, the value obtained by adding the offset. Since the value of "K0_difference(r)+offset" is determined in units of downlink slots, the value is changed in units of uplink slots.

Here, "floor((K0_difference(r)+offset)/$2^{\mu_{DL}-\mu_{UL}}$)" is a procedure for, when performing conversion in units of uplink slots, performing conversion into an integer. Here, the floor may be replaced with the ceil function.

The terminal may obtain a set of extended K1 values, based on the obtained floor((K0_difference(r)+offset)/$2^{\mu_{DL}-\mu_{UL}}$) value (the second value of FIG. 17) and the K1 value. (The first set in FIG. 17) This is K1+floor ((K0_difference(r)+offset)/$2^{\mu_{DL}-\mu_{UL}}$), in operation 1720.

In operation 1725, the terminal may generate a Type-1 HARQ-ACK codebook, based on the set of the extended K1 values obtained in this way.

The above procedure may be represented in a pseudo-code as follows.

```
[Start of Pseudo-code 3]
set K1 to the set of K1 values configured by gNB;
set Number_of_rows to the number of rows in TDRA table;
For r=0:Number_of_rows-1
  set K0(r) to the set of K0 values in row r of TDRA table;
  K0_difference(r) = maximum{K0(r)} - K0(r);
  For offset = 0: ceil(2^{μDL-μUL}) - 1
    K1_ext = K1_ext U {K1+floor((K0_difference(r)+offset)/2^{μDL-μUL})}
  End For
End For
[End of Pseudo-code 3]
```

Here, floor((K0_difference(r)+offset)/$2^{\mu_{DL}-\mu_{UL}}$) may be replaced with ceil((K0_difference(r)+offset)/$2^{\mu_{DL}-\mu_{UL}}$).

For reference, pseudo-code 3 may be applied to a case where an uplink subcarrier spacing and a downlink subcarrier spacing are the same or a case where an uplink subcarrier spacing and a downlink subcarrier spacing are different.

For reference, the lower part of pseudo-code 3 may be described in other ways.

For offset=0: ceil($2^{\mu_{DL}-\mu_{UL}}$)−1

$K1\_ext=K1\_ext\ U\{K1+\text{floor}((K0\_difference(r)+\text{offset})/2^{\mu_{DL}-\mu_{UL}})\}$;

End For

For example, the K1 extension values may not be obtained for all offsets, but only some offset values may be obtained. For example, only 0 that is a smallest offset value and a ceil($2^{\mu_{DL}-\mu_{UL}}$)−1 value that is a largest offset value may be used.

This may be represented as $K1\_ext=K1\_ext\ U\{K1+\text{floor}((K0\_difference(r))/2^{\mu_{DL}-\mu_{UL}})\}$;

K1_ext=K1_ext U {K1+floor((K0_difference(r)+ceil ($2^{\mu_{DL}-\mu_{UL}}$)−1)/$2^{\mu_{DL}-\mu_{UL}}$)}. The reason why the smallest offset value and the largest offset value are selected is that, with reference to FIG. 16, the PDSCH according to scheduling information may be distributed in a widest (widest in time) area. As such, complexity may be low by selecting some offset values. For reference, floor((K0_difference(r)+ceil ($2^{\mu_{DL}-\mu_{UL}}$)−1)/$2^{\mu_{DL}-\mu_{UL}}$)} may be replaced with ceil ((K0_difference(r))/$2^{\mu_{DL}-\mu_{UL}}$)}.

Here, the floor function may be replaced with the ceil function.

For example, the K1_extension values may not be obtained for all offsets, but only some offset values may be obtained. For example, only a value of ceil($2^{\mu_{DL}-\mu_{UL}}$)/2, which is a median offset value, may be used.

$K1\_ext=K1\_ext\ U\{K1+\text{floor}((K0\_difference(r)+\text{ceil}\ (2^{\mu_{DL}-\mu_{UL}})/2)/2^{\mu_{DL}-\mu_{UL}})\}$;

In addition to ceil($2^{\mu_{DL}-\mu_{UL}}$)/2, one of floor ($2^{\mu_{DL}-\mu_{UL}}$)/2, ceil($2^{\mu_{DL}-\mu_{UL}-1}$), floor($2^{\mu_{DL}-\mu_{UL}-1}$), ceil($2^{\mu_{DL}-\mu_{UL}}$)/2−1, ceil ($2^{\mu_{DL}-\mu_{UL}}$)/2+1, floor($2^{\mu_{DL}-\mu_{UL}}$)/2−1, and floor($2^{\mu_{DL}-\mu_{UL}}$)/2+1 may be selected as the median value.

Here, the floor function may be replaced with the ceil function.

For example, the K1_extension values may not be obtained for all offsets, but only some offset values may be obtained. For example, only a ceil($2^{\mu_{DL}-\mu_{UL}}$)−1 value, a largest offset value, may be used.

$K1\_ext=K1\_ext\ U\{K1+\text{floor}((K0\_difference(r)+\text{ceil}\ (2^{\mu_{DL}-\mu_{UL}})-1)/2^{\mu_{DL}-\mu_{UL}})\}$;

Here, the floor function may be replaced with the ceil function.

Figure 18:
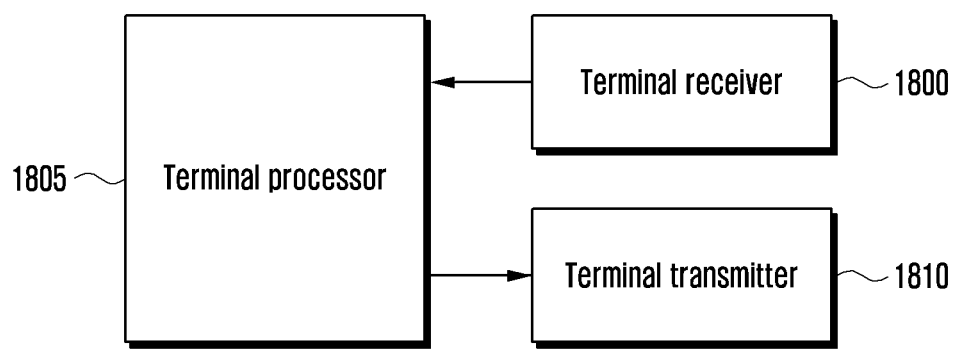
FIG. 18 is a diagram illustrating a structure of a terminal in a wireless communication system according to an embodiment of the disclosure.

FIG. 18 is a diagram illustrating a structure of a terminal in a wireless communication system according to an embodiment of the disclosure.

Referring to FIG. 18, a terminal may include a transceiver which refers to a terminal receiver 1800 and a terminal transmitter 1810, a memory (not shown), and a terminal processor 1805 (or a terminal controller or processor). According to the communication method of the terminal described above, the terminal receiver 1800 or the terminal transmitter 1810, the memory, and the terminal processor 1805 of the terminal may operate. However, the elements of the terminal are not limited to the aforementioned examples. For example, the terminal may include more or fewer elements compared to the aforementioned elements. In addition, the transceiver, the memory, and the processor may be implemented in the form of one chip.

The transceiver may transmit a signal to or receive a signal from a base station. Here, the signal may include control information and data. To this end, the transceiver may include an RF transmitter configured to perform up-conversion and amplification of a frequency of a transmitted signal, an RF receiver configured to perform low-noise amplification of a received signal and down-conversion of a frequency, and the like. However, this is only an embodiment of the transceiver, and the elements of the transceiver are not limited to the RF transmitter and the RF receiver.

The transceiver may receive a signal and output the same to the processor via a radio channel and may transmit, via a radio channel, a signal output from the processor.

The memory may store a program and data necessary for operation of the terminal. The memory may store control information or data included in a signal transmitted or received by the terminal. The memory may include a storage medium or a combination of storage media, such as ROM, RAM, hard disk, CD-ROM, and DVD. There may be multiple memories.

The processor may control a series of procedures so that the terminal operates according to the aforementioned embodiments. For example, the processor may receive DCI including two layers and control the elements of the terminal to concurrently receive multiple PDSCHs. There may be multiple processors, and the processors may control the elements of the terminal by executing programs stored in the memory.

Figure 19:
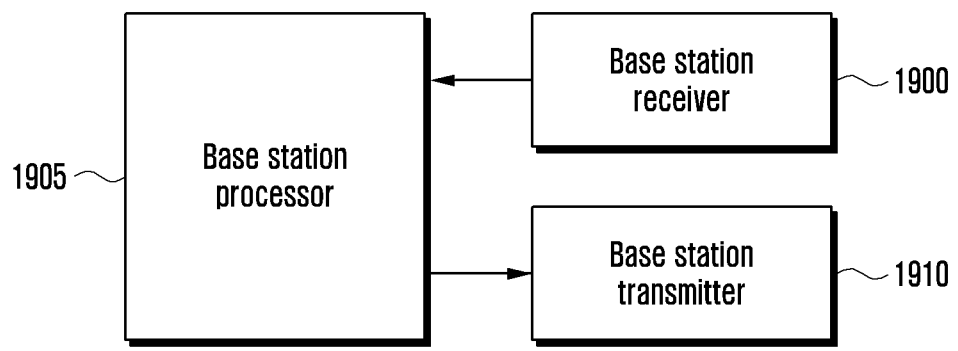
FIG. 19 is a diagram illustrating a structure of a base station in a wireless communication system according to an embodiment of the disclosure.

FIG. 19 is a diagram illustrating a structure of a base station in a wireless communication system according to an embodiment of the disclosure.

Referring to FIG. 19, a base station may include a transceiver, which refers to a base station receiver 1900 and a base station transmitter 1910, a memory (not shown), and a base station processor 1905 (or a base station controller or processor). According to the communication method of the base station described above, the base station receiver 1900 or the base station transmitter 1910, the memory, and the base station processor 1905 of the base station may operate. However, the elements of the base station are not limited to the above examples. For example, the base station may include more or fewer elements compared to the aforementioned elements. In addition, the transceiver, the memory, and the processor may be implemented in the form of one chip.

The transceiver may transmit a signal to or receive a signal from a terminal. Here, the signal may include control information and data. To this end, the transceiver may include an RF transmitter configured to perform up-conversion and amplification of a frequency of a transmitted signal, an RF receiver configured to perform low-noise amplification of a received signal and down-conversion of a frequency, and the like. However, this is only an embodiment of the transceiver, and the elements of the transceiver are not limited to the RF transmitter and the RF receiver.

The transceiver may receive a signal and output the same to the processor via a radio channel and may transmit, via a radio channel, a signal output from the processor.

The memory may store a program and data necessary for operation of the base station. The memory may store control information or data included in a signal transmitted or received by the base station. The memory may include a storage medium or a combination of storage media, such as ROM, RAM, hard disk, CD-ROM, and DVD. There may be multiple memories.

The processor may control a series of procedures so that the base station operates according to the aforementioned embodiments of the disclosure. For example, the processor may configure DCI of two layers including allocation information for multiple PDSCHs, and may control each element of the base station to transmit the DCI. There may be multiple processors, and the processors may control the elements of the base station by executing programs stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. For example, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Furthermore, although the above embodiments have been described based on the FDD LTE system, the embodiments may be applied to other communication systems, and other variants based on the technical idea of the embodiments may also be implemented in other systems, such as TDD LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in the methods of the disclosure, some or all of the contents of each embodiment may be combined without departing from the essential spirit and scope of the disclosure.

While the disclosure has been shown and described with reference to various embodiments thereof, it will be understood by those skilled in the art will that various changes in form and details may be made therein without departing from the spirit and scope of the disclosure as defined by the appended claims and their equivalents.

What is claimed is:

1. A method performed by a user equipment (UE) in a communication system, the method comprising:
   receiving, from a base station, a time domain resource allocation (TDRA) table defining respective sets of slot offsets $K_0$, start and length indicators (SLIV), and physical downlink shared channel (PDSCH) mapping types;
   identifying a set of slot timing values K;
   identifying an extended set of slot timing values $K_{1,ext}$, based on the $\lceil K_1 + \Delta K_{0,r} \cdot 2^{\mu_{UL} - \mu_{DL}} \rceil$ and $\lfloor K_1 + \Delta K_{0,r} \cdot 2^{\mu_{UL} - \mu_{DL}} \rfloor$ for row index r=0, ..., C(R)−1; and transmitting, to the base station, Type-1 hybrid automatic repeat request acknowledgement (HARQ-ACK) codebook for PDSCHs received in slots defined based on the extended set of slot timing values,
wherein:

$$\Delta K_{0,r} = \max_{K_0}(K_{0,r}) - K_{0,r} \text{ for row index } r = 0, \ldots, C(R) - 1,$$

R is a set of rows in the TDRA table,
C(R) is a cardinality of the R,
$K_{0,r}$ is a set of slot offsets corresponding to row index r in the TDRA table, and $$\max_{K_0}(K_{0,r})$$

is a largest value among the set of slot offsets corresponding to row index r in the TDRA table,
$\mu_{UL}$ is an uplink subcarrier spacing configuration, and
$\mu_{DL}$ is a downlink subcarrier spacing configuration.

2. The method of claim 1, wherein a set of rows of the TDRA table includes a row corresponding to more than one SLIV.

3. The method of claim 1, wherein the extended set of slot timing values $K_{1,ext}$ is identified based on a union of $\lceil K_1 + \Delta K_{0,r} \cdot 2^{\mu_{UL} - \mu_{DL}} \rceil$ and $\lfloor K_1 + \Delta K_{0,r} \cdot 2^{\mu_{UL} - \mu_{DL}} \rfloor$ for row index r=0, ..., C(R)−1.

4. The method of claim 1, wherein the extended slot set of slot timing values $K_{1,ext}$ is identified based on a union of $K_1 + \Delta K_{0,r}$ for row index r=0, ..., C(R)−1, in case that the uplink subcarrier spacing configuration $\mu_{UL}$ and the downlink subcarrier spacing configuration $\mu_{DL}$ is the same.

5. A method performed by a base station in a communication system, the method comprising:
transmitting, to a user equipment (UE), a time domain resource allocation (TDRA) table defining respective sets of slot offsets $K_0$, start and length indicators (SLIV), and physical downlink shared channel (PDSCH) mapping types; and
receiving, from the UE, Type-1 hybrid automatic repeat request acknowledgement (HARQ-ACK) codebook for PDSCHs in slots defined based on an extended set of slot timing values,
wherein the extended set of slot timing values $K_{1,ext}$ is based on $\lceil K_1 + \Delta K_{0,r} \cdot 2^{\mu_{UL} - \mu_{DL}} \rceil$ and $\lfloor K_1 + \Delta K_{0,r} \cdot 2^{\mu_{UL} - \mu_{DL}} \rfloor$ for row index r=0, ..., C(R)−1,
wherein:

$$\Delta K_{0,r} = \max_{K_0}(K_{0,r}) - K_{0,r}$$

for row index r=0, ..., C(R)−1,
R is a set of rows in the TDRA table,
C(R) is a cardinality of the R,
$K_{0,r}$ is a set of slot offsets corresponding to row index r in the TDRA table, and $$\max_{K_0}(K_{0,r})$$

is a largest value among the set of slot offsets corresponding to row index r in the TDRA table,
$\mu_{UL}$ is an uplink subcarrier spacing configuration, and
$\mu_{DL}$ is a downlink subcarrier spacing configuration.

6. The method of claim 5, wherein a set of rows of the TDRA table includes a row corresponding to more than one SLIV.

7. The method of claim 5, wherein the extended set of slot timing values $K_{1,ext}$ is identified based on a union of $\lceil K_1 + \Delta K_{0,r} \cdot 2^{\mu_{UL} - \mu_{DL}} \rceil$ and $\lfloor K_1 + \Delta K_{0,r} \cdot 2^{\mu_{UL} - \mu_{DL}} \rfloor$ for row index r=0, ..., C(R)−1.

8. The method of claim 5, wherein the extended-slot set of slot timing values $K_{1,ext}$ is identified based on a union of $K_1 + \Delta K_{0,r}$ for row index r=0, ..., C(R)−1, in case that the uplink subcarrier spacing configuration $\mu_{UL}$ and the downlink subcarrier spacing configuration $\mu_{DL}$ is the same.

9. A user equipment (UE) in a communication system, the UE comprising:
a transceiver; and
at least one processor configured to:
receive, from a base station, a time domain resource allocation (TDRA) table defining respective sets of slot offsets $K_0$, start and length indicators (SLIV), and physical downlink shared channel (PDSCH) mapping types,
identify a set of slot timing values $K_1$,
identify an extended set of slot timing values $K_{1,ext}$, based on $\lceil K_1 + \Delta K_{0,r} \cdot 2^{\mu_{UL} - \mu_{DL}} \rceil$ and $\lfloor K_1 + \Delta K_{0,r} \cdot 2^{\mu_{UL} - \mu_{DL}} \rfloor$ for row index r=0, ..., C(R)−1, and
transmit, to the base station, Type-1 hybrid automatic repeat request acknowledgement (HARQ-ACK) codebook for PDSCHs received in slots defined based on the extended set of slot timing values,
wherein:

$$\Delta K_{0,r} = \max_{K_0}(K_{0,r}) - K_{0,r}$$

for row index r=0, ..., C(R)−1,
R is a set of rows in the TDRA table,
C(R) is a cardinality of the R,
$K_{0,r}$ is a set of slot offsets corresponding to row index r in the TDRA table, and $$\max_{K_0}(K_{0,r})$$

is a largest value among the set of slot offsets corresponding to row index r in the TDRA table,
$\mu_{UL}$ is an uplink subcarrier spacing configuration, and
$\mu_{DL}$ is a downlink subcarrier spacing configuration.

10. The UE of claim 9, wherein a set of rows of the TDRA table includes a row corresponding to more than one SLIV.

11. The UE of claim 9, wherein the extended set of slot timing values $K_{1,ext}$ is identified based on a union of $\lceil K_1 + \Delta K_{0,r} \cdot 2^{\mu_{UL} - \mu_{DL}} \rceil$ and $\lfloor K_1 + \Delta K_{0,r} \cdot 2^{\mu_{UL} - \mu_{DL}} \rfloor$ for row index r=0, ..., C(R)−1.

12. The UE of claim 9, wherein the extended set of slot timing values K1,ext is identified based on a union of $K_1 + \Delta K_{0,r}$ for row index r=0, ..., C(R)−1, in case that the uplink subcarrier spacing configuration $\mu_{UL}$ and the downlink subcarrier spacing configuration $\mu_{DL}$ is the same.

13. A base station in a communication system, the base station comprising:
  a transceiver; and
  at least one processor configured to:
    transmit, to a user equipment (UE), a time domain resource allocation (TDRA) table defining respective sets of slot offsets $K_0$, start and length indicators (SLIV), and physical downlink shared channel (PDSCH) mapping types, and
    receive, from the UE, Type-1 hybrid automatic repeat request acknowledgement (HARQ-ACK) codebook for PDSCHs in slots defined based on an extended set of slot timing values,
    wherein the extended set of slot timing values $K_{1,ext}$ is identified based on $\lceil K_1 + \Delta K_{0,r} \cdot 2^{\mu_{UL}-\mu_{DL}} \rceil$ and $\lfloor K_1 + \Delta K_{0,r} \cdot 2^{\mu_{UL}-\mu_{DL}} \rfloor$ for row index r=0, . . . , C(R)−1,
wherein:

$$\Delta K_{0,r} = \max_{K_0}(K_{0,r}) - K_{0,r}$$

for row index r=0, . . . , C(R)−1,
R is a set of rows in the TDRA table,
C(R) is a cardinality of the R,
$K_{0,r}$ is a set of slot offsets corresponding to row index r in the TDRA table, and $$\max_{K_0}(K_{0,r})$$

is a largest value among the set of slot offsets corresponding to row index r in the TDRA table,
$\mu_{UL}$ is an uplink subcarrier spacing configuration, and
$\mu_{DL}$ is a downlink subcarrier spacing configuration.

14. The base station of claim 13, wherein a set of rows of the TDRA table includes a row corresponding to more than one SLIV.

15. The base station of claim 13, wherein the extended set of slot timing values $K_{1,ext}$ is identified based on a union of $\lceil K_1 + \Delta K_{0,r} \cdot 2^{\mu_{UL}-\mu_{DL}} \rceil$ and $\lfloor K_1 + \Delta K_{0,r} \cdot 2^{\mu_{UL}-\mu_{DL}} \rfloor$ for row index r=0, . . . , C(R)−1.

16. The base station of claim 13, wherein the extended set of slot timing values $K_{1,ext}$ is identified based on a union of $K_1 + \Delta K_{0,r}$ for row index r=0, . . . , C(R)−1, in case that the uplink subcarrier spacing configuration $\mu_{UL}$ and the downlink subcarrier spacing configuration $\mu_{DL}$ is the same.

* * * * *